(12) United States Patent
Henderson et al.

(10) Patent No.: US 10,921,444 B2
(45) Date of Patent: Feb. 16, 2021

(54) AIRBORNE WIND PROFILING PORTABLE RADAR SYSTEM AND METHOD

(71) Applicant: Foster-Miller, Inc., Waltham, MA (US)

(72) Inventors: Mark Henderson, Kiln, MS (US); Marshall Bradley, Slidell, LA (US)

(73) Assignee: Foster-Miller, Inc., Waltham, MA (US)

( * ) Notice: Subject to any disclaimer, the term of this patent is extended or adjusted under 35 U.S.C. 154(b) by 202 days.

(21) Appl. No.: 16/197,873

(22) Filed: Nov. 21, 2018

(65) Prior Publication Data

US 2019/0170871 A1    Jun. 6, 2019

Related U.S. Application Data

(60) Provisional application No. 62/589,650, filed on Nov. 22, 2017.

(51) Int. Cl.
*G01S 13/95* (2006.01)
*G01C 21/16* (2006.01)
(Continued)

(52) U.S. Cl.
CPC .......... *G01S 13/953* (2013.01); *G01C 21/165* (2013.01); *G01S 7/40* (2013.01);
(Continued)

(58) Field of Classification Search
CPC ...... G01S 13/953; G01S 13/86; G01S 13/584; G01S 13/589; G01S 7/40; G01W 1/02; G01C 21/165; Y02A 90/10
(Continued)

(56) References Cited

U.S. PATENT DOCUMENTS 3,856,402 A * 12/1974 Low .................. G01W 1/00
356/5.06
4,227,077 A * 10/1980 Hopson .............. F41G 7/2213
244/3.16
(Continued)

FOREIGN PATENT DOCUMENTS

EP          0488004 A2 *  6/1992  .............. G01W 1/08

OTHER PUBLICATIONS

Damiani et al., "High Resolution Airborne Radar Dual-Doppler Technique", P1R.4, Aug. 19, 2014, ResearchGate, https://www.researchgate.net/publication/238738426_High_resolution_airborne_radar_dual_doppler_technique, twenty-one (21) pages.
(Continued)

*Primary Examiner* — Frank J McGue
(74) *Attorney, Agent, or Firm* — Iandiorio Teska & Coleman, LLP

(57) ABSTRACT

An airborne wind profiling portable radar (AWiPPR) system comprising a mobile airborne platform including one or more navigation units configured to produce navigation data including at least the position and orientation of the mobile airborne platform. A radar unit is mounted and positioned to the mobile airborne platform, the radar unit is configured to transmit a wide-band frequency modulated continuous wave radar signal in a downward direction from the mobile airborne platform towards the ground and configured to continuously receive a reflected signal from a plurality of clear air scatters (CAS) targets or volumetric targets and output radar data. An inertial measurement unit (IMU) in communication with the one or more navigation units and the radar unit is configured to receive the navigation data and determine the position and orientation of the radar at a specific point in time and output IMU data. A data acquisition unit in communication with the radar unit and the IMU
(Continued)

is configured to receive and time align radar data and the IMU data for each reflected signal from each of the plurality of CAS targets or volumetric targets to provide an antenna pointing direction for each received reflected signal. The data acquisition unit is configured to process the time aligned radar data and IMU data to determine a distance and a Doppler velocity of each of the plurality of CAS targets or volumetric targets, provide a range, a velocity, and an antenna pointing direction for each of the plurality of CAS targets or volumetric targets, and calculate a vector wind velocity using the range, the velocity, and the antenna pointing direction for each of the plurality of CAS targets or volumetric scatters targets. The data acquisition unit may be configured to further correct the range, the velocity, and/or the antenna pointing direction of each of the plurality of CAS targets or volumetric targets to accommodate for a motion shift in data produced by one or more of: a relative motion and orientation of the mobile airborne platform, a Doppler spread in the range, the velocity and/or the antenna pointing direction, and a ground echo.

41 Claims, 52 Drawing Sheets

(51) Int. Cl.
  *G01S 13/86* (2006.01)
  *G01S 13/58* (2006.01)
  *G01S 7/40* (2006.01)
  *G01W 1/02* (2006.01)
(52) U.S. Cl.
  CPC .......... *G01S 13/584* (2013.01); *G01S 13/589* (2013.01); *G01S 13/86* (2013.01); *G01W 1/02* (2013.01)
(58) Field of Classification Search
  USPC ...................................................... 342/26 B
  See application file for complete search history.

(56) References Cited

U.S. PATENT DOCUMENTS

| | | | | |
|---|---|---|---|---|
| 4,359,640 | A * | 11/1982 | Geiger | G01S 17/95 250/372 |
| 4,427,306 | A * | 1/1984 | Adamson | G01W 1/00 250/338.1 |
| 5,028,929 | A * | 7/1991 | Sand | G01S 13/106 342/26 B |
| 7,109,913 | B1 * | 9/2006 | Paramore | G01C 23/00 342/26 B |
| 8,314,730 | B1 * | 11/2012 | Musiak | G01S 13/953 342/25 B |
| 9,007,570 | B1 | 4/2015 | Beyon et al. | |
| 9,310,481 | B2 | 4/2016 | Henderson et al. | |
| 2005/0114023 | A1 * | 5/2005 | Williamson | G01S 19/47 701/472 |
| 2011/0085698 | A1 * | 4/2011 | Tillotson | G01W 1/00 382/103 |
| 2013/0234884 | A1 * | 9/2013 | Bunch | G01W 1/08 342/26 B |
| 2013/0321200 | A1 * | 12/2013 | Henderson | G01S 13/583 342/26 D |
| 2019/0170871 | A1 * | 6/2019 | Henderson | G01S 13/953 |

OTHER PUBLICATIONS

Frasier et al., Real-time airborne radar wind-profiling algorithm for the Integrated Wind and Rain Airborne Profiler (IWRAP), (2005), https://www.google.com/search?q=s+j+frasier+an+t+chu&rlz=1C1ZCEB_enUS821US821&oq=s+j+frasier+an+t+chu&aqs=chrome..69i57.3463j0j8&sourceid=chrome&ie=UTF-8, four (4) pages.

Nekrasov et al., "Sea Surface Wind Measurement by Airborne Weather Radar Scanning in a Wide-Size Sector", Atmosphere, MDPI, May 23, 2016, https://www.researchgate.net/publication/303502246_Sea_Surface_Wind_Measurement_by_Airborne_Weather_Radar_Scanning_in_a_Wide-Size_Sector, twelve (12) pages.

* cited by examiner

The timed aligned radar data and the position and orientation data are processed to determine a distance and Doppler velocity for each of the plurality of CAS targets or volumetric targets and provide a range, a velocity, and antenna pointing direction for each plurality of CAS targets or volumetric scatters targets and calculate a vector wind velocity vector using the range, the velocity, and the antenna pointing direction for each of the plurality of CAS targets or volumetric targets.
112

The range, the velocity, and the antenna pointing direction of each of the plurality of CAS targets or volumetric targets is further corrected to accomodate for a motion shift in data produced by one or more of: a relative motion in orientation of the mobile airborne platform, a Doppler spread in the RVM and a ground echo.
114

*FIG. 5 (continued)*

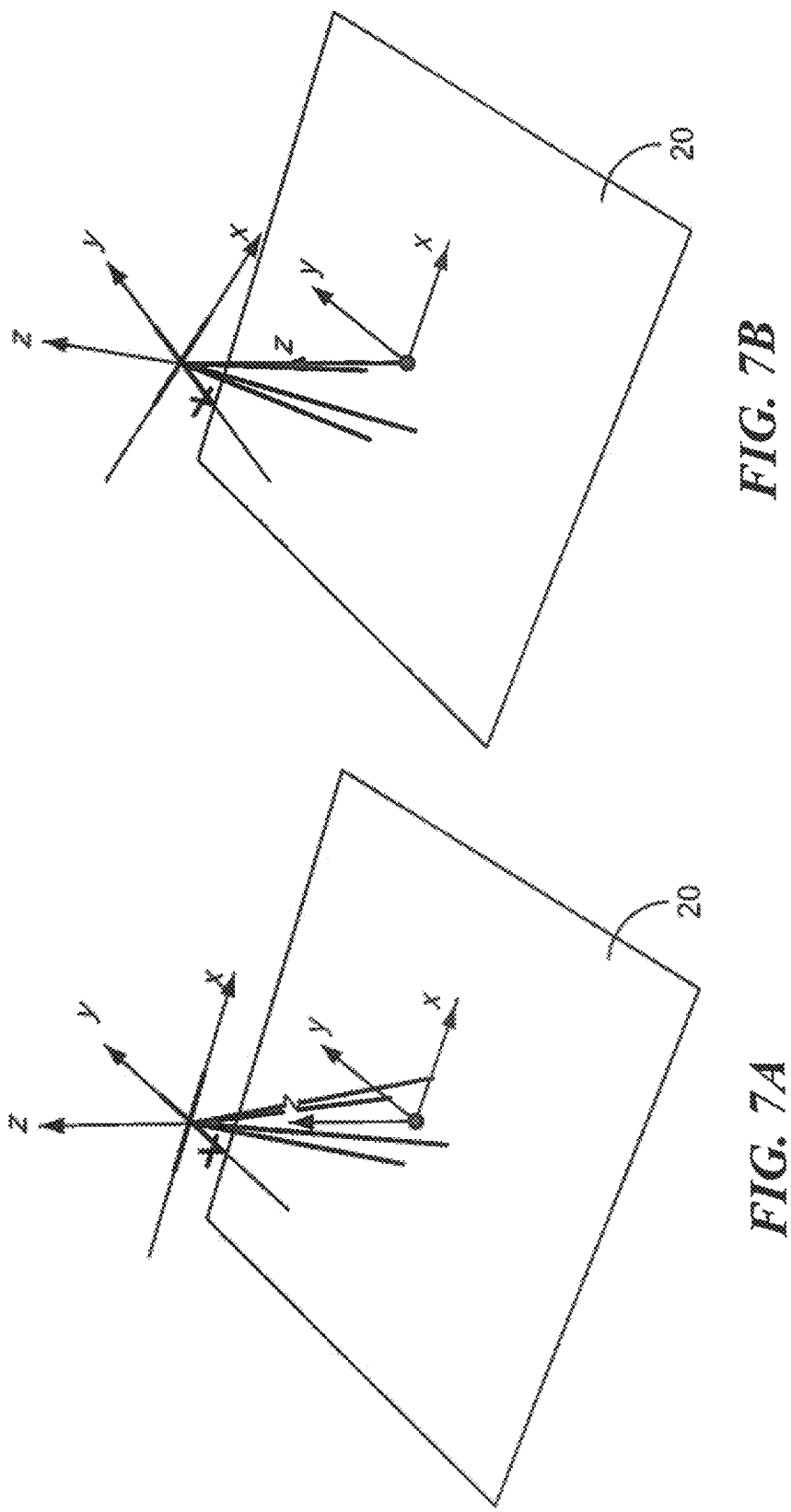

| $z_{AGL}$(m) | file | $V_{Doppler}$(m/s) | cosX | cosY | cosZ |
|---|---|---|---|---|---|
| 0. | 1 | 0. | | | |
| 90.6356 | 1 | 0.1341 | -0.417437 | -0.0787192 | -0.90529 |
| 129.087 | 1 | -0.312901 | -0.417437 | -0.0787192 | -0.90529 |
| 131.834 | 1 | -0.1341 | -0.417437 | -0.0787192 | -0.90529 |
| 159.299 | 1 | -0.2235 | -0.417437 | -0.0787192 | -0.90529 |
| 181.271 | 1 | 0.1341 | -0.417437 | -0.0787192 | -0.90529 |
| 184.018 | 1 | 0.2235 | -0.417437 | -0.0787192 | -0.90529 |
| 186.764 | 1 | -.1341 | -0.417437 | -0.0787192 | -0.90529 |
| 205.99 | 1 | 0.1341 | -0.417437 | -0.0787192 | -0.90529 |
| 208.736 | 1 | 0.312901 | -0.417437 | -0.0787192 | -0.90529 |
| ⋮ | ⋮ | ⋮ | ⋮ | ⋮ | ⋮ |
| 131.693 | 12 | -0.2235 | 0.284592 | -0.242303 | -0.927522 |
| 153.642 | 12 | -0.0447001 | 0.284592 | -0.242303 | -0.927522 |
| 208.515 | 12 | -0.938702 | 0.284592 | -0.242303 | -0.927522 |
| 211.258 | 12 | -0.938702 | 0.284592 | -0.242303 | -0.927522 |
| 233.207 | 12 | -0.670501 | 0.284592 | -0.242303 | -0.927522 |
| 480.133 | 12 | -1.4751 | 0.284592 | -0.242303 | -0.927522 |
| 485.62 | 12 | -1.2963 | 0.284592 | -0.242303 | -0.927522 |
| 488.363 | 12 | -0.402301 | 0.284592 | -0.242303 | -0.927522 |
| 540.492 | 12 | -1.2069 | 0.284592 | -0.242303 | -0.927522 |
| 543.236 | 12 | -1.2069 | 0.284592 | -0.242303 | -0.927522 |

*FIG. 28*

AIRBORNE WIND PROFILING PORTABLE RADAR SYSTEM AND METHOD

RELATED APPLICATIONS

This application claims benefit of and priority to U.S. Provisional Application Ser. No. 62/589,650 filed Nov. 22, 2017, under 35 U.S.C. §§ 119, 120, 363, 365, and 37 C.F.R. § 1.55 and § 1.78, which is incorporated herein by this reference.

FIELD OF THE INVENTION

This subject invention relates to an airborne wind profiling portable radar system and method.

BACKGROUND OF THE INVENTION

Wind profilers are Doppler radars that typically operate in the VHF (30-300 MHz) or UHF (300-1000 MHz) frequency bands. There are three primary types of radar wind profilers in operation in the U.S. today. The NOAA Profiler Network (NPN) profiler operates at a frequency of 404 MHz. The second type of profiler that is used by NOAA research and outside agencies is the 915-MHz boundary-layer profiler. The 404-MHz profilers are more expensive to build and operate, but they provide the deepest coverage of the atmosphere. The 915-MHz profilers are smaller and cheaper to build and operate, but they lack height coverage much above the boundary layer. A third type of profiler that operates at 449 MHz (the so-called ¼-scale 449-MHz profilers) combines the best sampling attributes of the other two systems. See Table 1 below

TABLE 1

Physical, operating, and sampling characteristics of wind profilers.

|  | 404-MHz (NPN) | 915-MHz (boundary layer) | 449-MHz (quarter-scale) |
| --- | --- | --- | --- |
| Antenna type | Coaxial-colinear phased array | Flat rectangular microstrip patch | Coaxial-colinear phased array |
| Antenna diameter (m) | 13 | 2 | 6 |
| Beamwidth (deg.) | 4 | 10 | 10 |
| Peak transmit power (W) | 6000 | 500 | 2000 |
| Transmit pulse width (μs) | $3.3^P$, $20^P$ | $0.417^*$, $0.708^{*,P}$ | $0.708^*$, 2.833 |
| Height coverage (m) | $500^{**}$-16,000 | 120-4,000 | $180^+$-8,000 |
| Vertical resolution (m) | 320+, 900+ | 63, 106* | 106, $212^{*,+}$ |
| Temporal resolution (min) | 60 | 60 | 60 |

*These settings reflect how the profilers were operated during typical deployments. Other degraded transmit and sampling resolutions are possible.
$^P$Pulse-coding was used in selected operating modes to boost signal power and increase altitude coverage (for more information on pulse coding, see Ghebrebrhan, 1990).
$^+$This minimum detectable range has been achieved with the ¼-scale 449-MHz profilers using a 0.7-μs pulse.
**Signal attenuators prevent accurate radar reflectivity data below 1 km.
+Increased vertical resolution as compared to the transmit pulse length was accomplished by oversampling.

See also U.S. Pat. Nos. 7,109,913; 9,310,481; and 9,007,570, incorporated by this reference herein. However, the conventional wind profilers discussed above are ground based systems have large apertures (antenna diameters), large range cells (vertical resolution), large blanking ranges (height coverage) and slow response (temporal resolution) and, therefore, cannot be used effectively in an airborne platform to determine vector wind velocity as a function of altitude above the ground

BRIEF SUMMARY OF THE INVENTION

Featured is an airborne wind profiling portable radar (AWiPPR) system comprising a mobile airborne platform including one or more navigation units configured to produce navigation data including at least the position and orientation of the mobile airborne platform. A radar unit is mounted and positioned to the mobile airborne platform, the radar unit is configured to transmit a wide-band frequency modulated continuous wave radar signal in a downward direction from the mobile airborne platform towards the ground and configured to continuously receive a reflected signal from a plurality of clear air scatters (CAS) targets or volumetric targets and output radar data. An inertial measurement unit in communication with the one or more navigation units and the radar unit, is configured to receive the navigation data and determine the position and orientation of the radar at a specific point in time and output IMU data. A data acquisition unit in communication with the radar unit and the IMU is configured to receive and time align radar data and the NU data for each reflected signal from each of the plurality of CAS targets or volumetric targets to provide an antenna pointing direction for each received reflected signal. The data acquisition unit is configured to process the time aligned radar data and IMU data to determine a distance and a Doppler velocity of each of the plurality of CAS targets or volumetric targets, provide a range, a velocity, and an antenna pointing direction for each of the plurality of CAS targets or volumetric targets, and calculate a vector wind velocity using the range, the velocity, and the antenna pointing direction for each of the plurality of CAS targets or volumetric scatters targets. The data acquisition unit may be configured to further correct the range, the velocity, and/or the antenna pointing direction of each of the plurality of CAS targets or volumetric targets to accommodate for a motion shift in data produced by one or more of: a relative motion and orientation of the mobile airborne platform, a Doppler spread in the range, the velocity and/or the antenna pointing direction, and a ground echo.

In one embodiment, a motion shift in the range, the velocity, and the antenna pointing direction may not include a Doppler wrap and wherein the navigation unit may be configured to generate a navigation correction for each reflected signal by adding a speed of the mobile airborne platform provided by the one or more navigation units to the determined Doppler velocity for each of the plurality of CAS targets or volumetric targets and rotating the range, the velocity, and the antenna pointing direction into a coordinate system centered beneath the mobile airborne platform. The data acquisition unit may be responsive to sparseness of the plurality of CAS targets, shifts in the position of the mobile airborne platform over a predetermined measurement window, and navigation correction applied to a set of reflected signals from the plurality of CAS targets or volumetric targets and the data acquisition unit may be configured to infer a Doppler field vector for each of the plurality of CAS targets or volumetric targets as a set of three coupled cubic splines derived from the measured Doppler velocity data for the plurality of CAS targets or volumetric using a non-parametric function estimation. The data acquisition unit may be configured to generate a vector wind field from the set of three coupled cubic splines by: representing the second derivative of the cubic splines as a piecewise continuous linear function ($f(z)$), integrating the function twice to yield a cubic polynomial producing a plurality of pivot points of the cubic splines, wherein the function ($f(z)$) must pass through the pivot points and be zero at the first and last pivot points such that the cubic splines are natural splines, determining a plurality of unknown spline ordinate points from the altitude and velocity data obtained by the data acquisition unit, wherein a minimum spline abscissa value is equal to the minimum altitude and velocity data values, and wherein a maximum spline abscissa value is equal to the maximum altitude and velocity data values, wherein the abscissa of the altitude and velocity data lies in an abscissa interval of the cubic splines, and wherein the ordinate points represent the velocity of the unknown wind field, wherein such the abscissa intervals are determined by ensuring that all abscissa intervals contain equal amounts of information, and wherein such that the relationship between the observed velocity data and the cubic splines is given by: $V_{N_d \times i} = A_{N_d \times 3N}$ where V is the vector of the obtained velocity data, N is the number of data points, $f$ is the vector of a set of cubic spline coefficients, A is an information matrix, and $Af$ is a cubic spline model. The data acquisition unit may fit the cubic spline model $Af$ to the obtained velocity data V using a least-squares technique. The data acquisition unit may minimize a difference between the obtained velocity data V and the cubic spline model $Af$ by obtaining a maximum likelihood estimate of $f$. The data acquisition unit may determine a required minimum slant distance of the radar unit relative to the ground from the reflected signal that yields a maximum allowable return signal into the radar unit before the performance of the radar unit is reduced to saturation or compression. The data acquisition unit may be configured to determine the required incidence angle using a Beckman and Spizzichino model. A pointing angle of the radar unit relative to the mobile airborne platform may be adjustable and the radar unit adjusts the pointing angle of the radar unit based on the determined required incidence angle. The pointing angle of the radar unit may be pointed at an angle relative to a normal to the ground of greater than about 0° and less than about 90°. The data acquisition unit may be further configured to estimate the vector wind velocity by: selecting a plurality of measurements containing a CAS targets or volumetric target and determining a slant distance and Doppler velocity of a ground echo from each, performing the required coordinate transformations such that the range and Doppler velocity of the ground echo are at zero range and velocity, extracting a slant distance and Doppler wind velocity for each of the CAS targets or volumetric targets in the plurality of measurements above a fixed signal-to-noise threshold, and converting the slant distance to an altitude above ground level using the navigation data from the one or more navigation units. The data acquisition unit may be further configured to minimize the chi-square sum between the measured wind vector velocities and the estimated wind vector velocities by a gradient search technique. The radar unit may transmit with a sweep width configured to match the backscattering characteristics of the plurality of CAS targets or volumetric targets. The sweep widths may range from about 6 MHz to about 200 MHz. The radar unit may transmit in a waveform selected from one or more of: linear frequency modulated (FM) waveform, a phase coded waveform, or non-linear FM waveform. The radar unit may be configured to transmit at a carrier frequency in the Ka band. The radar unit may be configured to convert the wide-band frequency modulated continuous wave radar signal to a Ka band and filter and amplify the Ka band signal prior to transmission thereof. The radar unit may be configured to receive the reflected signal from each of the plurality of CAS targets or volumetric targets, amplify the received signal, down-convert the received signal to a baseband received signal, and filter and amplify the received signal. The down conversion may be homodyne single side band. The down-conversion may be homodyne and is dual side band. The radar unit may include one or more antennas.

Also featured is a method of determining a vector wind velocity and direction as a function of altitude above the ground on a mobile airborne platform. The method comprising providing navigation data including at least positioning and orientation of the mobile airborne platform. A wide band frequency modulated continuous wave radar signal is transmitted in a downward direction from the mobile airborne platform towards the ground. A reflected signal from each of a plurality of clean air scatter (CAS) targets or volumetric targets is continuously received and radar data is output. The position and orientation of a radar unit mounted and positioned on the mobile airborne platform is determined at a specific point in time and position and orientation data are output. The radar data and the position and orientation data for each reflected signal from each of the plurality of CAS targets or volumetric targets are time aligned to provide an antenna pointing direction for each of the plurality of CAS targets or volumetric targets. The timed aligned radar data and position and orientation data are processed to determine a distance and Doppler velocity for each of the plurality of CAS targets or volumetric targets and provide a range, a velocity, and an antenna pointing direction for each of the plurality of CAS targets or volumetric targets and a vector wind velocity is calculated using the range, the velocity, and the antenna pointing direction for each of the plurality of CAS targets or volumetric targets. The range, the velocity, and/or the antenna pointing direction of each of the plurality of CAS targets or volumetric targets is further corrected to accommodate for a motion shift in the data produced by one or more of: a relative motion in orientation of the mobile airborne platform, a Doppler spread in the range, the velocity, and/or the antenna pointing direction and a ground echo.

In one embodiment, a shift in the range, the velocity, and the antenna pointing direction may not include a Doppler wrap and a navigation correction for each reflected signal is generated by adding a speed of the mobile airborne platform to the determined Doppler velocity for each of the plurality of CAS targets or volumetric targets and the range, the velocity, and the antenna pointing direction is rotated into a coordinate system centered beneath the airborne platform. The method may include detecting sparseness of the plurality of CAS targets, shifts in position of the mobile airborne platform over a predetermined measurement window and navigation correction applied to set of reflected signals from the plurality of CAS targets and inferring a Doppler field vector for each of the plurality of CAS targets or volumetric targets as a set of three cubic splines derived from the measured Doppler velocity data for the plurality of CAS targets or volumetric scatters targets using a non-parameteric function estimation. The method may include generating a vector field from each of a set of cubic splines by: representing the second derivative of the cubic spines as a piecewise continuous linear function (ƒ(z)), integrating the function twice to yield a cubic polynomial producing a plurality of pivot points of the cubic splines, wherein the function (ƒ(z)) must pass through the pivot points and be zero at the first and last pivot points such that the cubic splines are natural splines, determining a plurality of unknown spine ordinate points from the altitude and velocity data obtained by the data acquisition unit, wherein a minimum spline abscissa value is equal to the minimum altitude and velocity data values, and wherein a maximum spline abscissa value is equal to the maximum altitude and velocity data values, wherein the abscissa of the altitude and velocity data lies in an abscissa interval of the cubic spines, and wherein the ordinate points represent the velocity of the unknown wind field, wherein such the abscissa intervals may be determined by ensuring that all abscissa intervals contain equal amounts of information. Wherein such that the relationship between the observed velocity data and the cubic spines is given by: $V_{N_d \times i} = A_{N_d \times 3N} f_{SN}$, where V is the vector of the obtained velocity data, N is the number of data points, $f$ is the vector of a set of cubic spline coefficients, A is an information matrix, and $Af$ is a cubic spline model. The method may include fitting the cubic spline model of $Af$ to obtain the velocity data using an at least squares technique. The method may include minimizing the difference between the obtained velocity data V and the cubic spline model $Af$ by obtaining a maximum likelihood estimate off. The method may include determining a required minimum slant distance of a radar unit disposed on the mobile airborne unit relative to the ground from the reflected signal that yields a maximum allowable signal return before a performance of the radar unit is reduced to saturation or compression. The method may include determining the required incidence angle using a Beckman and Spizzichino model. The method may include providing a pointing angle of the radar unit relative to the mobile airborne platform that is adjustable and the radar unit adjusts a pointing angle of the radar unit based on the determined required incidence angle. The pointing angle of the radar unit may be pointed at an angle relative to a normal to the ground of greater than about 0° and less than about 90°. The method may include estimating the wind velocity vector by: selecting a plurality of measurements containing a CAS target or volumetric scatter target and determining a slant distance and Doppler velocity of a around echo from each, performing the required coordinate transformations such that the range and Doppler velocity of the ground echo are at zero range and velocity and extracting a slant distance and Doppler wind velocity for each of the CAS targets in the plurality of measurements above a fixed signal-to-noise threshold, converting the slant distance to an altitude above ground level using the navigation data from the one or more navigation units. The method may include minimizing the Chi-square sum between the measured wind vector velocity and the estimated wind vector velocity by a gradient search technique. The wide-band frequency modulator continuous wave radar signal may transmit with a sweep width configured to match the back-scattering characteristics of the CAS targets or volumetric targets. The sweep widths may be in the range of about 6 MHz to about 200 MHz. The wide-band frequency band modulator continuous wave radar signal may include one or more of a linear frequency modulated (FM) waveform, a phase coded waveform, or non-linear FM waveform. The wide-band frequency modulator continuous wave radar signal may transmit a carrier frequency in the Ka band. The method may include converting the wide-band frequency modulator continuous wave radar signal to a Ka band, filtering and amplifying the Ka band prior to transmission thereof. The method may include receiving the reflected signal from each of the plurality of CAS targets or volumetric scatters targets, amplifying the received signal, down converting the received signal to a base band received signal and filtering and amplifying the received signal. The down conversion may be a homodyne single side band. The down conversion may be a homodyne and is a dual side band.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which:

FIG. 68 is a graph depicting the measurement of the wind Doppler speed profile by the system and method shown in FIGS. 1-5 operating in an upward looking ground based mode;

FIGS. 7A and 7B depict coordinate systems when a mobile airborne platform aircraft roll pitch and yaw are zero (FIG. 7A) and when a mobile airborne platform aircraft roll pitch are yaw are 10°, 0° and 10°, respectively (FIG. 7B);

FIG. 28 is an example showing observed contact Doppler velocities and altitudes together with radar beam pointing directions;

DETAILED DESCRIPTION OF THE INVENTION

Figure 1:
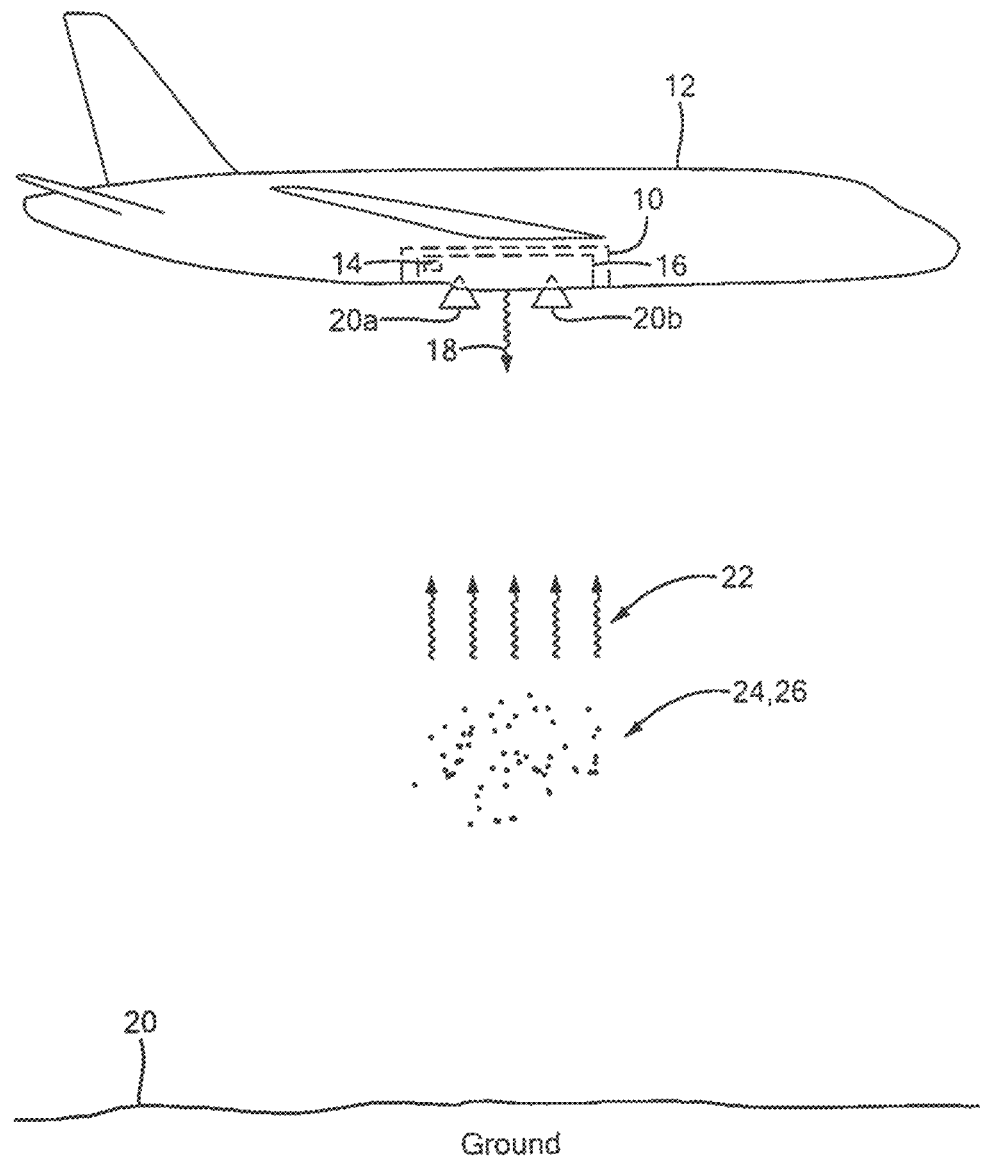
FIG. 1 is a schematic side view showing one example of the primary components of one embodiment of a airborne wind profiling portable radar (AWiPPR) system of this invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

There are several problems associated with conventional wind profiling systems. First, mounting a ground based radar to a moving platform that is operating at velocities much greater than the wind speed requires new data processing as disclosed herein since the targets now smear in velocity space, and the velocity of the aircraft may often be greater than the unambiguous velocity of the radar.

Second, pointing the radar at the ground means that the background is no longer at 30° K., but is rather closer to 300° K., which means that the background noise floor is much higher. This reduces the signal to noise ratio (SNR) of the targets even if the platform is not moving.

Third, when pointing in a downward direction, the radar now has a large target in the ground bounce that can swamp the dynamic range preventing small targets from being visible. Higher incidence angles now reduce the required dynamic range of the system and allows the system to resolve both the return from the ground and that from the small CAS targets.

Fourth, the radar has to account for the motion of the platform with 6 degrees of freedom: 3 positions (x, y, and z) and orientation (roll, pitch, and yaw).

Fifth, the radar must find a way to aggregate the data from all directions into a format and a method that allows the information to be inverted into a wind solution. This is non-trivial as the system is not static, data is not sampled regularly, data cannot be required to fit a predetermined format or pointing direction, data is not guaranteed at any sampling interval, and an inversion matrix can be ill-conceived.

One or more embodiment of the AWiPPR system 10 and the method thereof, disclosed herein is an innovative airborne wind profiling portable radar system and method which provides a solution to one or more of the problems discussed above. AWiPPR system 10, FIG. 1-4, is mounted to mobile airborne platform 12, FIGS. 1-3, e.g., an aircraft or similar type airborne vehicle and determines vector wind velocity as a function of altitude above ground level. As disclosed herein, vector wind velocity may be described by three quantities 1) scalar wind speed, 2) wind direction in the horizontal plane, and 3) vertical scalar wind speed.

Figure 4:
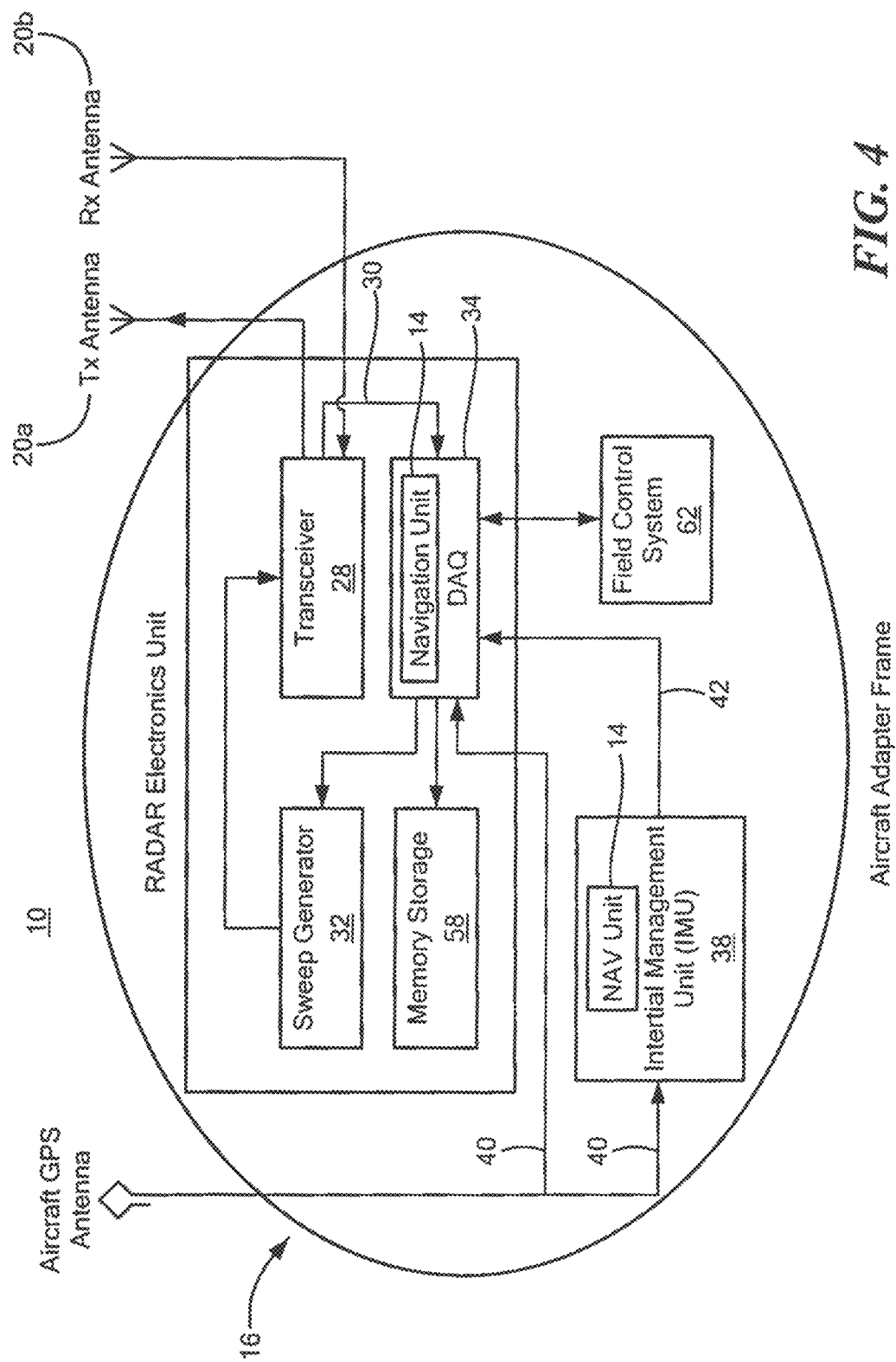
FIG. 4 is a schematic block diagram showing in further detail the primary components of the AWiPPR system 10 shown ire FIGS. 1-3.

AWiPPR system 10 includes one or more navigation units 14, FIGS. 1 and 4, mounted to a mobile airborne platform 12. One or more navigation units 14 are configured to produce navigation data including at least the position and orientation of mobile airborne platform 12. In one example, the one or more navigation units 14 are typically a global positioning system or similar type navigation system, as discussed below.

Figure 2:
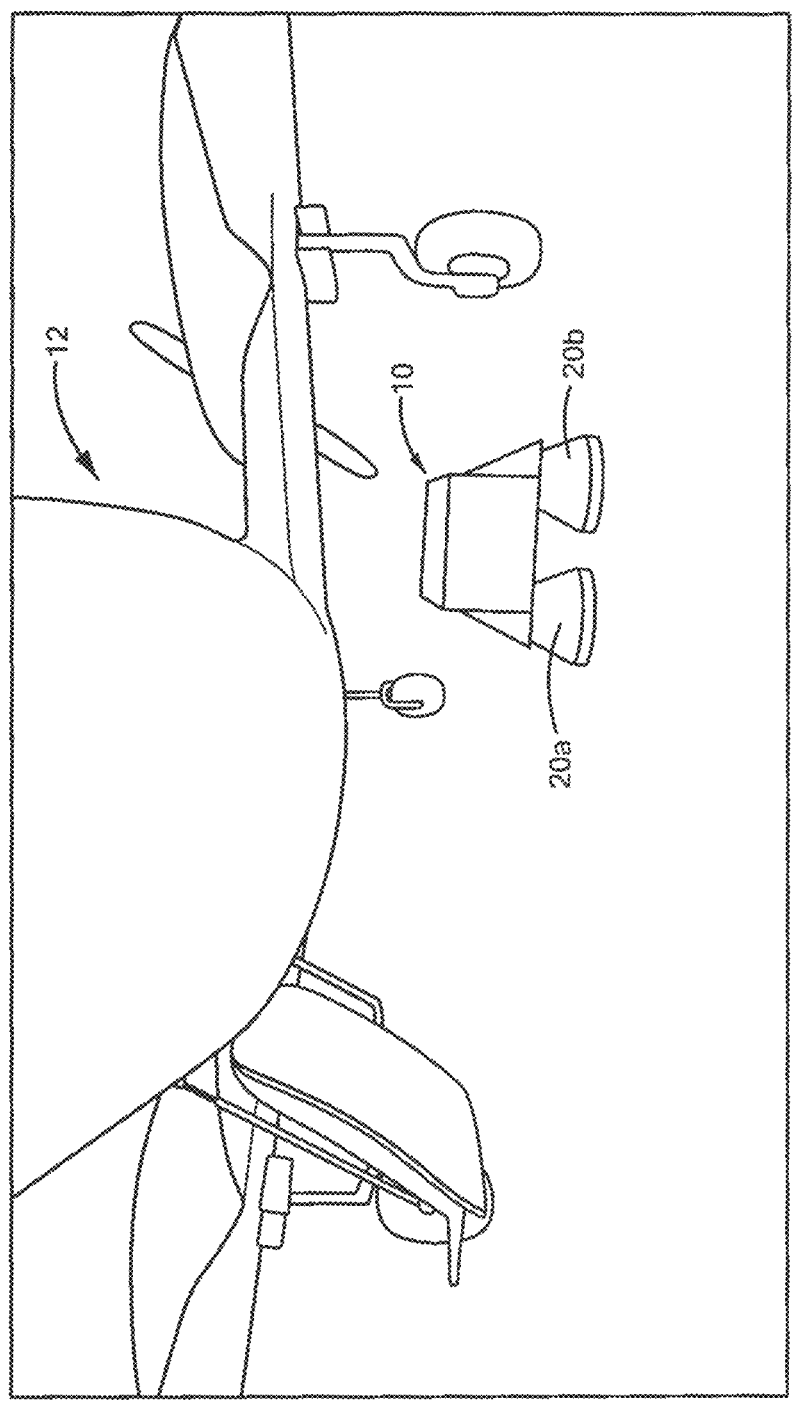
FIG. 2 is a three-dimensional view showing one example of a prototype of the AWiPPR system 10 shown in FIG. 1 which is mounted in the mobile airborne platform.
Figure 3:
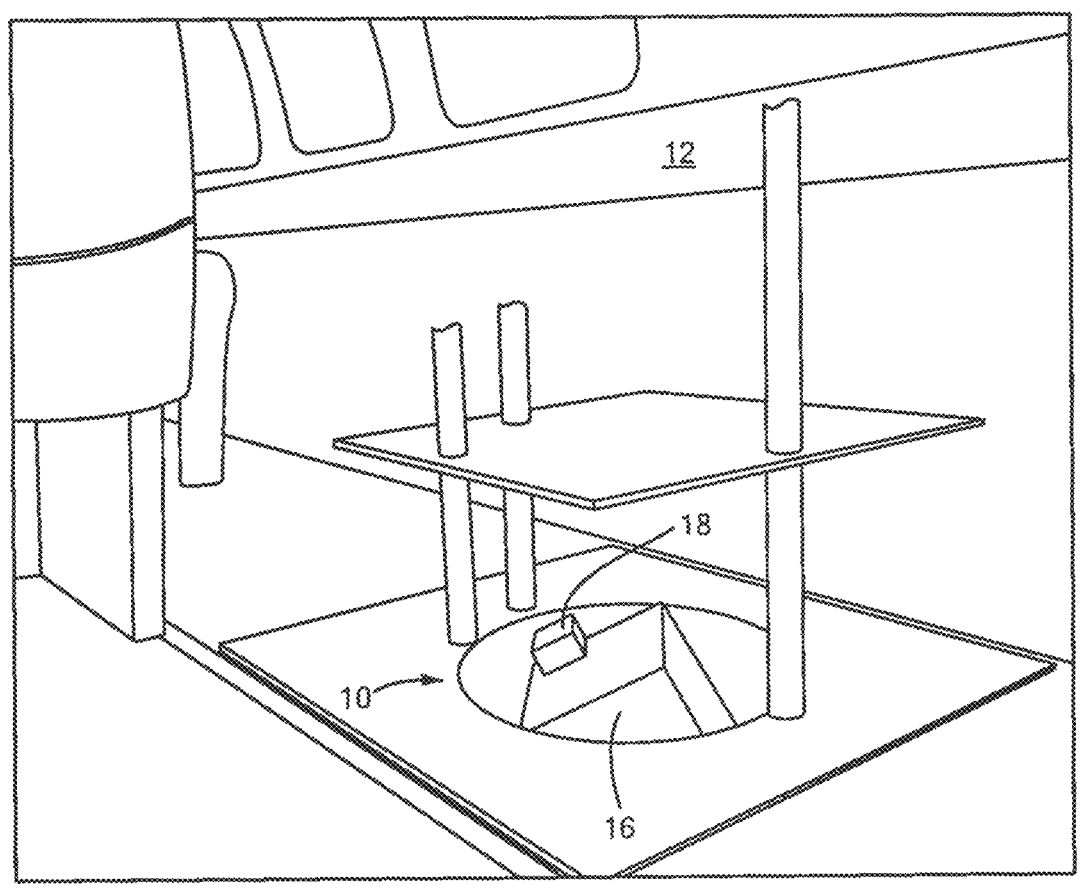
FIG. 3 is a three-dimensional view showing one example of the prototype of the AWiPPR system 10 shown in FIG. 2 mounted in the mobile airborne platform shown in FIG. 2.

AWiPPR system 10 also includes a radar unit 16, FIGS. 1, 3 and 4, mounted and positioned to a mobile airborne platform 12, e.g., as shown in FIG. 1, or as shown in a protype of AWiPPR system 10, FIGS. 2 and 3, Radar unit 16 is configured to transmit wide-band frequency modulated continuous wave radar signal 18, FIG. 1, in a downward direction from mobile airborne platform 12 towards ground 20 as shown and is configured to continuously receive reflected signals 22 from each of a plurality of clear air scatters CAS targets 24 or volumetric targets 26 and output radar data, e.g., the output transceiver 28 by line 30 (discussed below). CAS is the result of any number of phenomena that can cause reflection of a radar signal. The most prevalent of these is convective turbulence generated by solar heating of the ground, Other clear air scatters include mechanical turbulence and reflections from insects. In addition to the foregoing, radar unit 16 may detect volumetric scatter reflections from rain, snow, fog, and virga (rain that evaporates before it reaches the ground). In all cases, these sources produce local changes in the index of refraction in the atmosphere. Ultimately, it is the changes in index of refraction that the radar unit 16 detects.

Radar unit 16 is preferably a wide-band (WB) frequency modulated continuous wave (FMCW) radar capable of detecting targets 24 CAS or volumetric targets 26 in the convective boundary layer (CBL) of the atmosphere. See, e.g., U.S. Pat. No. 9,310,481 incorporated herein by this reference, for an example of radar unit 16 configured as a WBCAS FMCW radar unit. Radar unit 16 preferably operates at a carrier frequency, fc, at about 33.4 GHz (Ka band) with selectable pulse sweep widths of 6 to 100 MHz. The size of the sweep width controls the range resolution of radar unit 16 and the maximum effective range of radar unit 16. Sweep width is preferably chosen to match the back-scattering characteristics of the CAS targets 24 or volumetric targets 26. Radar 16 is preferably configured to detects CAS targets 24 or volumetric targets 26 up to and beyond the top of the convective boundary layer (CBL). Depending on time of the day and atmospheric stability, the top of the CBL is nominally about 1500 m but it can be as high as 2500 m.

Radar unit 16 preferably detects CAS targets 24 or volumetric targets 26 which may include the turbulent motion of the air associated with the ever-present hydrodynamic-thermodynamic instabilities in the atmosphere. These turbulent motions move with the mean vector wind velocity and reflections from these features can be used to determine the mean vector wind velocity. Their prevalence is most pronounced during time periods when solar illumination is high and the atmospheric equivalent potential temperature profile has a negative gradient with respect to increasing altitude, CAS targets 24 or volumetric targets 26 can be tracked over several radar altitude cells and they predominantly have an apparent upward component of motion that causes them to appear to accelerate away from the radar. This apparent component of acceleration is caused by the finite beam width of the radar beam. Radar unit 16 also may detect trace precipitation, rainfall, snow, fog and clouds and other dull air phenomena.

Radar unit 16 is preferably adapted for use on mobile airborne platform 12, FIGS. 1-3, so that the vector wind velocity profile could be measured from the top of the CBL down to ground 20, FIG. 1. Radar unit 16 is preferably configured as downward-looking radar as shown. Airborne measurement of the CBL wind profile with radar unit 16 configured as a downward-looking radar is a much more challenging technical problem than conventional ground based wind profile measurement using an upward-looking radar. Key technical challenges include the following:

1. Radar unit 16 has been successful in part because of its large dynamic range and low noise floor. The noise floor for system 10 on a temperature scale at near vertical elevation angles is approximately 150° K. of which about 38° K. comes from atmospheric sources. When the radar unit 16 is turned upside down it is pointed at the ground with a nominal temperature of 300° K. This will cause the radar noise floor to increase from 150° K. to approximately 420° K. representing a net loss in performance against weakly reflecting clear air targets of about 4.5 dB.

2. Backscatter echoes from ground 20 are 4-7 orders of magnitude larger than CAS echoes and may cause saturation thereby limiting the performance of radar unit 16.

3. In order to infer vector wind velocity from observed Doppler echoes from mobile airborne platform 12 it is necessary to know the vector velocity and orientation of the mobile airborne platform 12 in a reference inertial coordinate system with a high degree of accuracy and precision. This requires one or more navigation units 14 be tightly coupled to the data collection process of radar unit 16.

4. The character of the measured data of mobile airborne platform 12 may be very different than data measured from a conventional ground-based system. The algorithms for processing airborne data need to be more sophisticated than conventional ground based systems.

One or more embodiment of AWiPPR system 10 mounted on mobile airborne platform 12 with radar unit 16 provides a solution to the above technical challenges. A prototype of AWiPPR system 10 was tested. Using AWiPPR system 10 and method thereof, the resulting data was processed and a vector wind velocity profile was determined that was found to be in reasonable agreement with vector wind velocity measured by a balloon lifted radiosonde nearby, as discussed in detail below.

In one design, radar unit 16, FIG. 3, is preferably a FMCW type radar or similar type radar unit. In operation, radar unit 16 is always on, and is continuously transmitting a wide-band frequency continuous wave radar signal 18. FIG. 1. Radar unit 16 preferably includes a sweep generator 32, FIG. 4, which provides the transmitted waveform, preferably a linear frequency modulated (FM) sweep. Other waveforms may be used, such as a phase coded waveform, or a non-linear FM waveform. In one example, radar unit 16 may be configured as a frequency modulated continuous wave (FMCW) radar using a linear frequency sweep estimates the range and Doppler velocity of a target echo by using a form of fast-time slow-time processing that produces a range-velocity matrix (RVM), AWiPPR system 10 forms RVMs in the same way as the WBCAS FMCW radar system described in U.S. Pat. No. 9,310,481, incorporated by reference herein.

Radar unit 16 includes transceiver 28 which takes the baseband signal and converts it up to Ka band, filters the transmit signal, and amplifies transmit signal 18, FIG. 1. Transceiver 28, FIG. 4, receives the continuously reflected signal 22 from each of the plurality of CAS targets 24 or volumetric scatters targets 26, amplifies the received signal, converts the signal to baseband, filters the baseband signal, and amplifies the baseband signal and outputs radar data by line 30 to data acquisition (DAQ) unit 34 (discussed below). The down-conversion is preferably homodyne and may either be single side band or dual side band.

Radar unit 16 also includes one or more antennas, e.g., antenna 20*a* and/or antenna 20*b*, FIGS. 1-4, e.g., a single antenna or dual antennas. In one design, separate linearly polarized antennas may be utilized to connect to separate transmit and receive ports on transceiver 28. In other designs, left and right-hand polarized antennas may be utilized, a single antenna with a circulator, or a single antenna with separate polarization feeds may be utilized. A single antenna solution with circulator will require additional circuitry to cancel the antenna feed reflection and potentially any close-target returns.

AWiPPR system 10, FIGS. 1-4, also includes inertial management unit (IMU) 38, FIGS. 3 and 4. EAU 38, FIG. 4, is in communication with the one or more navigation units 14 and radar unit 16. IMU 18 is configured to receive the navigation data output by the one or more navigation units by line 40, FIG. 4, and determine the position and orientation of radar unit 16 at a specific time and output IMU data by line 42. In one example, IMU 38 may include navigation unit 14, e.g., a global positioning service (GPS), and receives signals therefrom along with other inputs including roll rate sensors, inertial sensors, magnetometers, temperature and pressure sensors located in or on mobile airborne platform 12, IMU 38, or radar unit 16 to determine the position and orientation of the radar unit 16 Careful measurements are taken to translate the measurements of IMU 28 into antenna pointing directions for one or more antenna 20*a* and/or 20*b*, as discussed below.

AWiPPR system 10 also includes DAQ unit 34, FIG. 3, which is typically part of the electronics of radar unit 16. In one example, navigation unit 14 may be embedded in DAQ 34. DAQ 34 is in communication with radar 16 and IMU 18 and is configured to receive and time align the radar data output by transceiver 24 of radar unit 16 by line 30 and the IMU data output by IMU 38 by line 42 for each reflected signal 22, FIG. 1, from each of the plurality of CAS targets 24 or volumetric targets 26 to provide an antenna positioning direction for one or more antenna 20*a* and/or 20*b*, FIGS. 1-4, for each received reflected signal.

DAQ unit 34 is configured to process the time aligned radar data and IMU data to determine a distance and Doppler velocity of each oldie plurality CAS targets 24 or volumetric targets 26 provide a range, a velocity, and an antenna pointing direction for each of the plurality CAS targets 24 or volumetric scatters targets 26, and calculate a vector wind velocity using the range, the velocity, and the antenna pointing direction for each of the plurality of CAS targets 24 or volumetric targets 26.

DAQ 34 is also configured to further correct the range, the velocity, and/or the antenna pointing direction of each of the plurality of CAS targets 24 or volumetric scatters targets 26 to accommodate for a motion shift in the data produced by one or more of a relative motion in orientation of mobile airborne platform 12, a Doppler spread in the RVM, and a ground echo.

DAQ 34 preferably digitizes the baseband signal and segments the waveform to provide alignment to the transmit pulse. DAQ 34 records the data to local memory 58 before processing the data. Field control system 60 is a computer subsystem that provides a human machine interface to control the functions of DAQ 34.

System 10 preferably includes a plurality of clocks, e.g., a clock in radar unit 16, a clock in inertial management unit 18, a clock in DAQ 34, and a clock in one or more navigation units 14, as known by those skilled in the art. The clocks in system 10 are preferably synchronized to each other and preferably have minimal phase noise. By locking the clocks together, system noise is confined to very specific regions which can then be removed. This allows for very long integration times and significant processing gain free from low level noise. By reducing phase noise real dynamic range is increased.

In one example, a motion shift in the range, the velocity, and the antenna pointing direction does not include a Doppler wrap and the one or more navigation units 14 is configured to generate a navigation correction for each reflected signal 22 by adding a speed of mobile airborne platform 12 provided by the one or more navigation units 14 to the determine Doppler velocity for each of the plurality CAS targets 24 or volumetric scatters targets 26 and rotating the range, the velocity, and the antenna pointing direction into a coordinate system centered beneath mobile airborne platform 12.

In one embodiment, DAQ 34 is responsive to the sparseness of the plurality of CAS targets 24, shifts in the position of the mobile airborne platform 12 over a predetermined measurement window, typically comprised of at least the amount of time from when wide-band frequency modulated continuation wave radar signal 18 is transmitted and the reflected signals 22 from each of the plurality CAS targets 24 or volumetric targets 26 is received by radar unit 16, and navigation correction is applied to a set of reflected signals from the plurality of CAS targets 24 or volumetric targets 26 DAQ 34 is further configured to infer a Doppler field vector for each of the plurality of CAS targets 24 or volumetric scatters targets 26 as a set of three coupled cubic splines derived from measured Doppler velocity data for the plurality of CAS targets 24 or volumetric targets 26 using a non-parametric function estimation, as discussed below.

Figure 5:
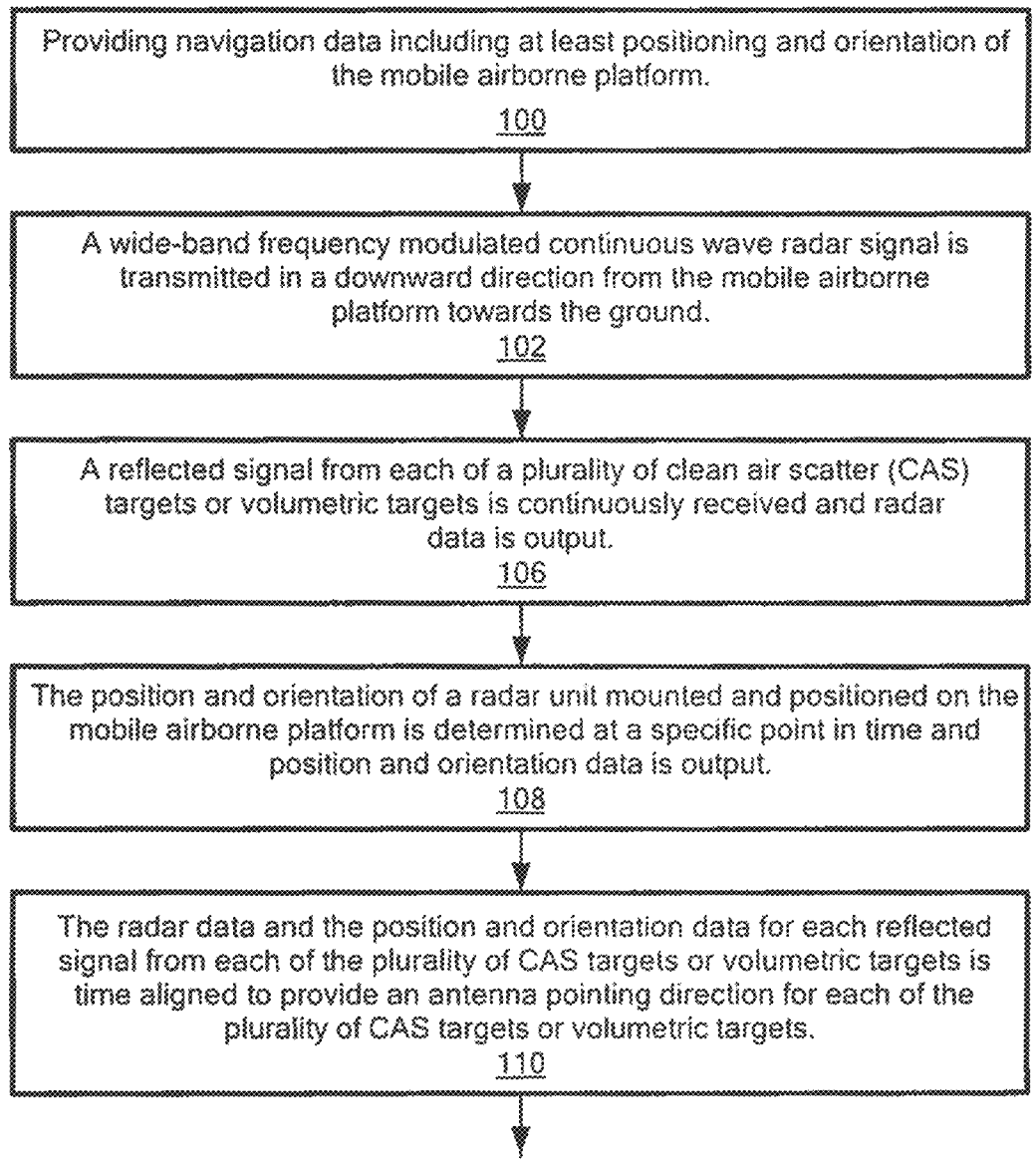
FIG. 5 is a block diagram showing the primary steps of one embodiment of the method for determining vector wind velocity on a mobile airborne platform of this invention.

The method of determining a vector wind velocity as a function of altitude above the ground on a mobile air platform of one embodiment of this invention includes providing navigation data including at least positioning and orientation of the mobile airborne platform, step 100, FIG. 5. A wide-hand frequency modulated continuous wave radar signal is transmitted in a downward direction from the mobile airborne platform towards the ground, step 102. A reflected signal is received from each of the plurality of CAS targets or volumetric targets and radar data is output, step 106. The position and orientation of a radar unit mounted and positioned on the mobile airborne platform is determined at a specific point in time and position and orientation data is output, step 108. The radar data and the position and orientation data for each reflected signal from each of the plurality of CAS targets or volumetric targets is time aligned to provide an antenna pointing direction for each of the plurality of CAS targets or volumetric targets, step 110. The timed aligned navigation data and the position and orientation data are processed to determine a distance and Doppler velocity for each of the plurality of CAS targets or volumetric targets and provide a range, a velocity, and antenna pointing direction for each plurality of CAS targets or volumetric scatters targets and calculate a vector wind velocity using the range, the velocity, and the antenna pointing direction for each of the plurality of CAS targets or volumetric targets, step 112. The range, the velocity, and the antenna pointing direction of each of the plurality of CAS targets or volumetric targets is further corrected to accommodate for a motion shift in data produced by one or more of a relative motion in orientation of the mobile airborne platform, a Doppler spread in the RVM and a ground echo, step 114.

The result is AWiPPR system 10 and the method thereof efficiently and effectively determines vector wind velocity as a function of altitude above ground level in mobile airborne platform 12. AWiPPR system 10 and the method thereof provides for the use of airborne radar for detecting CAS targets or volumetric scatters targets or other features that create radar reflections. AWiPPR system 10 and the method there of uses aircraft navigation data to georeference CAS targets and the dot products of their velocity. AWiPPR system 10 and the method thereof uses aircraft navigation data to correct relative wind data. AWiPPR system 10 and the method thereof provides a solution of inverse problem/tomographic reconstruction to estimate vector wind velocity vector as a function of altitude. AWiPPR system 10 and the method thereof operates in dull weather conditions, for example dust, fog, mist, virga, and snow. AWiPPR system 10 and the method thereof may operate in the Ka band (33.4 GHz) FMCW radar due to radar band availability and experimental results. AWiPPR system 10 and the method thereof provides selectable pulse sweep widths of about 6 to about 200 MHz to control range resolution and maximum range of radar and provides selectable pulse duration, small range bands, e.g., 3.125 meters. AWiPPR system 10 and the method thereof provides a very low-noise front end, e.g., less than about 2 dB Noise Figure. AWiPPR system 10 and the method thereof also uses data selection by SNR thresholding and provides for data selection and validation by outlier removal and data selection and validation by echo intensity and angle of incidence. AWiPPR system 10 and the method thereof provides a solution of inverse problem using maximum a posteriori (MAP) cubic splines, parametrized by smoothing parameter and noise parameter and maximization of MAP probability over the space of smoothing parameter and noise parameter, as discussed in further detail below.

Figure 6A:
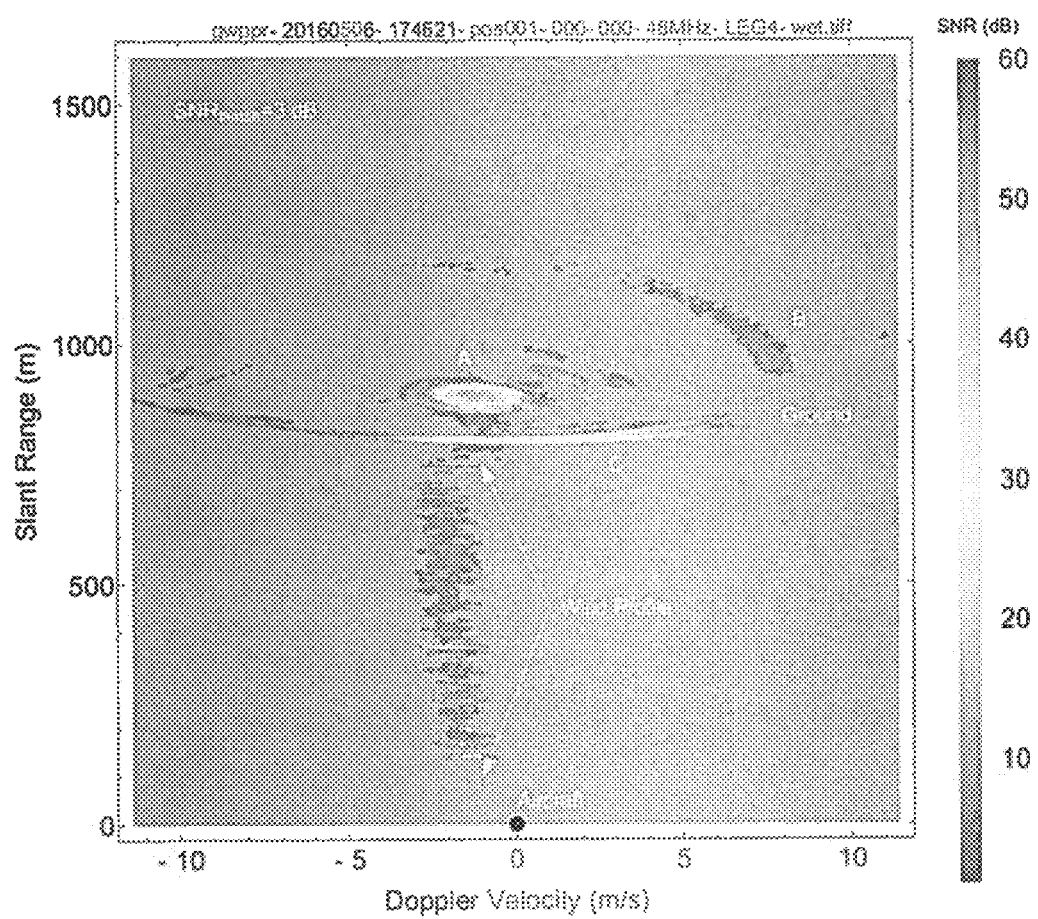
FIG. 6A is a graph depicting the measurement of a wind Doppler speed profile by the system and method shown in FIGS. 1-5 operating in a downward looking in-flight mode.
Figure 6B:
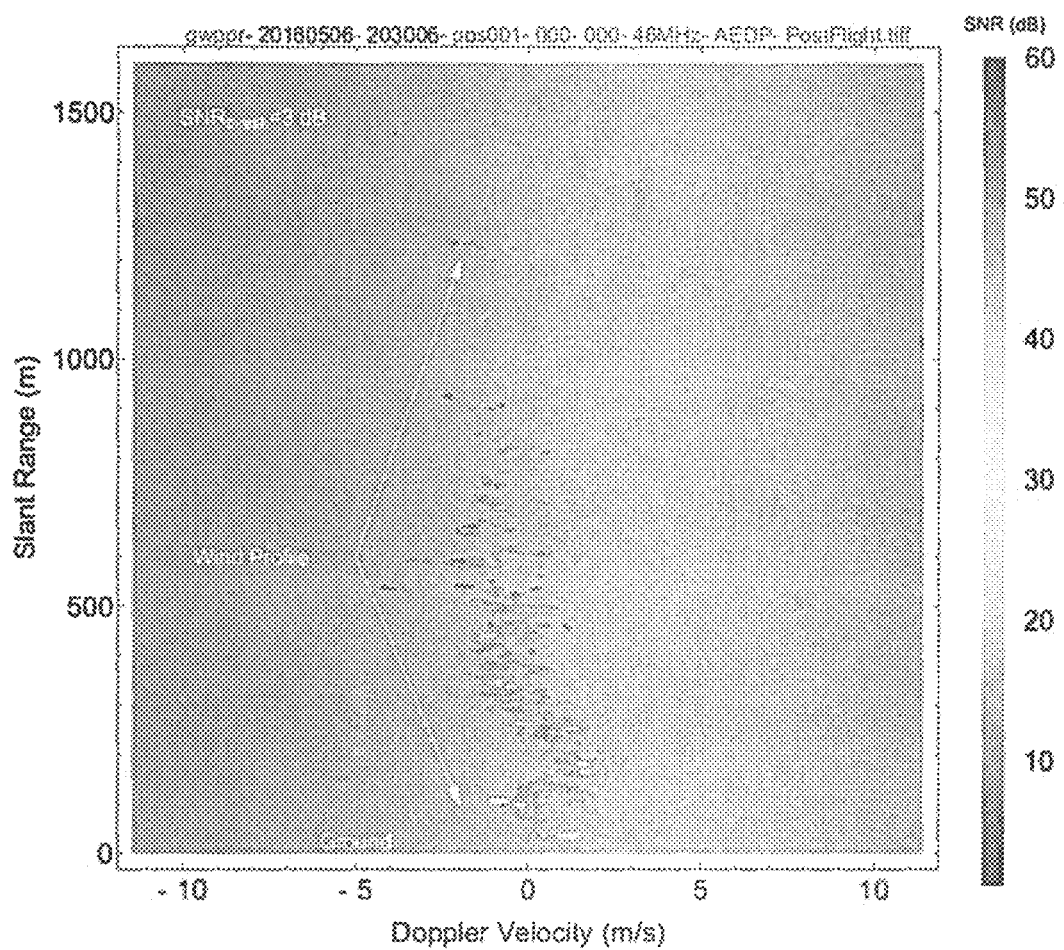

An example of the differences between RVMs formed by AWiPPR system 10 during in-flight and post-flight testing is shown in FIGS. 6A and 6B. Both of the RVMs shown contain Doppler velocity echoes from the wind profile at the measurement location but the RVM recorded during flight operations additionally contains a very strong echo from the ground denoted by A in FIG. 6A as well as echoes from sidelobes in the radar transmit-receive beam pattern denoted by B and C. Although not indicated, the Doppler wind profile contains motion effects from mobile airborne platform 12 that have not been removed. An understanding of the processing step necessary to extract useful vector wind velocity information from an RVM measured on a moving platform requires an understanding of differences in the kinematics between moving and fixed platform data collection.

FIG. 6A is a measurement of the wind Doppler speed profile with AWiPPR system 10 and the method thereof operating in a downward-looking in-flight mode. FIG. 6B depicts an upward-looking ground-based mode. The mobile airborne platform 12 is operating at an altitude of approximately 800 m. Winds above the aircraft cannot be measured with a downward-looking radar.

AWiPPR data processing of AWiPPR system 10 and the method thereof is based upon the two interrelated coordinate systems shown in FIGS. 7A and 7B. The first coordinate system of FIG. 7A is denoted by xyz. This coordinate system is fixed with respect to the mobile airborne platform 12. The x-axis runs from the tail of the mobile airborne platform 12 out through the nose of the mobile airborne platform 12 and the y-axis runs from the left wingtip of the mobile airborne platform 12 out through the right wingtip of the mobile airborne platform 12. The z-axis in the xyz coordinate system is given by the curl of the x-axis unit vector with the y-axis unit vector. Thus if the mobile airborne platform 12 is in level flight, the z-axis points straight up. The second coordinate system of FIG. 7B is denoted by XYZ. It is centered directly beneath the mobile airborne platform 12. In the second coordinate system the X, Y and Z axes respectively point in the directions east, north and vertical. The mobile airborne platform 12 roll, pitch and yaw together with the mobile airborne platform 12 vector velocity, $v_{rador} = \{u_x, u_y, u_z\}$, are measured in the XYZ coordinate system. Since radar unit 16 is affixed to the mobile airborne platform 12 the vector velocity of the mobile airborne platform 12 is preferably denoted by $v_{radar}$ rather than $v_{aircraft}$. The height of radar unit 16 above the ground is denoted by and is measured in the XYZ coordinate system. The following roll pitch and yaw angle rotation conventions may be used in the discussions below:

1. When roll is positive the right wing of the mobile airborne platform 12 will tip towards the ground.
2. When pitch is positive the nose of the mobile airborne platform 12 will tip towards the ground.
3. Yaw is the heading of the mobile airborne platform 12 measured with respect to true north. Positive yaw causes the airplane to turn to the right FIGS. 7A and 7B shows AWiPPR system 10 and the method thereof coordinate systems when (a) mobile airborne platform 12 roll, pitch and yaw are zero and (b) mobile airborne platform 12 roll, pitch and yaw are respectively 10°, 0° and 10°. The height of mobile airborne platform 12 above the ground, roll, pitch and yaw together with the radar velocity are measured in the XYZ coordinate system. The four lines shown in FIGS. 7A and 7B represent four downward looking radar beams at azimuthal locations 0°, 90°, 180° and 270° measured with respect to the xyz coordinate system.

Figure 8:
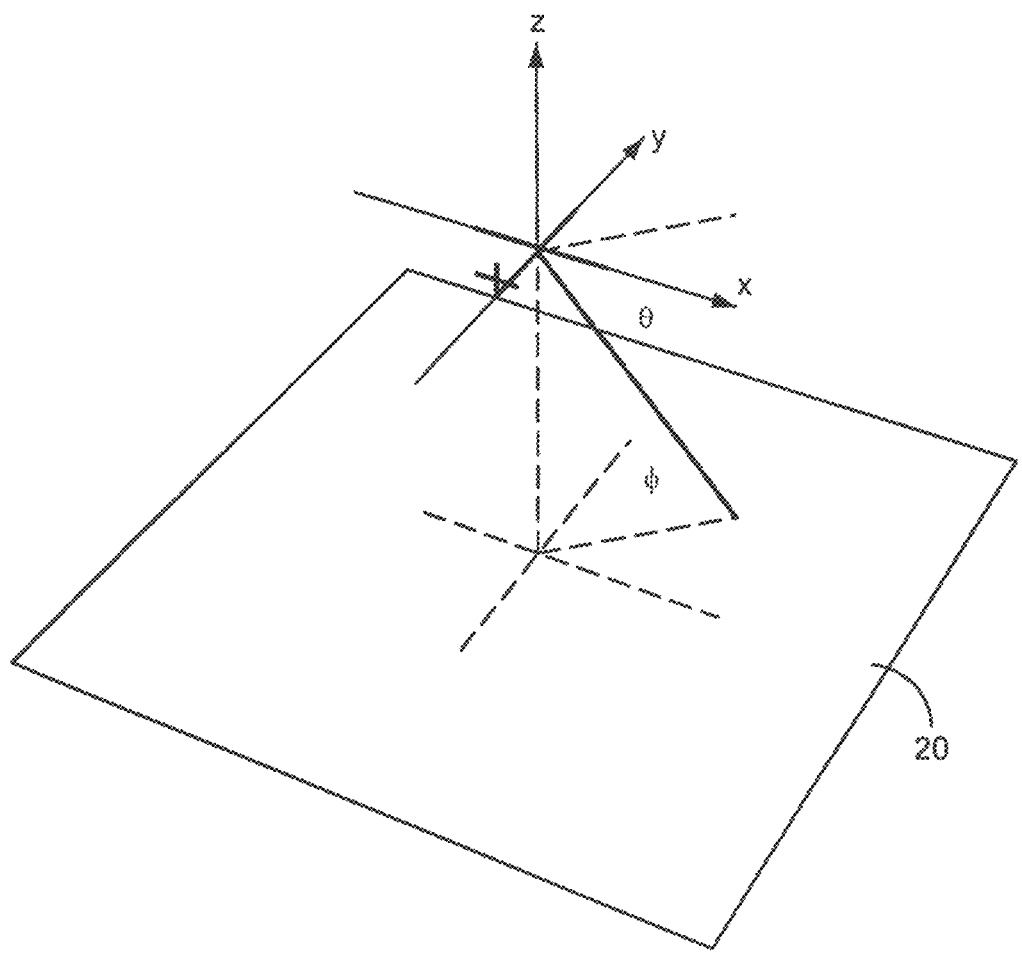
FIG. 8 depicts the radar beam pointing directions in the mobile airborne platform coordinate system.

One example of radar beam directions of radar unit 16 defined in the xyz coordinate system are shown in FIG. 8. The specific direction in which the radar beam points in the xyz coordinate system is defined by the equation:

$$\bar{n}_{beam}(\theta, \phi) = \{\cos\theta \sin\phi, \cos\theta \cos\phi, -\sin\theta\}$$

In this equation the angle $\theta$ is measured positive down with respect to the xy-plane and the angle $\phi$ is measured positive clockwise with respect to the y-axis, if the mobile airborne platform 12 undergoes roll, pitch and yaw respectively denoted by $\alpha_r$, $\beta_p$ and $\gamma_y$, then the radar beam will point in the new direction using the equation:

$$\bar{\eta}_{beam}(\alpha,\beta_p,\gamma_y,\theta,\phi)=M_{yaw}M_{pitch}M_{roll}\{\cos\theta\sin\phi, \cos\theta\cos\phi, -\sin\theta\}$$

where $M_{roll}$, $M_{pitch}$ and $M_{yaw}$ are the axis rotation matrices defined by $$M_{roll} = \begin{pmatrix} \cos\alpha_r & 0 & \sin\alpha_r \\ 0 & 1 & 0 \\ -\sin\alpha_r & 0 & \cos\alpha_r \end{pmatrix},$$

$$M_{pitch} = \begin{pmatrix} 1 & 0 & 0 \\ 0 & \cos\beta_p & \sin\beta_p \\ 0 & -\sin\beta_p & \cos\beta_p \end{pmatrix} \text{ and}$$

$$M_{yaw} = \begin{pmatrix} \cos\gamma_y & \sin\gamma_y & 0 \\ -\sin\gamma_y & \cos\gamma_y & 0 \\ 0 & 0 & 1 \end{pmatrix}$$

Each of these rotations is performed with respect to the XYZ coordinate system. Roll is performed about the Y-axis. Pitch is performed about the X-axis and yaw is performed about the Z-axis. An example of the effect of roll and pitch on the orientation of the aircraft and the radar beams is presented in FIG. 7B.

FIG. 8 shows the beam pointing directions in mobile airborne platform 12 xyz-coordinate system. The angle $\phi$ is measured positive down with respect to the xy-plane and the angle $\phi$ is measured positive clockwise with respect to the y-axis.

The use of the WBCAS radar by radar unit 16 on mobile airborne platform 12 has two primary effects on the performance of radar unit 16. First, motion of mobile airborne platform 12 produces Doppler spread in the velocity signature of a target that is proportional to the speed of the mobile airborne platform 12 times the width of the radar beam in radians. The amount of Doppler spread is independent of the direction of platform motion. Second, mobile airborne platform 12 motion shifts the observed Doppler velocity of a target echo by an amount that depends on the speed and heading of the moving mobile airborne platform 12.

There are two basic types of motions corrections that may be utilized by AWiPPR system 10 and method thereof. At low platform speeds where Doppler wrap is not an issue, the correction for mobile airborne platform 12 motion can be applied after an estimate of vector wind velocity has been made in a moving coordinate system relative to the mobile airborne platform 12. In this case the proper post-processing correction for the motion of the mobile airborne platform 12 can be found by using the following procedure. Let ($v_x$, $v_y$, $v_z$) denote the true values of wind speed in a fixed coordinate system and let ($u_x$, $u_y$, $u_z$) denote the wind speed values observed by radar unit 16 on a horizontally moving mobile airborne platform 12 with speed $v_{radar}$ and at heading $\psi_{rador}$ with respect to north. Observe that horizontal motion does not affect the measurement of the vertical component of wind speed. This implies that $u_z=v_z$. The mobile airborne platform 12 speed, i $v_{radar}$, s added to $u_y$ in order to correct for forward motion in the mobile airborne platform 12 coordinate system. The velocity vector ($u_x$, $u_y+v_{radar}$, $v_z$) is rotated in the platform coordinate system back into an EW-NS coordinate system. The result of this process is:

$$v_x=\cos\psi_{radar}\cdot u_x+\sin\psi_{radar}\cdot(u_y+v_{radar}), v_y=-\sin\psi_{radar}\cdot u_x+\cos\psi_{radar}\cdot(u_y+v_{radar}), v_z=u_z.$$

When mobile airborne platform 12 speeds exceed about 50 mph, it will be necessary to use a correction procedure that directly addresses the problem of Doppler wrap. The equation which relates the observed Doppler velocity to the velocity of the wind and radar is:

$$V_{obs}=(V_{radar}-v_{wind})\cdot\eta_{beam}$$

In principle, this equation can be rearranged into the form:

$$V_{obs}-v_{radar}\cdot\eta_{beam}=-v_{wind}\cdot\eta_{beam}$$

where all the quantities on the left-hand side of the equation are known and the only unknown quantity on the right-hand side is the vector wind velocity. The difficulty arises from the fact that the speed of the mobile airborne platform 12 will cause the observed Doppler velocity values to wrap due to the finite bandwidth effects of the radar digital processor. Due to this problem, the observed values of Doppler velocity at the radar beam level must be motion corrected before a valid estimate of the wind speed can be obtained. The correct algorithm for doing this is given by the following equation:

$$V_{obs}^{corrected}=F_{wrap}[V_{obs}-F_{wrap}(v_{radar}\cdot\eta_{beam})]=-v_{wind}\cdot\eta_{beam}$$

In this equation $V_{obs}$ is the Doppler velocity recorded by the radar signal processor, $v_{radar}$ is the vector velocity of the radar, $v_{wind}$ is the vector velocity of the wind and is the pointing direction of the radar beam. The function $F_{wrap}(V)$ is defined by the equation:

$$F_{wrap}(V)=\mod(V-V_{max},2V_{max})-V_{max}$$

where $\mod[V,V_{max}]$ denotes the modulo function on the interval (0.2 $V_{max}$) and $V_{max}$ is the maximum positive Doppler shift that can be measured by the radar's digital signal processor without producing Doppler wrap.

The action of the modulo function (mod) in the foregoing equation can best be explained by way of an example. Suppose that radar unit 16 is moving towards the north at a speed of 29 m/s and that the wind is coming from the north at −10 m/s. Further suppose that radar unit 16 is using a Fast Fourier Transform (FFT) signal processor that has an unambiguous Doppler velocity range of −11 m/s to 11 m/s. A north pointing radar beam with an elevation angle of 30 degrees will be physically presented with a Doppler shift due to the combined effects of the wind and platform motion that is equal to (29+10)cos(30 deg) which is 33.775 m/s. The actual observed Doppler shift at the output of the radar digital processor will be $V_{obs}=\mod[33.775-11, 22]-11=-10.255$ m/s. The contribution to wrapped Doppler shifting due to the motion of the radar unit 16 is given by mod[29 cos(30 deg)−11, 22]−11=3.114 m/s. If we apply this correction to the recorded Doppler velocity the result is −13.34 m/s. But this converts to mod[−13.34−11, 22]−11=8.66 m/s. If radar unit 16 were not moving then the negative of the observed Doppler velocity would be 10 cos(30 deg)=8.66 deg which agrees with the correction given by the foregoing equation.

Convenient ground based GWiPPR system typically uses four upward-looking radar beams as a basis for the estimation of vector wind velocity from beam Doppler velocity measurements. An example of an upward-looking GWiPPR type measurement is shown in FIG. 6B, based on the beam geometry shown in FIG. 9A. The beams are elevated 80° up from the horizontal and pointed in the cardinal azimuthal directions north, east, south and west (cardinal directions are not required, but are convenient). Doppler velocity data is recorded on each beam and inverted to find the vector wind velocity as a function of altitude. The actual procedure used to do this is disclosed in U.S. Pat. No. 9,310,481, incorporated herein by this reference. A perfectly valid way of doing this inversion is to take the Doppler velocity data measured on an individual beam and fit this data with a low order polynomial or a cubic spline. If this is done using a cubic spline with control points $\{z_n, f_n\}$, n=1, 2, ... N, then the relationship between the measured Doppler data $\{z_k, V_k\}$, k=1, 2, ..., K and the unknown spline abscissas $\bar{f}=\{f_1, f_2, \ldots, f_N\}^T$ is shown by equation:

$$\bar{V}_{K\times 1} = B_{K\times N} \bar{f}_{N\times 1}$$

In this equation $\bar{V}=\{V_1, V_2, \ldots, V_K\}^T$ is the vector of measured Doppler values and B is a matrix whose entries depend only on the altitudes at which Doppler velocities were measured and the type of spline used to represent the observed Doppler velocity profile. The least squares solution to this equation is $\bar{f}=(B^T B)^{-1} B^T \bar{V}$.

Figure 9B:
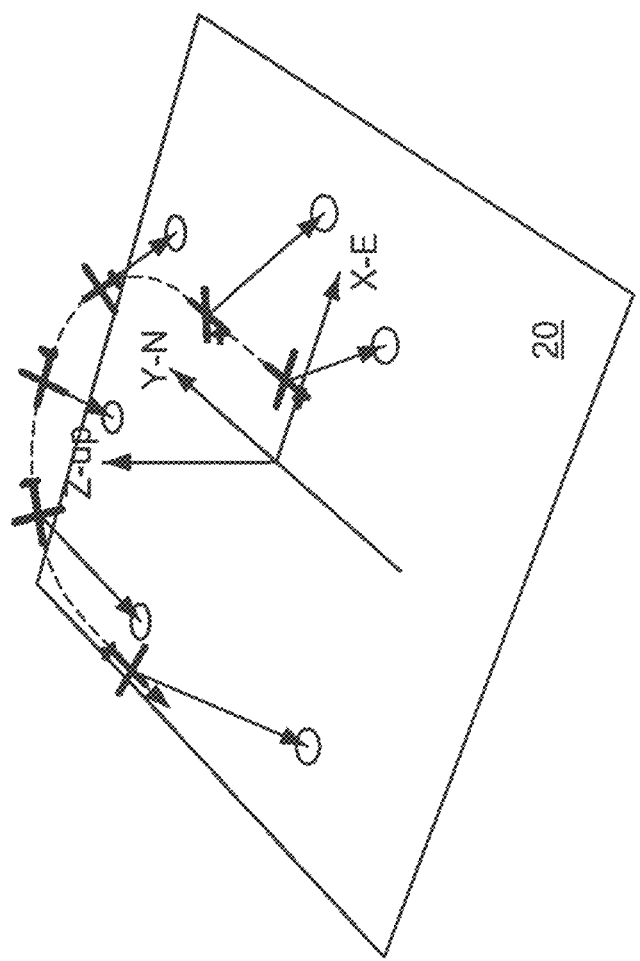
FIG. 9B shows the variation of radar beam directions during a 180° turn of a mobile airborne platform.
Figure 9A:
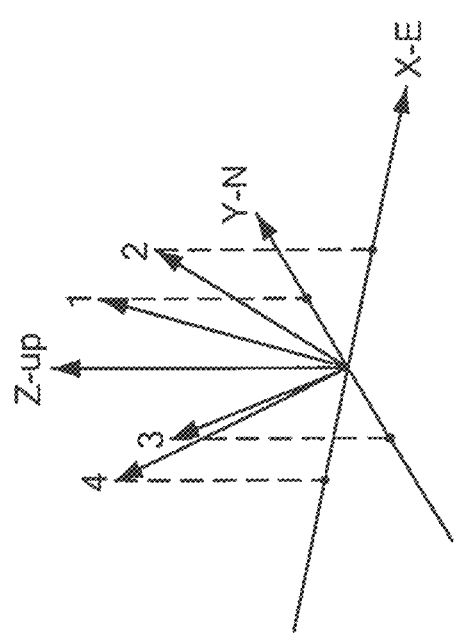
FIG. 9A depicts beam geometries in a ground based system with four upward looking beams.

If this fitting process is carried out for each of the four radar beams, then the result will be a set of four Doppler profiles $V^{(i)}(z)$, i=1, 2, 3, 4. From these four profiles the vector velocity of the wind $\bar{v}(z)=\{v_x(z), v_y(z), v_z(z)\}$ can be computed from:

$$v_x(z) = \frac{1}{2\cos\theta}[V^{(4)}(z) - V^{(2)}(z)]$$

$$v_y(z) = \frac{1}{2\cos\theta}[V^{(3)}(z) - V^{(1)}(z)]$$

$$v_z(z) = -\frac{1}{4\sin\theta}[V^{(1)}(z) + V^{(2)}(z) + V^{(3)}(z) + V^{(4)}(z)]$$

where θ is the elevation of each of the four radar beams above the horizontal. An important point here is that the spline was fitted to observed data. Both the measured data on a beam $V_k$ and the spline abscissas for that beam $f_n$ are measured in units of Doppler velocity. Additionally, the solution was enabled by the symmetry of the four beam system and the ability if necessary to monitor these beams for an extended time period in order to acquire an adequate amount of data. This approach does not extend to the AWiPPR problem because the 6 degree of freedom motion of the mobile airborne platform 12 causes a continuous variation in beam pointing directions. An example of this is shown in FIG. 9B. FIG. 9B depicts an idealized 180 deg turn of an aircraft flying at constant altitude. As mobile airborne platform 12 approaches the turn, its roll angle decreases from 0° to −30°. This drops the left wing in preparation for the circular part of the turn. During the actual turn, the mobile airborne platform 12 maintains a constant roll angle of −30° while its yaw angle smoothly changes from 0° to −180°. Upon exiting the turn, the roll angle increases from −30° to 0° with a constant yaw angle of −180°. At all times the pitch angle is 0°. The radar beam relative to the mobile airborne platform 12 is 0° of rotation and 65° of depression. The black downward pointing arrows in FIG. 9B indicate the radar beam directions at six positions along the turn. The length of these arrows is the slant range from the mobile airborne platform 12 to the ground 20.

The approach for AWiPPR system 10 and method thereof disclosed herein for addressing the complexity of the airborne measurement relative to ground measurement is based upon representing the wind vector field as a set of three coupled cubic splines and inferring (not fitting) these coefficients from the observed Doppler data over many beams and at many altitudes. Conceptually, AWiPPR system 10 and method thereof performs the following:

$$v_x(z) \Rightarrow (z_n, f_n^{(x)}),$$

$$v_y(z) \Rightarrow (z_n, f_n^{(y)}),$$

$$v_z(z) \Rightarrow (z_n, f_n^{(z)}),$$

n=1,2, ... ,N

Wherein the symbol "⇒" means 'represented by'. These three splines share the same control point abscissas but have different control point ordinates. The process that AWiPPR system 10 and the method thereof uses to infer the control point ordinates from the Doppler velocity measurements is a form of nonparametric function estimation. It is much more complicated than "fitting" a spline to data, AWiPPR system 10 and the method thereof builds upon the concept of representing a scalar function by a natural cubic spline, as discussed below.

Figure 10A:
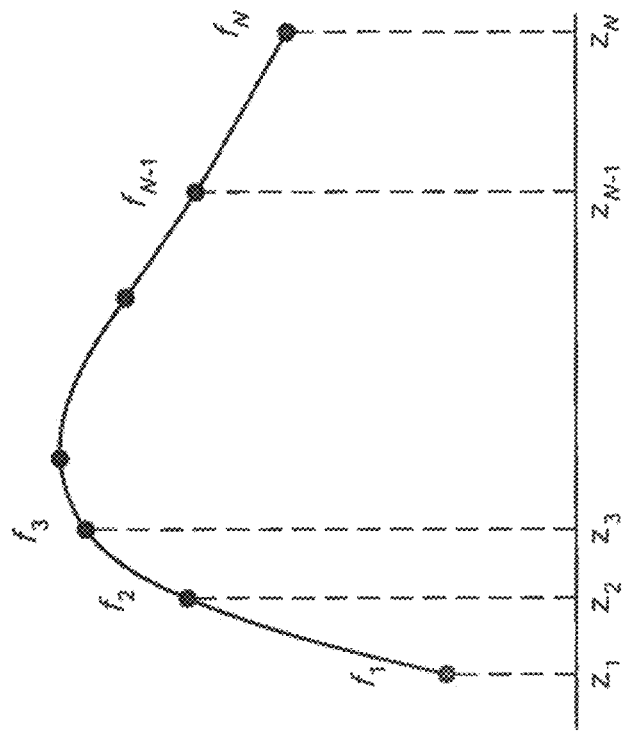
FIGS. 10A and 10B depict examples of the formation of cubic splines in accordance with the AWiPPR system disclosed herein.

The construction of a cubic spline representation for a function $f(z)$ that represents the wind Doppler velocity profile observed on a radar beam begins with representing the second derivative of $f(z)$ as a piecewise continuous linear function. In FIG. 10A as shown below, the values of the second derivative of $f(z)$ at the abscissa points $z_j$, j=1, 2, ... ,N are denoted by $m_j$ with $h_{j+1}$ defined to be $h_{j+1} = z_{j+1} - z_j$. The second derivative of this function on the interval $z_j \leq z \leq z_{j+1}$ is shown by the equation:

$$S''(z) = m_j + \frac{m_{j+1} - m_j}{h_{j+1}}(z - z_j) = \frac{z_{j+1} - z}{h_{j+1}} m_j + \frac{z - z_j}{h_{j+1}} m_{j+1}$$

In the above equation, S(z) is used as an alternate name for the cubic spline $f(z)$. Integrating S''(z) twice yields a cubic polynomial that has curvature on the interval $(z_j, z_N)$ that is less than any other twice-differential function on the interval. The results of these two integrations are shown in the FIG. 10B. The points $(z_j, f_j)$ are referred to as the control points (also called pivot points) of the spline. Application of the requirement that S(z) must pass through the points $(z_j, f_j)$ and $(z_{j+1}, f_{j+1})$ for j=2, 3, ..., N−1 leads to the representation of the cubic spline S(z) shown in the equation below:

$$S_j(z) = \frac{m_{j+1} h_{j+1}^2}{6}\left[\left(\frac{z - z_j}{h_{j+1}}\right)^3 - \left(\frac{z - z_j}{h_{j+1}}\right)\right] +$$

$$\frac{m_j h_{j+1}^2}{6}\left[\left(\frac{z_{j+1} - z}{h_{j+1}}\right)^3 + \left(\frac{z - z_j}{h_{j+1}}\right) - 1\right] + f_{j+1}\left(\frac{z - z_j}{h_{j+1}}\right) + f_j\left(\frac{z_{j+1} - z}{h_{j+1}}\right)$$

At this point the spline pivot abscissas, $z_j$, and their spacings, $h_j$, are assumed to be known. The values of the pivot point ordinates $f_j$ and their second derivatives, $m_j$, remain to be related to one another. Continuity of the first derivative of S(z) at the points $(z_j, f_j)$ for j=2, 3, ..., N−1 supplies N−2 equations. The additional requirement, that the second derivative of S(z) is zero at $z_i$ and $z_N$, supplies an additional two equations. This choice produces a form of spline that is referred to as a natural spline. Natural splines are terminated at inflection points.

Figure 10B:
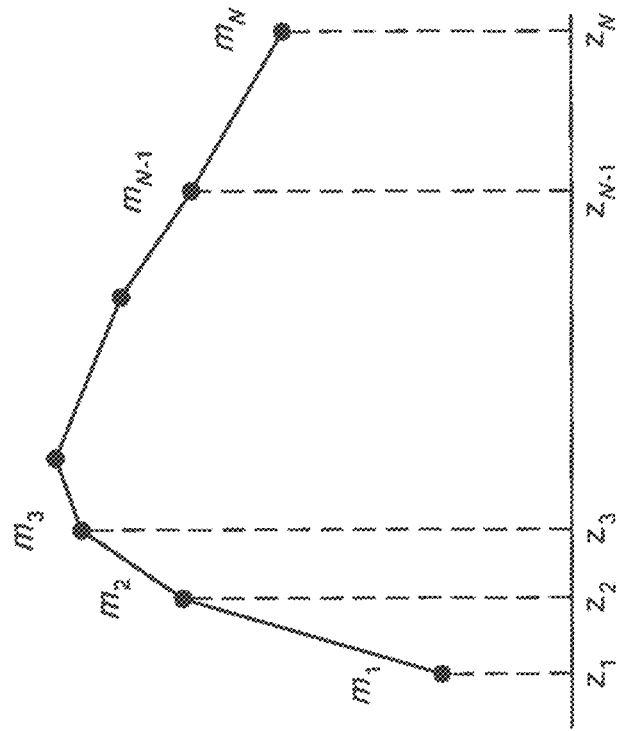

FIGS. 10A and 10B show the formation of a cubic spline. FIG. 10A shows the second derivative of the function f(z), and FIG. 10B shows the function f(z).

At this point the following information about the cubic spline $f(z)$:

$$m_1 = 0$$

$$\frac{h_j}{6}m_{j+1} + \frac{h_j + h_{j+1}}{3}m_j + \frac{h_{j+1}}{6}m_{j+1} = \frac{f_{j+1} - f_j}{h_{j+1}} - \frac{f_j - f_{j+1}}{h_j},$$

$$j = 2, 3, \ldots, N-1$$

$$m_N = 0$$

This system of equations can be written in matrix format:

$$M_{N \times N} m_{N \times 1} = F_{N \times N} f_{N \times 1}$$

where the vector $m = \{m_1, m_2, \ldots, m_N\}^T$ and the vector $f$ of pivot point ordinates is $f = \{f_1, f_2, \ldots, f_N\}^T$. The sampling matrices M and F are defined via:

$$M_{N \times N} = \frac{1}{6}\begin{bmatrix} 2h_2 & 0 & 0 & 0 & \ldots & \ldots & 0 \\ h_2 & 2(h_2 + h_3) & h_3 & 0 & 0 & & \\ & h_3 & 2(h_3 + h_4) & h_4 & 0 & \ldots & 0 \\ 0 & \ldots & \ldots & 0 & h_{N-1} & 2(h_{N-1} + h_N) & h_N \\ 0 & 0 & 0 & 0 & \ldots & 0 & 2h_N \end{bmatrix}$$

and $$F_{N \times N} = \begin{bmatrix} 0 & 0 & 0 & 0 & \ldots & \ldots & 0 \\ \frac{1}{h_2} & -\frac{h_2 + h_3}{h_2 h_3} & \frac{1}{h_3} & 0 & 0 & & \\ 0 & \frac{1}{h_3} & -\frac{h_3 + h_4}{h_3 h_4} & \frac{1}{h_4} & 0 & \ldots & 0 \\ 0 & \ldots & \ldots & 0 & \frac{1}{h_{N-1}} & -\frac{h_{N-1} + h_N}{h_{N-1} h_N} & \frac{1}{h_N} \\ 0 & 0 & 0 & 0 & \ldots & 0 & 0 \end{bmatrix}$$

The matrix $M_{N \times N}$ is nonsingular and has an inverse. The existence of this inverse allows us to write the vector $m$ of second derivative values of the spline $f(z)$ in the form of the equation:

$$m_{N \times 1} = M_{N \times N}^{-1} F_{N \times N} f_{N \times 1}$$

The remaining step in the application of a spline to a practical problem is to determine the unknown spline ordinate points $f = \{f_1, f_2, \ldots, f_N\}^T$ from a set of altitude-velocity data points $(\xi_i, V_i)$ for $i = 1, 2, \ldots, N_d$ where $N_d$ denotes the number of data points. To do this a set of spline abscissa values $\{z_1, z_2, \ldots, z_N\}$ is chosen. There are three requirements constraining this choice. First of all the minimum spline abscissa value, $z_1$, must be equal to the minimum of the data, $\xi_i$, values. Second the maximum spline abscissa value must be equal to the maximum of the data, $\xi_i$, values. Finally, each of the abscissa intervals $(z_j, z_{j+1})$ must be populated by at least one of the data abscissa values $\xi_i$.

If the observed data abscissa $\xi_i$ lies in the spline abscissa interval $(z_j, z_{j+1})$ and if the spline $f(z)$ defined by the pivot points $(z_i, f_i)$ represents a good fit to the observed data then it should be approximately true that:

$$V_i = \frac{m_{j+1} h_{j+1}^2}{6}\left[\left(\frac{\xi_i - z_j}{h_{j+1}}\right)^3 - \left(\frac{\xi_i - z_j}{h_{j+1}}\right)\right] +$$
$$\frac{m_j h_{j+1}^2}{6}\left[\left(\frac{z_{j+1} - \xi_i}{h_{j+1}}\right)^3 + \left(\frac{\xi_i - z_j}{h_{j+1}}\right) - 1\right] + f_{j+1}\left(\frac{\xi_i - z_j}{h_{j+1}}\right) + f_j\left(\frac{z_{j+1} - \xi_i}{h_{j+1}}\right)$$

But since it is the case that $m = M^{-1} Ff$, it follows that the measured value $V_i$ can be written in the form $V_i = b_{i1} f_1 + b_{i2} f_2 + \ldots + b_{iN} f_N$ where the coefficients $b_{ij}$ depend only on the $\xi_i$ and $z_j$. This leads at once to the following matrix equation:

$$V_{N_d \times 1} = B_{N_d \times N} f_{N \times 1}$$

The foregoing equation represents the forward relationship between observed scalar velocity data and the natural cubic spline that represents the data. If the number of data points is such that $N_d > N$ then the system of equations is over determined. If the square matrix $B^T B$ is not ill-conditioned then the least squares solution to the set of over-determined equations is given by the equation:

$$f_{N \times 1} = (B_{N_d \times N}^T B_{N_d \times N})^{-1} B_{N_d \times N}^T V_{N_d \times 1}$$

The relationship between the observed Doppler velocity of a clear air scatter echo, the velocity of the radar and the velocity of the wind is found using the equation:

$$U_i = (v_{rador} - v_{wind}) \overline{\eta}_{beam}(\alpha_i, \beta_i, \gamma_i, \theta_i, \phi_i) = (v_{rador} - v_{wind}) \overline{\eta}_i$$

where $i$ is an index that runs across all the observed data. This equation results from computing the negative of the time rate of change of the length of the radar ray path from radar unit 16, FIGS. 1 and 4, to the CAS targets 24, FIG. 1, or volumetric targets 26, and back to radar unit 16. If the data has been motion compensated this equation becomes:

$$V_i = -v_{wind} \overline{\eta}_i = \{\eta_i^{(x)} v_x, \eta_i^{(y)}, \eta_i^{(z)} v_z\}$$

where $\overline{\eta}_i = \{\eta_i^{(x)}, \eta_i^{(y)}, \eta_i^{(z)}\}$. The three scalar components of the vector wind velocity $\{v_x, v_y, v_z\}$ can be respectively represented by the splines $(z_j, f_j^{(x)}, (z_j, f_j^{(y)})$ and $z_j, f_j^{(z)})$ where $j = 1, 2, \ldots, N$. In light of the information matrix B defined previously, $$V_i = -\eta_i^{(x)}(b_{i1} f_1^{(x)} + \ldots b_{iN} f_N^{(x)}) - \eta_i^{(y)}(b_{i1} f_1^{(y)} + \ldots b_{iN} f_N^{(y)}) - \eta_i^{(z)}(b_{i1} f_1^{(z)} + \ldots b_{iN} f_N^{(z)}).$$

The preceding equation can be written in the vector-matrix form:

$$V_{N_d \times 1} = A_{N_d \times 3N} f_{3N}$$

where $f = \{f_1^{(x)}, \ldots, f_N^{(x)}, f_1^{(y)}, \ldots, f_N^{(y)}, f_1^{(z)}, \ldots, f_N^{(z)}\}^T$ is the vector of unknown spline coefficients and $V = \{V_1, \ldots, V_{N_d}\}^T$ is the vector of measured Doppler velocity values.

If the square matrix $A^T A$ is not ill conditioned, then the unknown spline coefficients in a least squares sense are given by $f_{1S} = (A^T A)^{-1} A^T V$.

To avoid this potential difficulty, the spline functions $f^{(x)}(z)$, $f^{(y)}(z)$ and $f^{(z)}(z)$ have either smooth first or second derivatives. This assumption implies that the prior probability density of the unknown spline coefficients f can be written in the form $$p(f \mid \mu) = \frac{1}{Z(\mu)} \exp\left(-\frac{\mu}{2} f_{3N \times 1}^T P_{3N \times 3N} f_{3N \times 1}\right)$$

where $Z(\mu)$ is a normal constant and $\mu$ is a hyper-parameter that can be estimated from the radar data and the IMU data disclosed above. For the special case of N=4 equally spaced pivot points per spline and a first derivative smoothness prior $P_{3N \times 3N}$ takes the form:

$$P_{12 \times 12} = \frac{1}{h}\begin{bmatrix} 2+\varepsilon & -2 & 0 & 0 & 0 & \ldots & 0 \\ -2 & 4+\varepsilon & 2 & 0 & 0 & \ldots & 0 \\ 0 & -2 & 4+\varepsilon & -2 & 0 & \ldots & 0 \\ 0 & \ldots & 0 & 0 & -2 & 4+\varepsilon & -2 \\ 0 & \ldots & \ldots & \ldots & 0 & -2 & 2+\varepsilon \end{bmatrix}$$

where h is the constant spacing between the pivot point abscissas and ε is a small positive number that will eventually scale out in the analysis that follows. The normalization constant $Z(\mu)$ is defined by:

$$Z^{-1}(\mu) = \left(\frac{\mu}{2\pi}\right)^{3N/2}\left(\varepsilon\prod_{n=1}^{3N-1}\lambda_n\right)^{1/2}$$

where $\lambda_1, \lambda_2, \ldots, \lambda^{3N-1}$ are the nonzero eigenvalues of the first derivative smoothing matrix P with ε set to zero.

The likelihood of obtaining the data set $V=\{V_1, V_2, \ldots, V_{N_d}\}$ is equal to the product of the likelihood of the individual data samples, From this it follows that:

$$P(D|\sigma, f) = \prod_{i=1}^{N_d} \frac{1}{\sqrt{2\pi\sigma^2}}\exp\left[-\frac{1}{2\sigma^2}\left(V_i - \sum_{n=1}^{3N} a_m f_n\right)^2\right]$$

where the symbol D denotes the data set $V=\{V_1, V_2, \ldots, V_{N_d}\}$ and σ is the noise associated with the measurement of Doppler velocity. In the analysis that follows it will be convenient to make the change of variable $\beta=1/\sigma^2$ where β is the precision of the noise. Large precision equates to small noise and vice versa. Assuming that the noise parameter β is unknown and that both μ and β need to be determined from the data D. The shorthand vector-matrix form of $P(D|\beta,f)$ is:

$$P(D|\beta, f) = \frac{1}{Z_D(\beta)}\exp\left[-\frac{\beta}{2}(V-Af)^T(V-Af)\right]$$

where $Z_D(\beta)$ is the normalization constant $Z_D(\beta)=(2\pi/\beta)^{N_d/2}$.

Bayes theorem enables the posterior distribution of the unknown pivot points f is be written in the form:

$$P(f|D, \mu, \beta) = \frac{\text{likelihood} \times \text{prior}}{\text{evidence}} = \frac{P(D|f,\beta)P(f|\mu)}{P(D|\mu,\beta)}$$

where $P(D)|\mu,\beta)$ is referred to as the evidence. The posterior probability distribution for the spline coefficients can be written in the form:

$$P(f|D, \mu, \beta) = \frac{\exp\left[-\frac{1}{2}\Phi_M(f,\mu,\beta)\right]}{Z(\mu,\beta)}$$

where $$\Phi_M(f,\mu,\beta) = \mu f^T P f + \beta(V-Af)^T(V-Af)$$

is a model representing the combined effects of smoothing and data-spline representation mismatch. The normalization coefficient $Z(\mu,\beta)$ is:

$$Z(\mu,\beta)=\int_{-\infty}^{\infty}\exp[-\frac{1}{2}\Phi_M(f,\mu,\beta)]d^{3N}f$$

Since $\Phi_M(f,\mu,\beta)$ is quadratic in the spline coefficient vector f it follows that:

$$\Phi_M(f,\mu,\beta)=\mu f^T P f+\beta(f-f_{ML})^T Q(f-f_{ML})+\beta R_{ML}$$

where $Q=A^T A$ is the 3N×3N spline precision matrix and $f_{ML}$ is the set of spline coefficients that minimize the squared summed differences between the data V and the model Af. Since minimizing the difference between the data and the model is equivalent to maximizing the likelihood, the spline coefficients $f_{ML}$ are referred to as the maximum likelihood estimate of f. The quantity $R_{ML}$ denotes the maximum likelihood residual sum of squares and is defined by the equation:

$$R_{ML}=(V-Af_{ML})^T(V-Af_{ML})$$

An alternate relation of the smoothing data-spline representation model $\Phi_M(f,\mu,\beta)$ is:

$$\Phi_M(f,\mu,\beta)=(f-f_{MP})^T H(f-f_{MP})+R_{MP}$$

where $f_{MP}$ denotes the most probable set of spline coefficients, H is the precision matrix of the posterior distribution of the spline coefficients f, and $R_{MP}$ is a residual term that is the posterior analogy to $R_{ML}$. Equating terms in the second power of f between the two representations leads to:

$$H=\mu P+\beta Q$$

Equation terms in the first power of f gives:

$$Hf_{MP}=\beta A^T Af_{ML}=\beta A^T V, f_{MP}=\beta H^{-1}A^T V$$

Evaluation of the two representations of $\Phi_M(f,\mu,\beta)$ at $f=f_{MP}$ produces:

$$R_{MP}(\mu,\beta)=\Phi_M(f_{MP},\mu,\beta)=\mu f_{MP}^T P f_{MP}\beta|V-Af_{MP}|^2$$

With these normalizations in hand the normalization function $Z(\mu,\beta)$ can now be written as the Gaussian integral:

$$Z(\mu,\beta)=\exp[-\frac{1}{2}\Phi_M(f_{MP},\mu,\beta)]\int_{-2\beta}^{\infty}\exp[-\frac{1}{2}(f-f_{MP})^T H(f-f_{MP})]d^{3N}f$$

By way of an analogy to a multidimensional Gaussian distribution we can now write:

$$Z(\mu,\beta)=\exp[-\frac{1}{2}\Phi_M(f_{MP},\mu,\beta)]|\det(H)|^{-1/2}$$

A simple rearrangement of terms in the Bayes' formula leads to the following representation for the evidence:

$$P(D|\mu,\beta) = \frac{P(D|f,\beta)P(f|\mu)}{P(f|D,\mu,\beta)} = \frac{Z(\mu,\beta)}{Z(\mu)Z_D(\beta)}$$

If we substitute our definitions for the three normalization functions $Z(\mu)$, $Z_D(\beta)$ and $Z(\mu,\beta)$ into the above formula and discard constants that do not depend on μ or β then we obtain the following representation for the evidence $P(D|\mu,\beta)$ $$P(D|\mu,\beta) = \frac{\left(\mu^{3N/2}\exp\left[-\frac{1}{2}\mu f_{MP}^T P f_{MP}\right]\right)\left(\beta^{N_d/2}\exp\left[-\frac{1}{2}\beta|V-Af_{MP}|^2\right]\right)}{\det(\mu P+\beta A^T A)^{1/2}}$$

where the most probable set of pivot points is defined by:

$$f_{MP}=\beta(\mu P+\beta A^T A)^{-1}A^T V$$

The left hand factor in the numerator of our representation for the evidence is of the form $\mu^{3N/2}\exp(-C_0\mu)$ where $C_0$ is a positive constant that depends on the spacing of the pivot points but not upon their ordinate values. As $\mu \to 0$ or as $\mu \to \infty$ the left-hand factor goes to zero and has maximal value at the solution to the equation $\mu^{3N/2-1}\exp(-C_0\mu)=0$. The right-hand factor in the numerator of our evidence representation is of the form $\beta^{N_d/2}\exp(-C_1\beta)$ where $C_1$ is a positive constant that depends upon the mismatch between the data V and the forward model $Af_{MP}$ as characterized by the distance $|V-Af_{MP}|^2$. As $\beta \to 0$ or as $\beta \to \infty$ the right-hand factor goes to zero and has maximal value at the solution to the equation $\beta^{N_d 2-1}\exp(-C_1\beta)=0$. Coupling between smoothness $\mu$ and noise precision $\beta$ is controlled by the factor $\det(\mu P+\beta A^T A)^{1/2}$.

The preceding two equations can be numerically solved to find the values of the smoothing parameter $p$ and the noise parameter $\beta$ that maximize the evidence $P(D|\mu,\beta)$. If we denote these two values by $\mu_E$ and $\beta_E$ then our final estimate of the spline ordinates is:

$$f_E=\beta E(\mu_E P+\beta_E A^T A)^{-1}A^T V$$

Figure 11A:
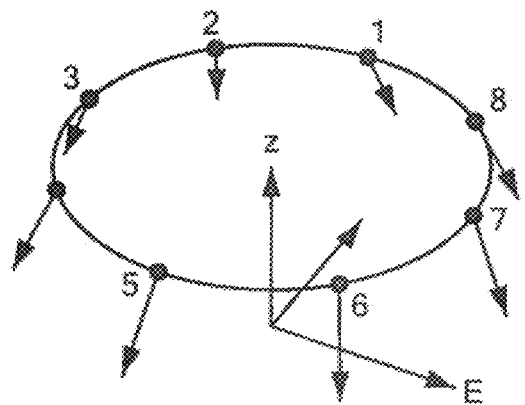
FIG. 11A shows the path of a mobile airborne platform conducting a 20° bank left turn.
Figure 11B:
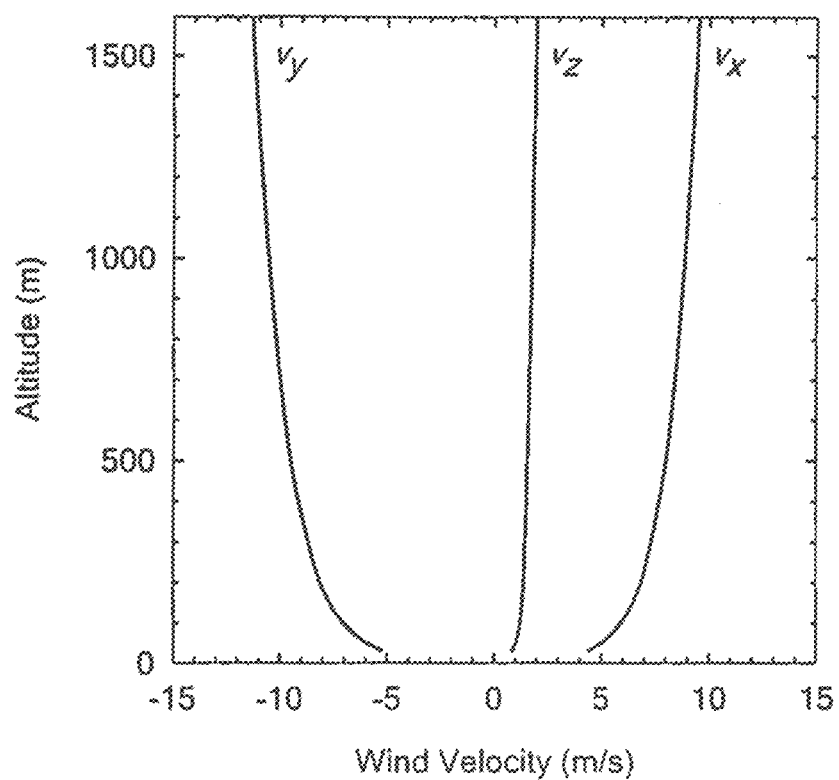
FIG. 11B shows the vector wind velocity profile used in a simulation.
Figure 11C:
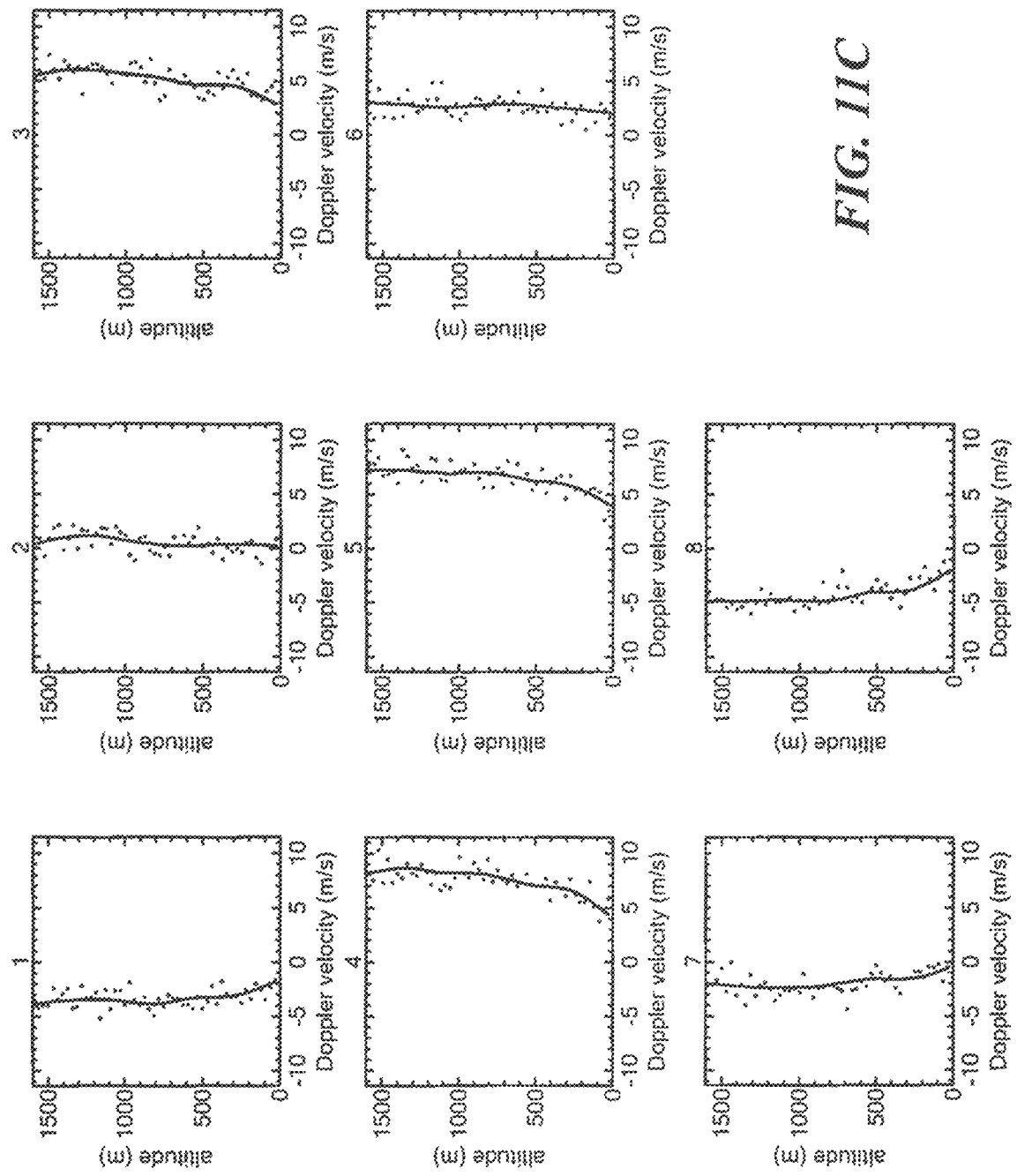
FIG. 11C shows simulation data for each of the eight beams generated by the AWiPPR airborne wind profiling system and method disclosed herein.

If $\det(\beta_E A^T A)$ is large in comparison to $\det(\mu_E P)$ then the resulting estimate for the pivot points of the spline is just the least squares solution, The following wind example is based upon simulated AWiPPR data, An example using actual airborne data collected with the AWiPPR system 10 and the method thereof is presented later. The scenario considered here is vector wind velocity measurement with an AWiPPR system collected during a time period when the aircraft is conducting a 20 deg banked left turn as shown in FIG. 11A. The points labeled 1-8 indicate the aircraft position at 8 equally spaced positions on the turning path that is indicated by the circle. The dashed lines indicate mobile airborne platform 12 position with respect to a fixed ground based coordinate system in which vector wind velocity is measured. The mobile airborne platform 12 is using a single-beam radar system with beam steering direction specified by $\phi=135$ deg and $\theta=80$ deg as described above. The radar-beam directions are indicated by the arrows. The vector wind velocity profile used in the simulation is shown in FIG. 11B. The wind profiles extend up from the ground to a maximum elevation of 1600 m. The simulated data for each of the eight beams is shown in FIG. 11C. This data has been generated by assuming that beam Doppler velocity measurements have a normally distributed random error with a standard deviation of $\sigma=0.85$ m/s. The curves shown in FIG. 10C are not fits to the beam data. They have been computed by finding the least squares solution $f_{LS}=(A^T A)^{-1}A^T V$ and projecting this solution onto each of the 8 beam directions shown in FIG. 10A. In computing the least squares solution the number of pivot points for each velocity component has been chosen to be $N=7$ for a total $3N=21$ pivot points.

Figure 12A:
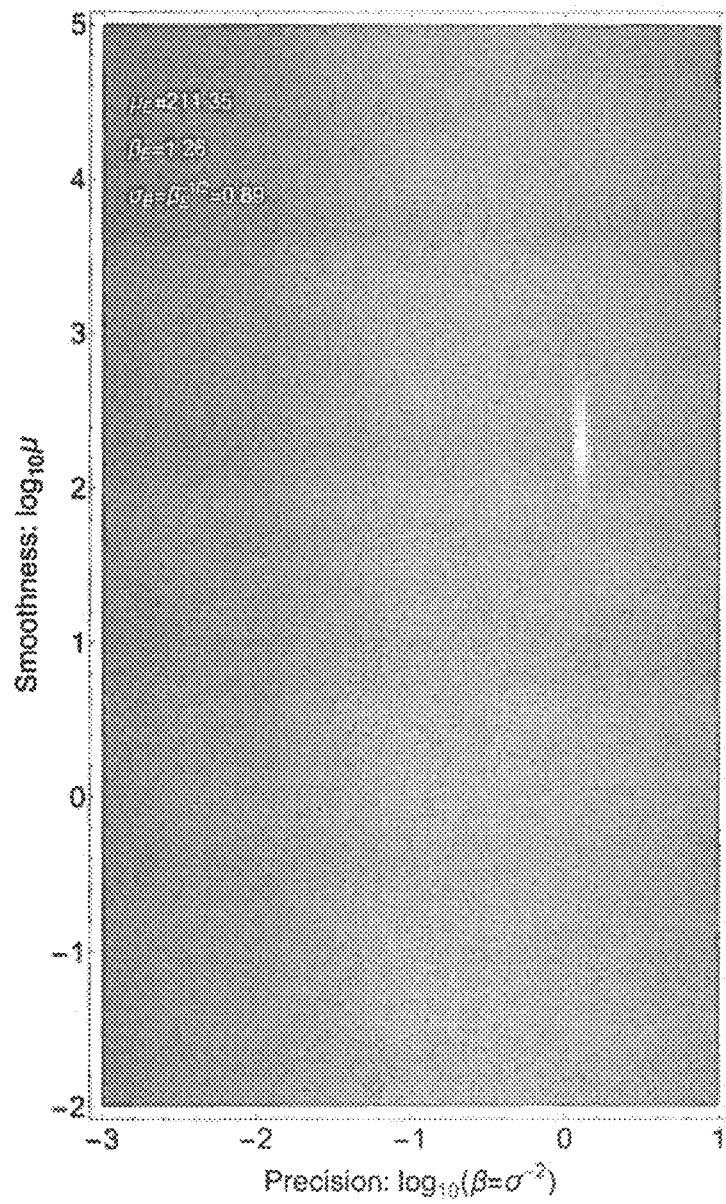
FIG. 12A shows the results from the maximization of the evidence of the function of the smoothing scale and noise precision.
Figure 12B:
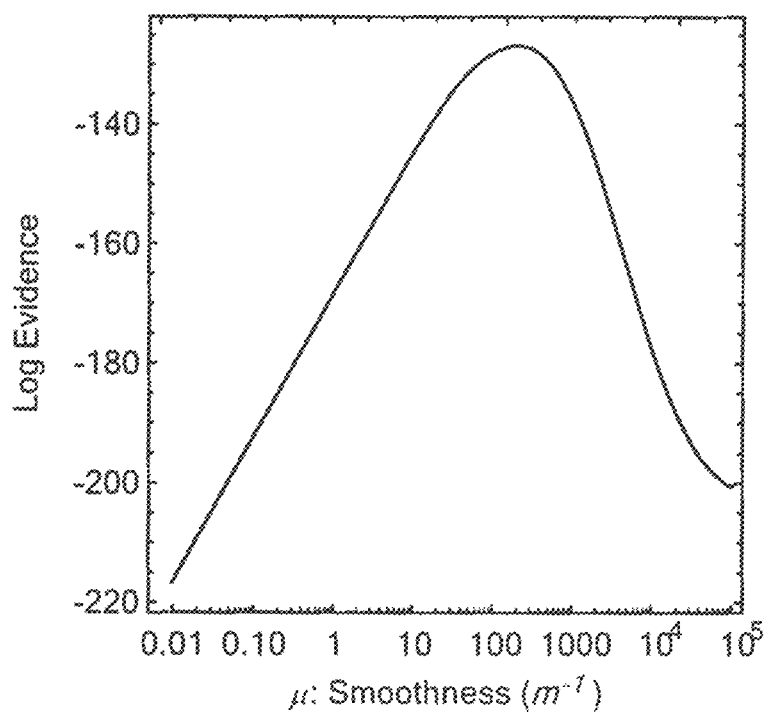
FIGS. 12B and 12C depicts slices across the evidence surface shown in FIG. 12A.

FIGS. 12A and 12B shows evidence maximization for the 20 degree banked turn test case. FIG. 12A shows the results from the maximization of the evidence as a function of the smoothing scale $\mu$ and noise precision $\beta$.

Figure 12C:
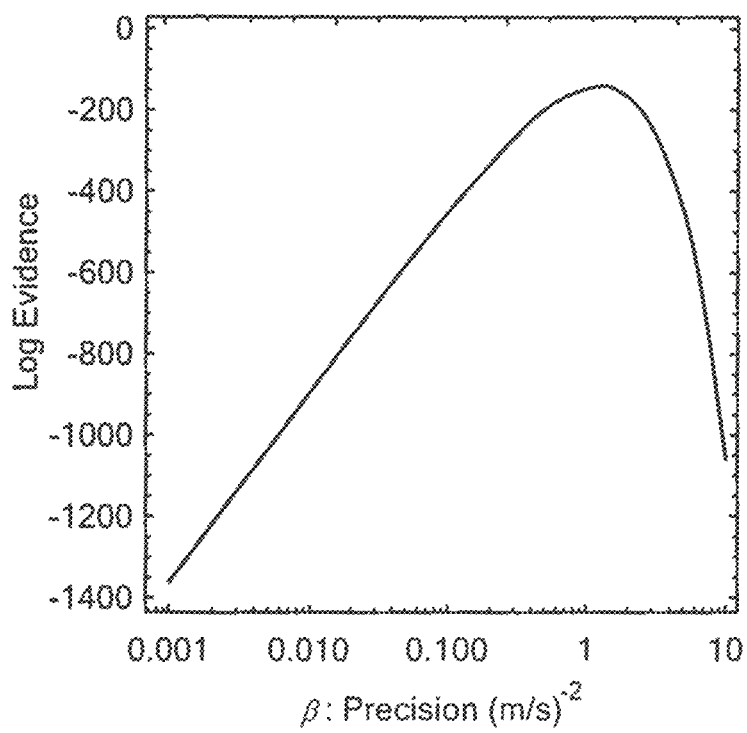
Figure 13:
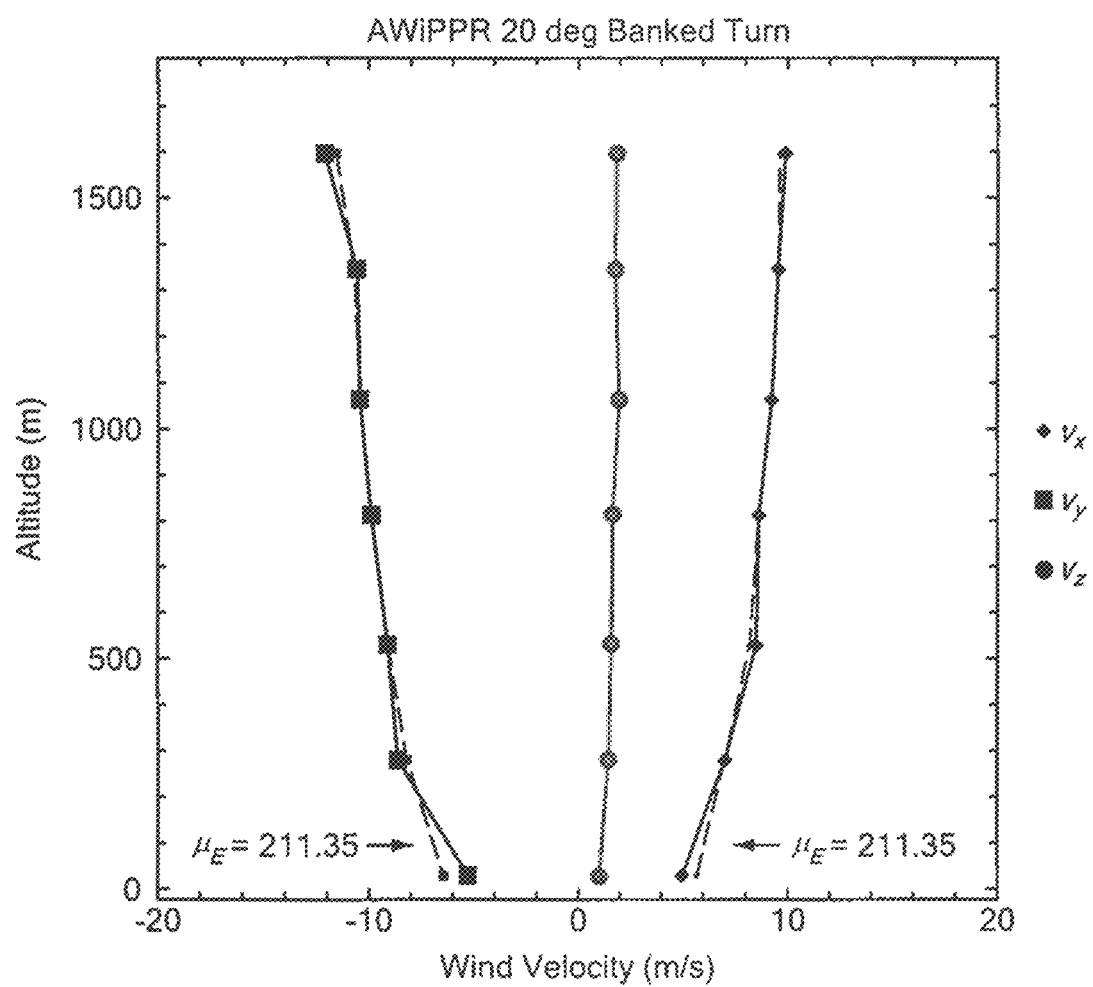
FIG. 13 depicts the least squares and maximum evidence of estimates of vector wind velocity with a 20° bank turn test case shown in FIG. 11A.
Figure 14:
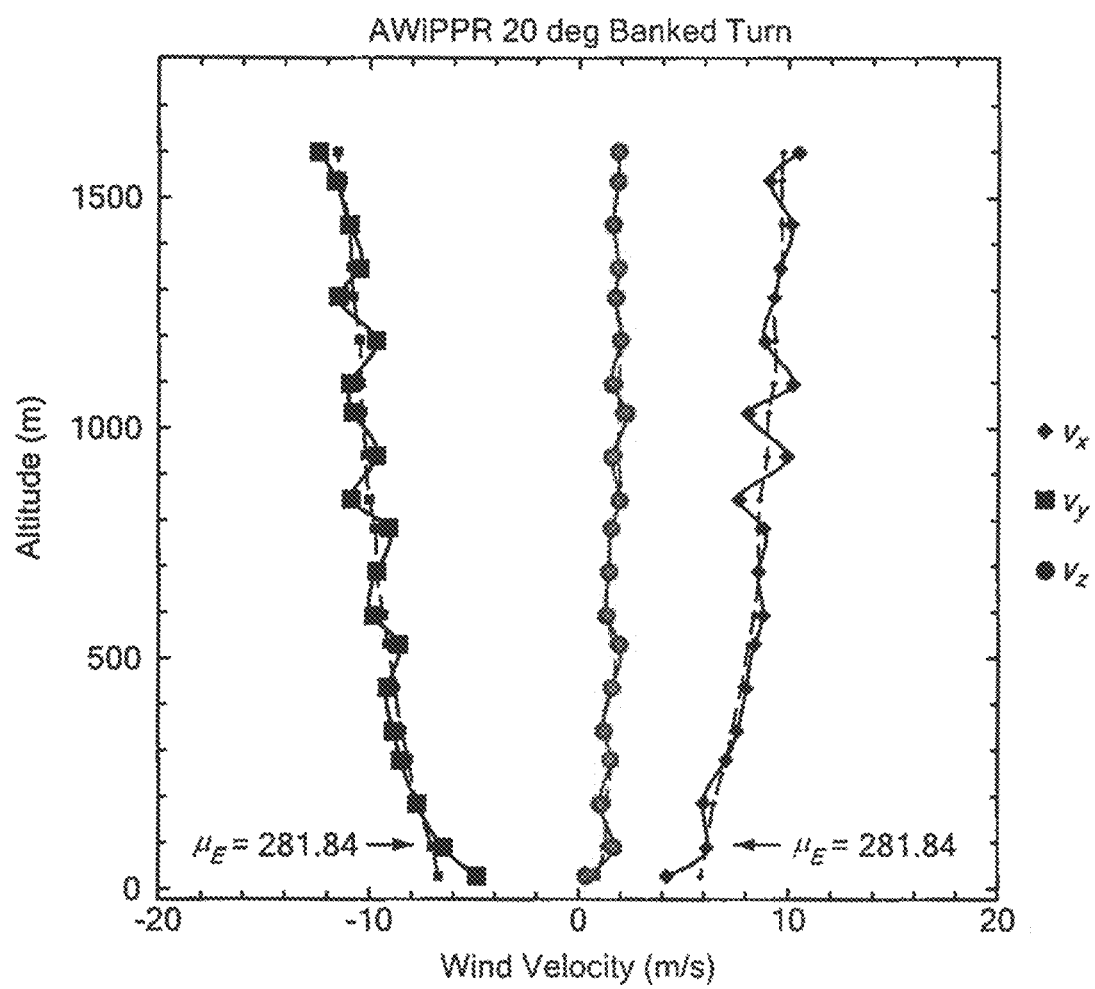
FIG. 14 shows the effects of spline over fitting for the 20° hank turn test case.

The evidence is maximized by using $\mu_E=211.35$ and $\beta_E=1.26$. This value of $\beta$ corresponds to $\sigma_E=0.89$ m/s which is very close to the 0.85 values used to generate the simulated data. Slices across the evidence surface shown in FIG. 12A are shown in FIGS. 12B and 12C. The ordinate for each of these plots is log evidence. FIG. 13 compares the ground truth vector wind velocity to the estimated values produced by the nonparametric function estimation process. The curves are the ground truth vector wind velocity profiles from FIG. 11B. The least squares solutions in the x, y and z directions are indicated by the larger dots. The smooth spline solution at intermediate points has been plotted on top of the larger dots as a solid line of corresponding color. The smaller dots represent the solution from the maximum evidence procedure. The smaller dots are connected by dashed lines representing the spline solution at intermediate points between the maximum evidence pivot points. A close look reveals the dashed lines resulting from the evidence maximization procedure are slightly better centered over the ground truth plots. FIG. 14 shows the effect of changing from $N=7$ to $N=20$ pivot points. Now the value of the evidence maximization procedure shows itself. The least squares solution is highly oscillatory as a result of overrating the data. Evidence maximization corrects this problem.

FIG. 13 shows least squares and maximum evidence estimates of vector wind velocity for the 20 degree banked turn test case, FIG. 14 show the effects of spline overfitting for the 20 degree banked turn test case.

The electronics of AWiPPR system 10 are designed to be sensitive enough to see the temperature of the cold sky and they have the capacity to measure the angular variation of sky temperature caused by the decrease of radar absorption with increasing altitude. When radar unit 16 is upside down it sees the warm earth and additionally receives backscattered energy from the ground. It is this latter factor that is now discussed here.

Backscattered energy from the ground is governed by a clutter form of the familiar radar equation and is proportional to the dimensionless backscatter coefficient $\sigma_0(\theta)$ where $\theta$ is the angle of incidence of the radar beam with respect to the vertical. The quantity $\sigma_0(\theta)$ represents the fraction of incident power of a scattering surface element of area that is scattered back to the radar receiver and as such it is a dimensionless quantity.

Figures 15A, 15B:
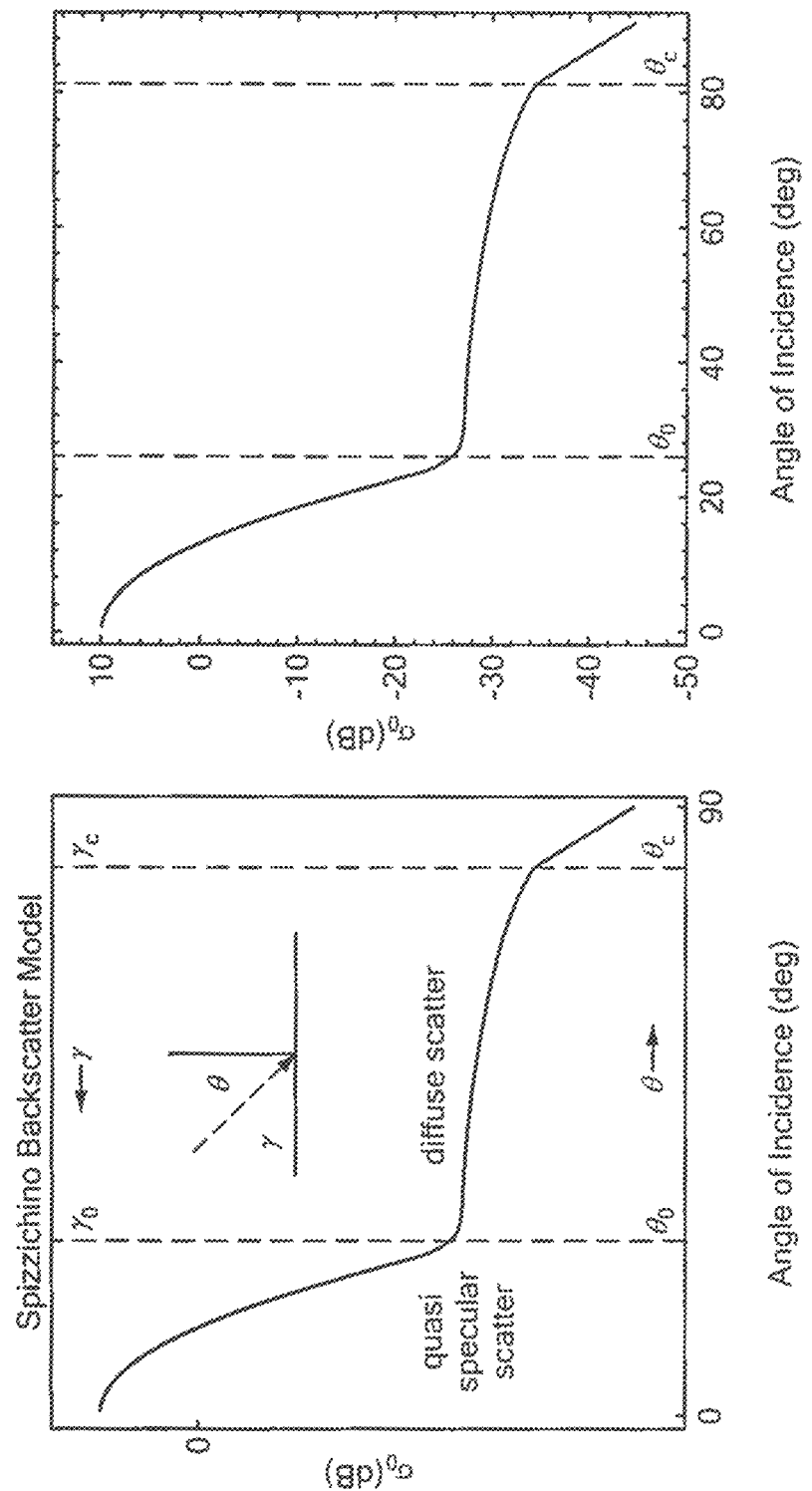
FIGS. 15A-15B depict the Beckmann-Spizzichino back scatter model used in the processing of the reflected radar signal in some examples of the invention.

Beckmann and Spizzichino (1987) developed a scattering model that has proven to be effective at describing radar back scattering for various frequency-bands including the Ka band that the AWiPPR radar operates in. Various authors including Blake (1991), Campbell (2002), Barton (2013) and Rees (2013) have expanded and augmented the Beckmann-Spizzichino model but the basic form has remained essentially the same. The essence of the model is that dependence of the backscatter coefficient $\sigma_0(\theta)$ on $\theta$ can be divided into three angular regions. The first angular region begins at normal incidence ($\theta=0$) and extends out a few tens of degrees. It is a region of quasi-specular scattering. Backscatter in this region can be quite high and can strongly couple to the radar via sidelobes. Smoother surfaces produce high peak backscatter levels at normal incidence but with angular decay with increasing $\theta$ that is much more rapid. Beyond this first region is a plateau region in which backscatter varies more slowly with changes in the angle of incidence. Backscatter in the plateau region tends to vary like $\sigma_0(\theta)=\mu\cos\theta$ or $\sigma_0(\theta)=\mu\cos^2\theta$ where $\mu$ is a constant dependent on the surface type. In this latter case, the scattering is said to be Lambertian. Beyond the plateau region there is a third region near grazing incidence ($\theta\approx 89$ deg) in which backscatter rapidly decreases. This region is referred to as the interference region because of cancellation effects between scattering paths that differ by one surface bounce. These three regions are depicted in FIG. 15A. The third region is of little interest to downward looking airborne radar and will not be discussed further.

In the first angular region extending from normal incidence out to a few tens of degrees, Beckmann and Spizzichino (1987) make three assumptions that lead to an analytic solution for $\sigma_0(\theta)$. First they assume that the scattering surface is rough with heights that are normally distributed with standard deviation $h_0$. Second they assume that the normalized autocorrelation surface of the rough surface is given by $C_0(x,\Delta x)=\exp(-x^2/\Delta x^2)$ where x is a separation distance and $\Delta x$ is correlation length.

Finally, they assume that the standard deviation of the surface height irregularities is large in comparison with the space wavelength $\lambda/\cos\theta$ where $\lambda$ is the wavelength of the radar carrier frequency. These three assumptions lead to the following form for backscatter in region 1:

$$\sigma_0(\theta) = \cot^2\beta_0 \exp\left(-\frac{\tan^2\theta}{\tan^2\beta_0}\right)$$

where $\tan\beta_0=2h_0/\Delta x$. The quantity $\tan\beta_0$ can be interpreted as the ratio of the vertical scale of roughness to the horizontal scale of roughness. Campbell (2002) and Rees (2013) make slightly different statistical assumptions about the rough surface but arrive at almost identical theoretical results.

Figure 16B:
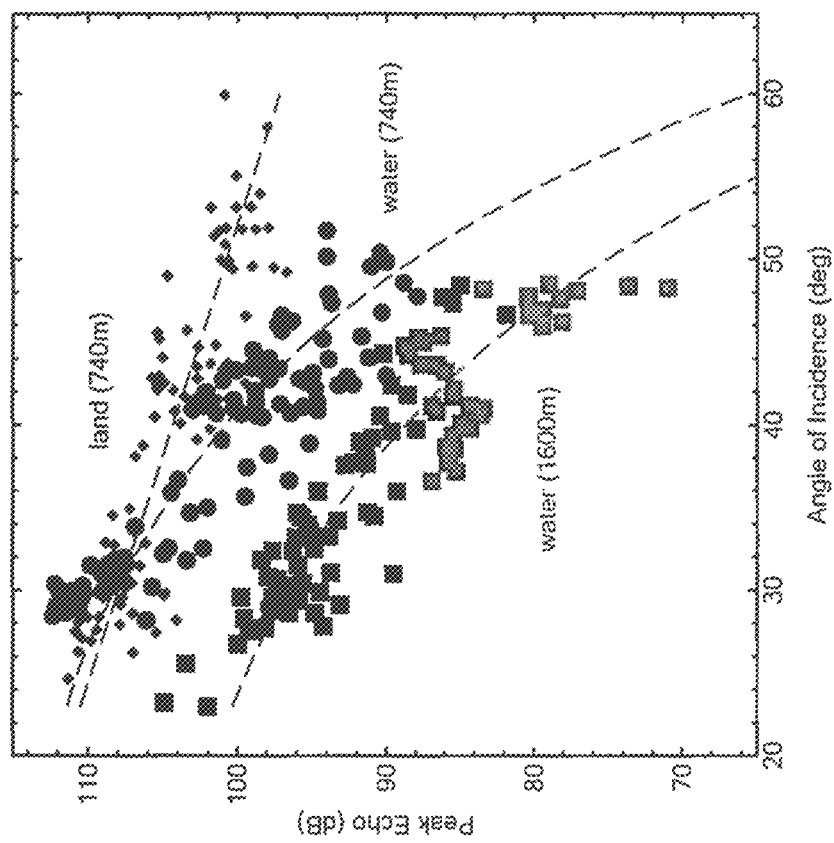
FIG. 16B is a graph depicting un-normalized back scatter levels over land and water observed by a test of the system disclosed herein.
Figure 16A:
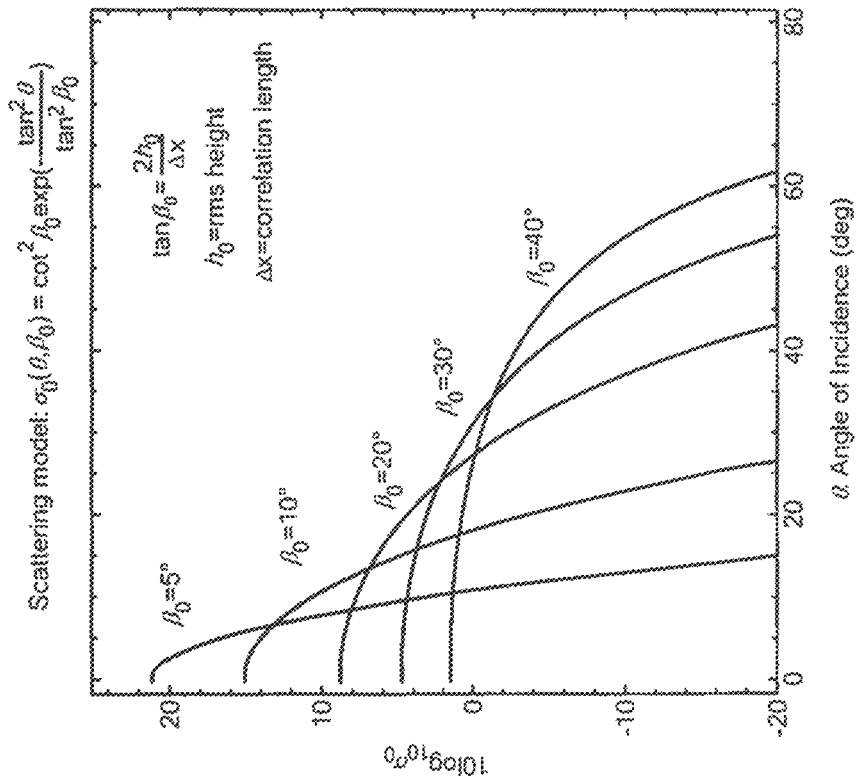
FIG. 16A depicts a theoretical back scatter in one region of the model of FIG. 15 for a range of surface roughness parameters.

Computations with this theoretical backscatter model are shown in FIG. 16A for a range of values of the roughness parameter $\beta_0$. When $\beta_0$ is small the peak scattering is clearly higher and confined to a smaller angular region. FIG. 16B shows observed unnormalized backscatter levels over land and water observed by the AWiPPR system. The upper points indicate measurements made over land at an altitude of 740 m. The middle and lower points indicate measurements made over water at 740 m and 1600 m respectively. The curved lines in are of the same form as the theoretical scattering model defined by the foregoing equation. The over land data in FIG. 16B have been fitted with a straight line for visual emphasis. The distance between the curves in is approximately 10 dB. Surface backscatter theoretically falls off as 30 log(R) where R is range. In this case 30 log(1600/740)=10 dB is in exact agreement with theoretical value.

An effective way to estimate the performance of a radar is to compute the matched filter signal to noise ratio $SNR=t_P P_{scat}/N_0$ where $t_P$ the coherent pulse length of the radar, $P_{scat}$ is the received signal power of the echo that is scattered back to the receiver, $N_0=T_{system}k_B$ is the receiver noise power spectral density, $T_{system}$ is the radar system noise temperature (not physical temperature) and $k_B=138\times 10^{-23}$ J/deg K is Boltzmann's constant. For an FMCW radar the coherent pulse length is $t_P=N_{stack}T_m$ where $N_{stack}$ is the number of pulses, each of length $T_m$ that are used to estimate the Doppler velocity of a target.

The backscatter power from the ground $p_{scan}(\theta)$ as a function of angle of the incidence $\theta$ at ground level can be computed (Blake, 1991) via the following:

$$P_{scan}(\theta) = P_t \frac{\lambda^2 G^2}{(4\pi)^3 R^4} A_{scat}(\theta)\sigma_0(\theta), \quad A_{scat}(\theta) = \phi_{beam} R\left(\frac{c}{2B}\right)\sec\theta$$

where $P_t$ radar is the transmit power, $\lambda$ is the wavelength of the radar carrier frequency, G is antenna gain, $R=z_r\sec\theta$ is radar slant range to the ground for a radar located at altitude $z_r$ above the surface of the earth, $A_{scat}$ is the effective scattering area, $\phi_{beam}$ is the horizontal beam width of the system, c is the speed of light, B is the bandwidth of the transmit pulse and $\sigma_0(\theta)$ is backscatter as a function of angle of incidence. For the AWiPPR system appropriate values are $N_{stack}=256$, $T_m=190\times 10^{-6}$ sec, $P_t=3.5$ W, $\lambda=9$ mm, 10 log G=37 dB and B=48 MHz. The specific backscatter model used use in the computations is shown in FIG. 15A.

Figure 17B:
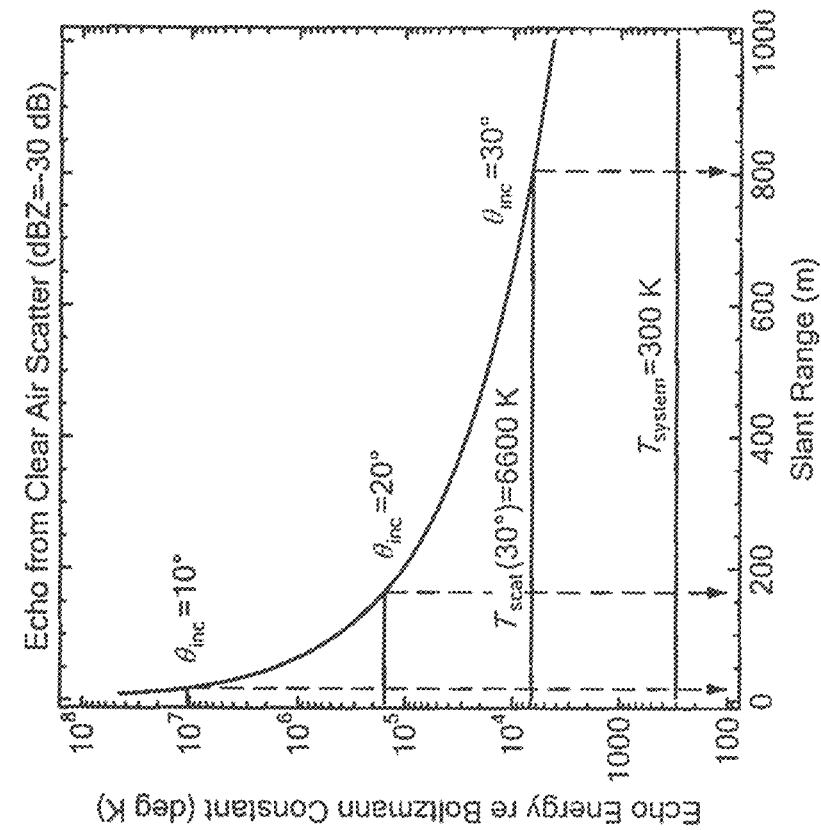
FIGS. 17A and 17B are graphs depicting the effect of surface back scaler on the detection of clear air wind echoes.
Figure 17A:
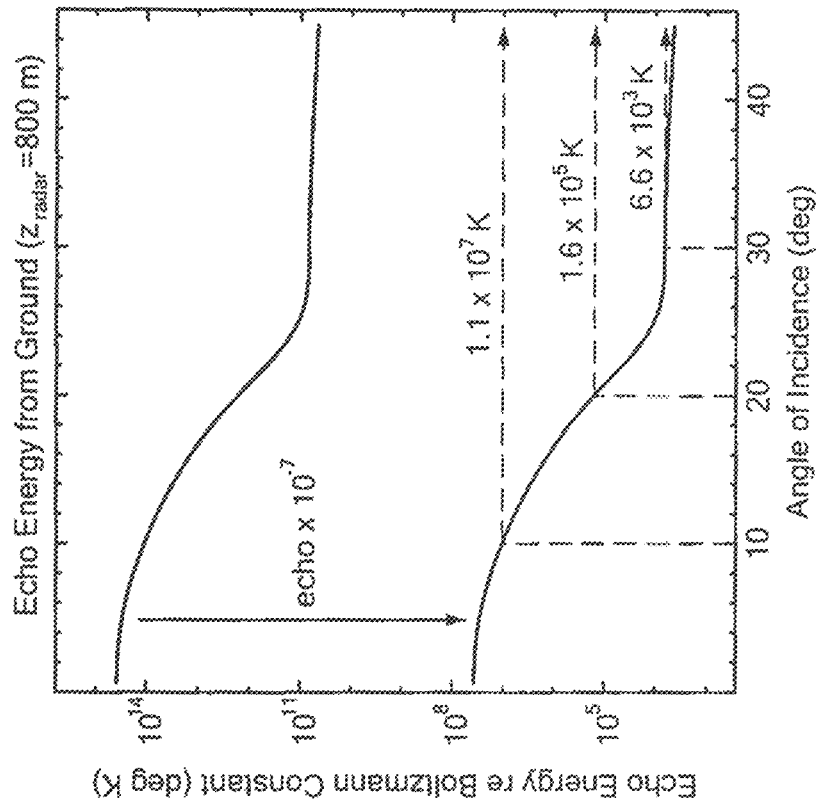

The effect of backscatter from the ground on AWiPPR performance is illustrated in FIG. 17A. The upper curve in is the estimated peak backscatter echo energy relative to $k_B$ as a function of angle of the incidence $\theta$ at ground level for an AWiPPR system operating at a height of $z_r=800$ m above the ground. Normalizing echo energy by Boltzmann's constant $k_B$ is very convenient since it allows direct comparison of the echo energy to thermal noise energy measured on a temperature scale. Echoes with relative energy $$t_P P_{scan}(\theta)/k_B < T_{system}$$

are not detectable due to thermal noise masking. The AWiPPR radar's system noise is in the 200-300° K. range.

The lower curve is relative echo energy diminished by a factor of $10^{-7}$ corresponding to the estimated 70 dB dynamic range of the AWiPPR system. For radar operating angles of incidence of 10, 20 and 30 deg, the corresponding effective noise temperatures of the system are $1.1\times 10^7$ K, $1.6\times 10^6$ K and $6.6\times 10^3$ K. Each of these three values is substantially greater than the system noise temperature $T_{system}=300$ K indicating that the radar system is reverberation limited out to at least an angle of incidence of 30 degrees with respect to the vertical.

FIG. 17B compares the relative energy echo from clear air scatter that has −30 dBZ reflectivity. The relative echo energy at the receiver is given by the radar equation $t_P P_{echo}/k_B$ where:

$$P_{echo}(\theta) = P_1 \frac{\lambda^2 G^2}{(4\pi)^3 R^4} dV \cdot \eta, \quad dV = \frac{4\pi}{G}R^2\left(\frac{c}{2B}\right)$$

In this equation $\Omega=4\pi/G$ is the solid angle illuminated by the pulse, dV is the volume illuminated by the pulse and $\eta$ is the volume backscatter coefficient appropriate to −30 dBZ backscatter. The radar horizontal beamwidth used in estimating backscatter from the surface $\phi_{beam}$ and the solid angle $\Omega$ are related via $\phi_{beam}\cong\Omega^{1/2}$. In MKS units $\eta=10^{-18} K^2\pi^5\lambda^{-4}10^{dBS/10}$ where the constant K is such that $K^2\cong 1$ and dBZ=−30 dB in this case.

Detection ranges for radar operation angles of 10°, 20° and 30° are indicated in FIG. 17A. The detection range goes up as the radar beam angle of incidence increases. In general the backscatter from the ground decays in terms of slant range R like $R^{-3}$ and echoes from clear air scatter decay like $R^{-2}$. Thus it is advantageous to operate the radar at larger values of the radar height $z_r$ (thereby increasing slant range R) and at larger values of the angle of incidence $\theta$. This strategy will work so long as the relative clear air echo energy is such that $t_P P_{echo}/k_B > 10 T_{system}$. The factor of 10 in the foregoing represents a margin of safety required to keep false alarms at a manageable level.

In order to assess the effect of backscatter on AWiPPR and optimize performance of the system the theoretical backscatter levels in the operating area need to be related to the noise floor of the radar system. This noise floor is composed of components that come from within the system and components that arise from outside the system.

Figure 18:
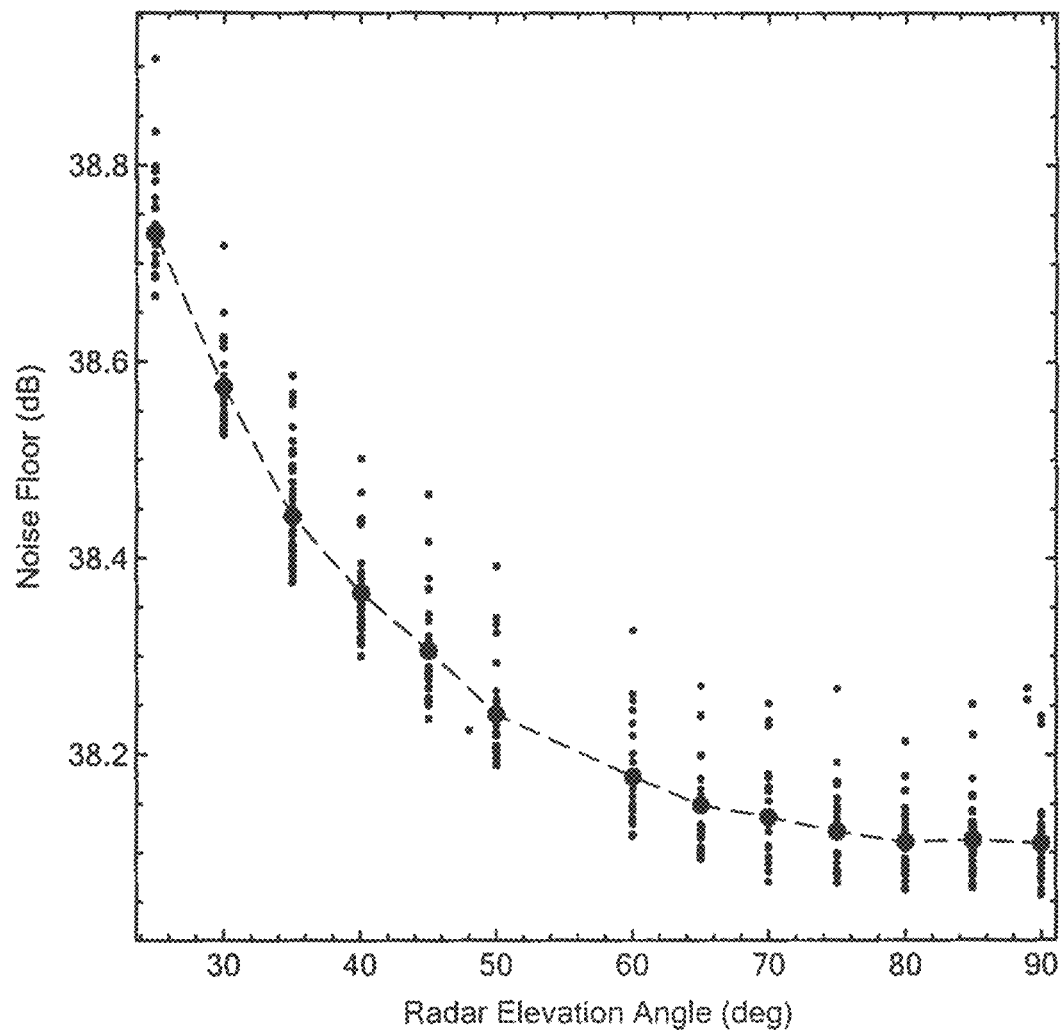
FIG. 18 is a graph depicting the radar noise floor data observed in a test of the AWiPPR system and method disclosed herein.

It was experimentally observed that the AWiPPR radar could make an accurate measurement of the dependence of received background noise energy as a function of radar tilt angle. This measurement was subsequently found to be closely related to a theoretical computation of sky noise temperature using the Blake (1991) standard atmosphere. The only difference between the radar measurement and the theoretical prediction was a linear transformation. This experiment was successfully repeated with the radar operating both in active and passive modes. The noise floor measurements are shown in FIG. 18.

Mean values of the noise floor at each radar elevation angle are indicated by the larger dots. Individual measurements of the noise floor are indicated by the smaller dots.

The measurements show that the radar noise floor decreases with increasing radar elevation angle.

The noise floor statistic is computed for an individual range-velocity matrix (RVM) by first removing all Doppler velocity-altitude cells in the RVM that have signal-to-noise ratio greater than 2 dB. This effectively removes all echoes that are coming from clear air scatter or precipitation. Next the median level is computed at each altitude, Finally, the noise floor is defined to be the median value of the medians at each altitude.

The noise floor of the radar contains contributions from internal electronic noise and contributions of noise from the troposphere and cosmos. The sum of the tropospheric noise and noise from the cosmos is known as sky noise. Sky noise is measured in deg K and it can be converted to a spectral noise level by multiplying by the Boltzmann constant $k_B = 1.38 \cdot 10^{-23}$ Joule/° K. Sky noise is sometimes referred to as brightness temperature since it is measured on a temperature scale.

That portion of the noise energy budget that the radar receives from the troposphere and beyond is referred to as the brightness temperature ($T^{bright}$). The relationship between $T^{bright}$ and the vertical profile of temperature in the atmosphere $T(z)$ is described by the radiative transfer equation shown below (Westwater, 1965). In this equation $\alpha_v(z)$ denotes absorption at frequency v. Although not indicated by the notation in the equation, absorption also depends upon atmospheric temperature, pressure and moisture:

$$T_Y^{bright} = \int_G^\infty T(z)\alpha_v(z)\exp[-\int_0^z \alpha_u(\zeta)d\eta]dz$$

Figure 19:
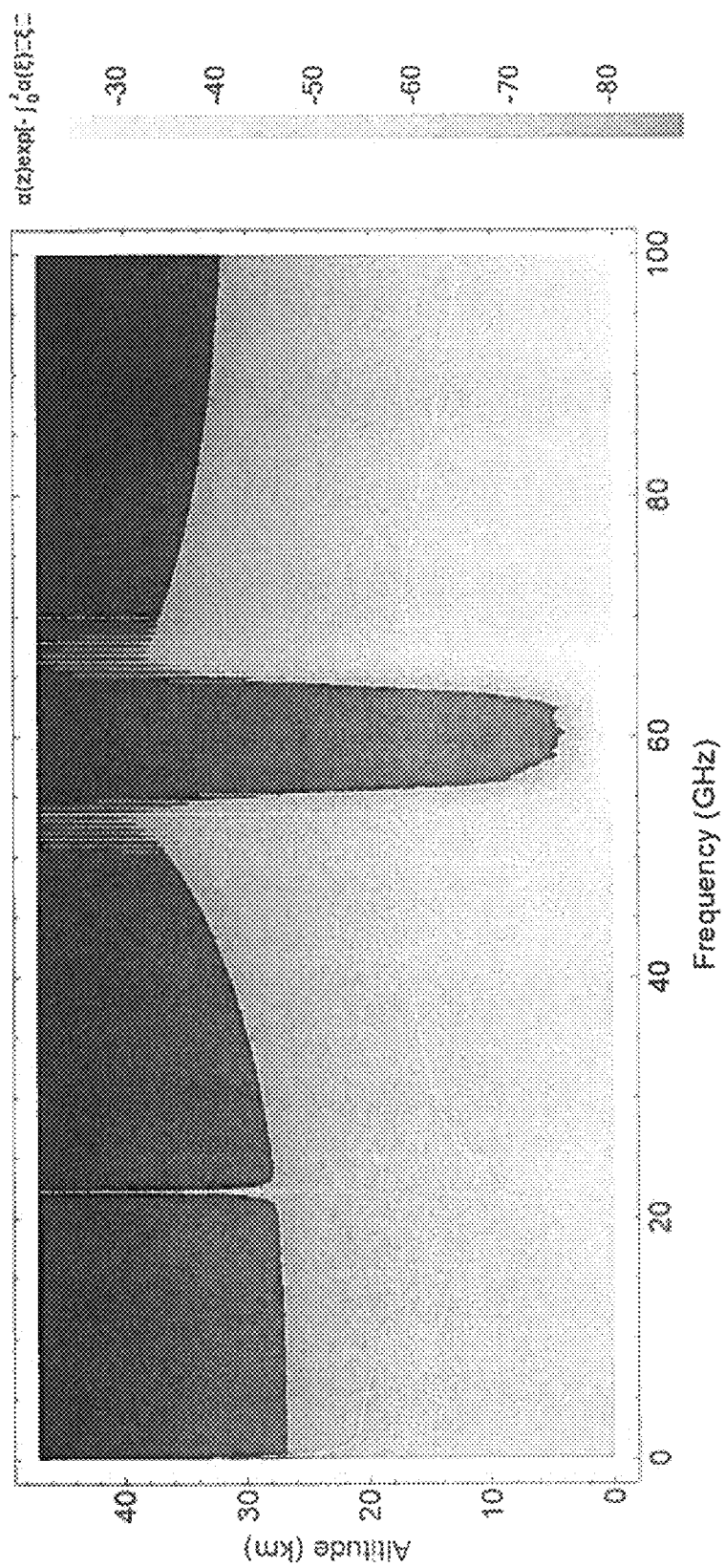
FIG. 19 is a graph depicting transmittance weighted relative to brightness temperature.

FIG. 19 illustrates how the environmentally dependent portion of this relationship varies with altitude and frequency. The line in FIG. 19 shows the altitude of the 99$^{th}$ percentile of received energy as a function of frequency, if the columns in the figure are multiplied by temperature as a function of altitude and then summed down the result is the atmosphere's contribution to the radar's noise temperature budget. The large region near 60 GHz in the figure is caused by energy absorption due to the presence of oxygen in the atmosphere. In this region absorption is high, radar detection ranges are much shorter than they are at 33 GHz.

The following discussion presents an algorithm that relates the noise floor values observed by the radar to atmospheric brightness temperature. In this discussion we will denote the scale constant that maps from observed digital radar power in a RVM to the equivalent noise brightness temperature by $\alpha_{scale}$. The contribution to the radar noise temperature that comes from internal noise sources measured on a digital power scale will be denoted by $x_{elec}$. The constant $\alpha_{scale}$ can be found by solving the following set of equations:

$$\alpha_{scale}(x_{90} - x_{elec}) = T_{90},$$

and $$\alpha_{scale}(xx_{25} - x_{elec}) = T_{25}$$

and where $x_{25}$ and $x_{90}$ are the radar noise floor measured in a clear sky with the radar antennas pointed at elevation angles of 25° and 90°. The noise values $x_{elec}$, $x_{25}$ and $x_{90}$ are measured on the radar digital scale. The sky noise temperature for the Blake standard atmosphere for a radar operating at 33.4 GHz and pointed in the direction 25 and 90 deg are denoted $T_{25}$ and $T_{90}$. These two quantities are measured on a Kelvin temperature scale and they have the values $T_{25} = 38.10$ deg K and $T_{90} = 18.12$ deg K. The solutions to these two equations are:

$$\alpha_{scale} = \frac{T_{25} - T_{90}}{x_{25} - x_{90}}, \text{ and}$$

$$\alpha_{scale} x_{elec} = \frac{\alpha_{scale}(x_{25} + x_{90}) - (T_{25} + T_{90})}{2}$$

where $T_{elec} = \alpha_{scale} x_{elec}$ is the contribution to the radar noise temperature budget from internal sources including antenna ohmic losses.

Figure 20B:
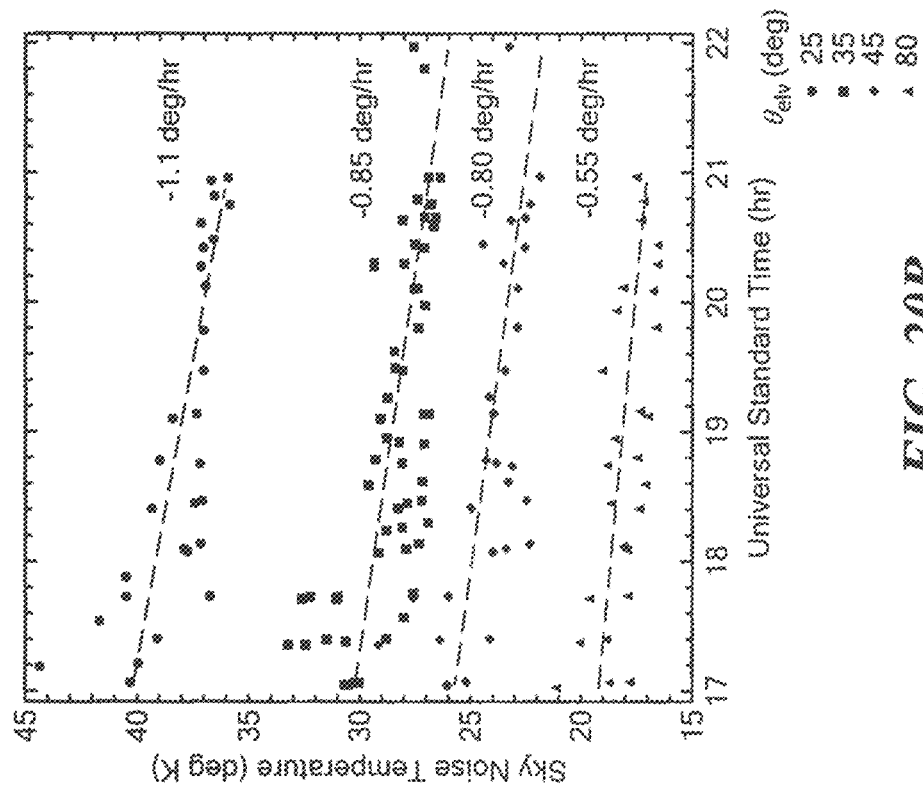
FIG. 20B is a graph depicting the time variation of sky noise.
Figure 20A:
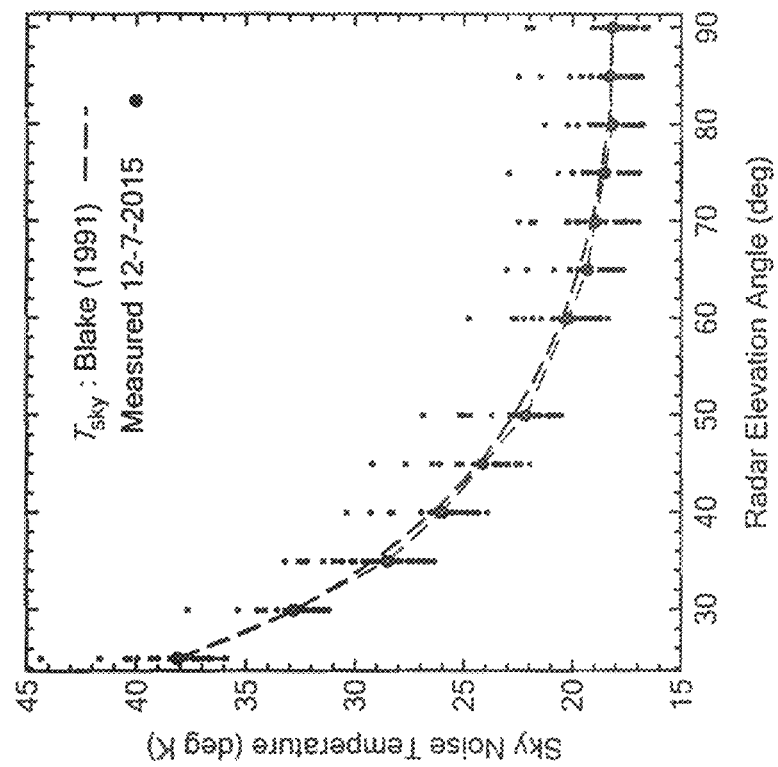
FIG. 20A is a graph depicting sky noise as a function of radar elevation.

The application of this procedure to the noise floor data from is shown in FIG. 20A shows the sensitivity of the noise measurement to radar tilt angle. FIG. 20B shows time variation of sky noise. The data shown was collected from 1658 to 2103 Z. Sky noise is noise observed by the radar that comes from the troposphere (0-47 km) and the cosmos (beyond 47 km for ordinary radar frequencies). The range of radar elevation angles in FIG. 20B is 25°-90° with 90° corresponding to the vertical (radar looking straight up). At 33.4 GHz the cosmos contribution to sky noise is 2.5° K. and is very nearly independent of elevation angle over the range 25°-90°. Thus sky noise in this case is effectively tropospheric noise, (brightness temperature). Smaller points in the plot indicate individual radar sky noise measurements, Larger points indicate mean values. Estimations of the sky noise temperature using algorithms from Blake (1991) are shown for reference via the dashed line. Computations with the Blake algorithms for the sky noise temperature have been made using on-scene measurements of atmospheric temperature and pressure, Sky noise temperature is lowest near the vertical because at these angles the radar beam trajectory spends the least amount of time in the denser portions of the atmosphere that occur at lower altitudes. The constants and are respectively 0.020 and 111.7° K. The noise floor for the system on a temperature scale at near vertical elevation angles is approximately 150° K. of which about 38° K. comes from atmospheric sources.

Figure 21:
FIG. 21 is a chart depicting a mobile airborne platform flight leg in a test of the AWiPPR system disclosed herein.
Figure 22:
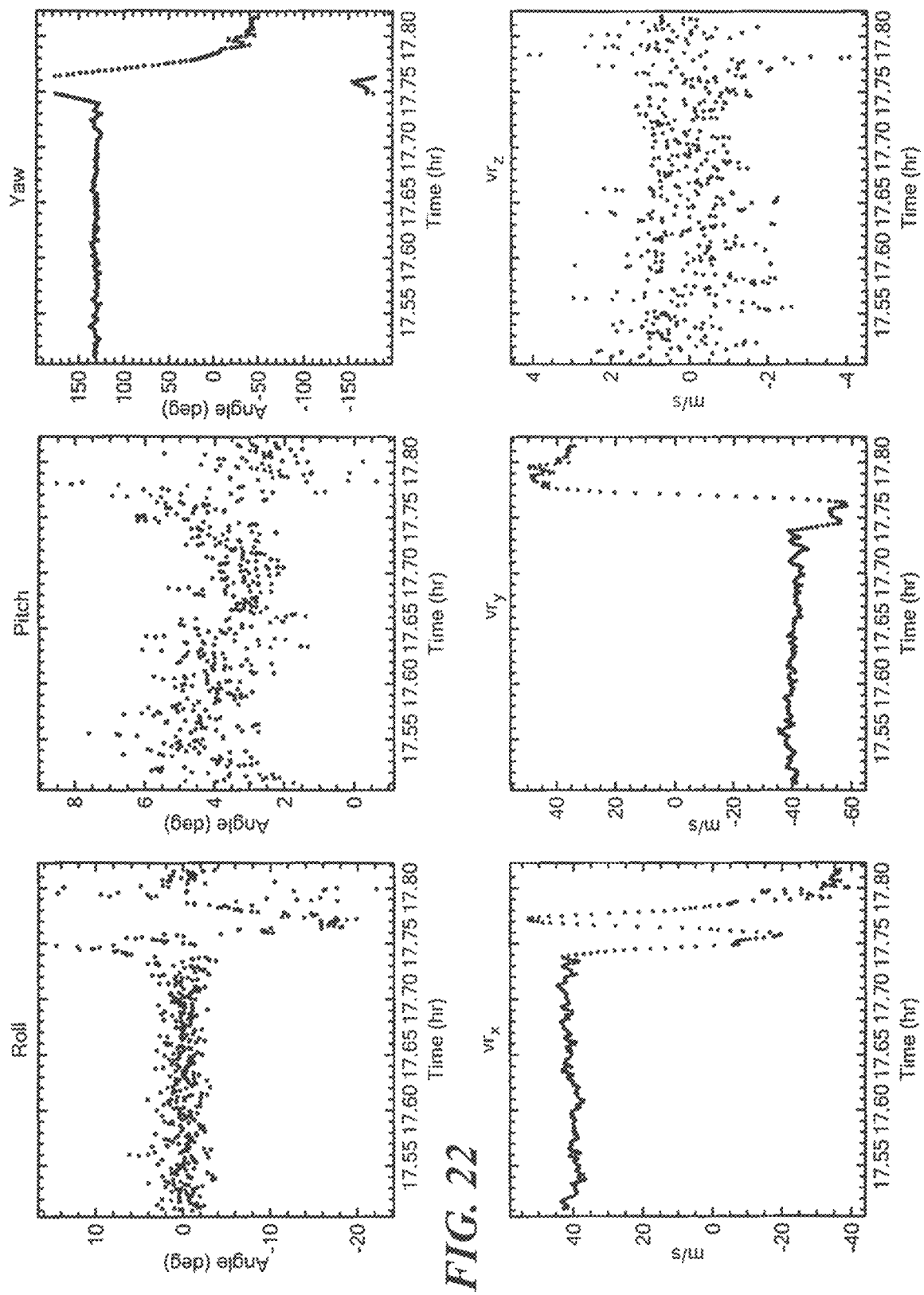
FIG. 22 are plots of navigation data for a part of the flight leg shown in FIG. 21.
Figure 23:
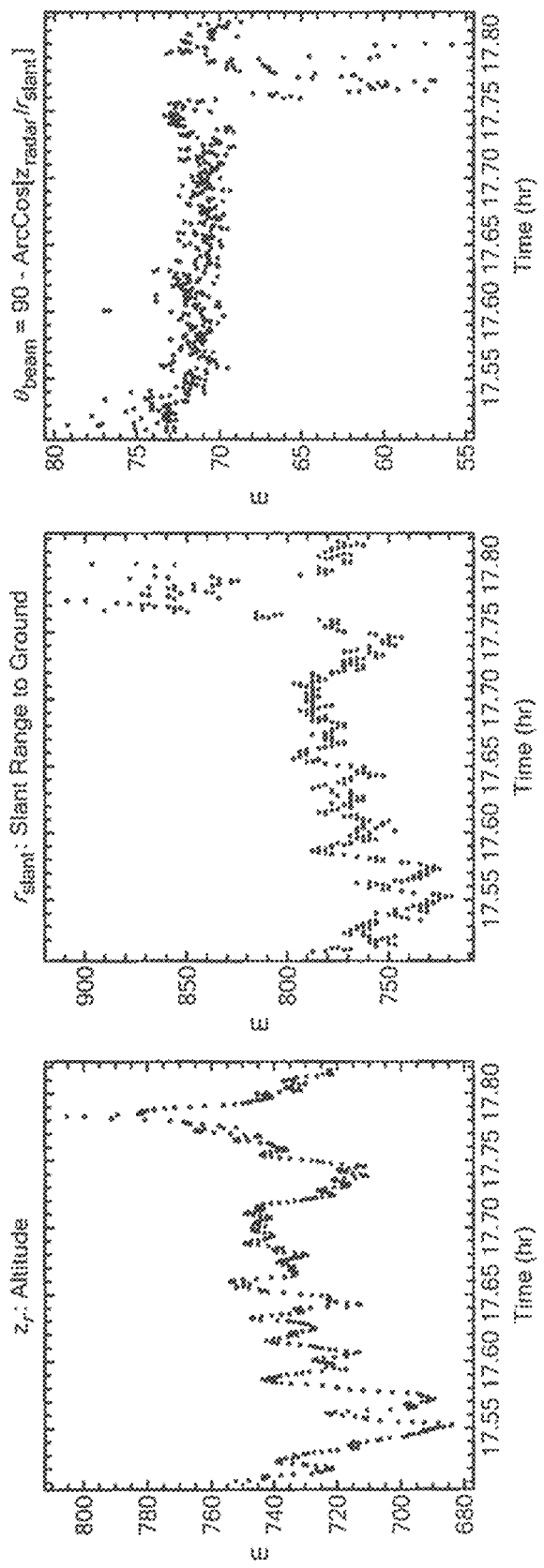
FIG. 23 are plots of navigation data from a second portion of the flight leg depicted in FIG. 21.
Figure 24:
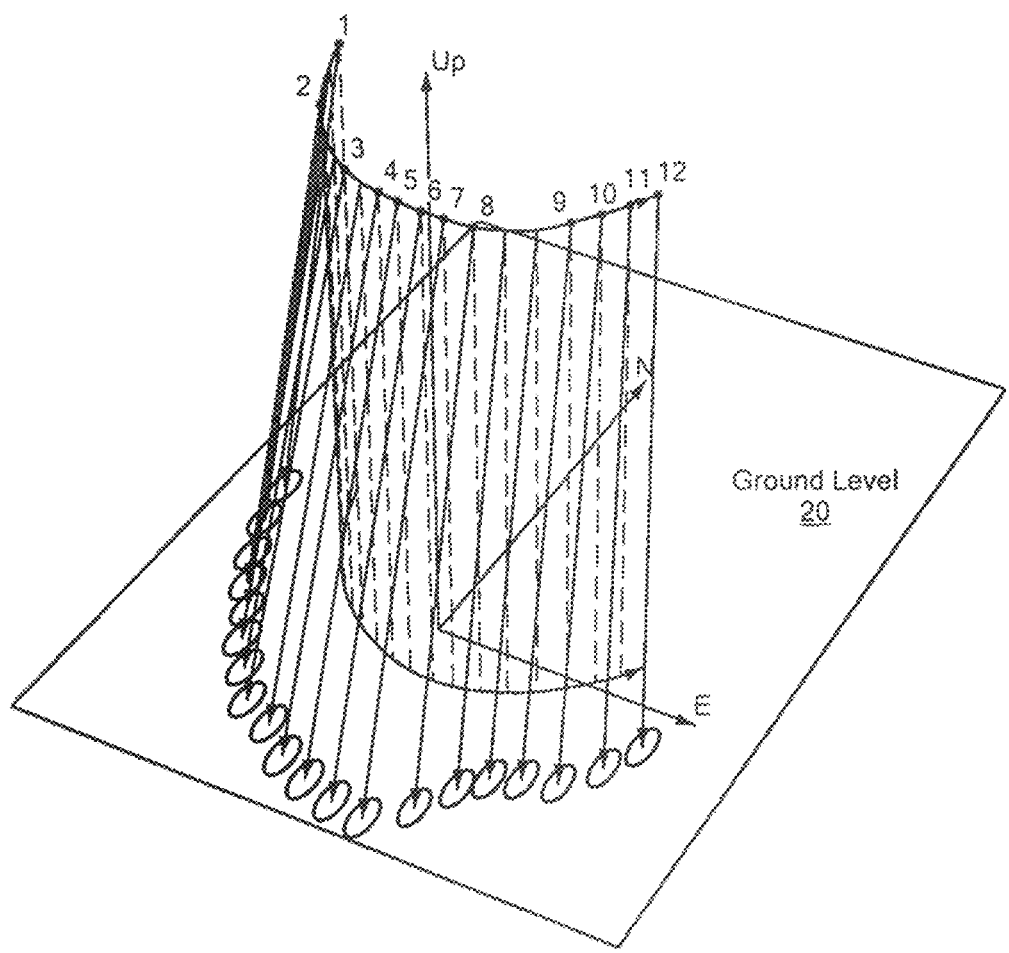
FIG. 24 is a pictorial representation of the aiming maneuver of the flight pattern shown in FIG. 21.

The flight path of the AWiPPR system 10 and the method thereof during the leg 4 data collection is shown in FIG. 21. Specific navigation data recorded during the flight were mobile airborne platform 12 roll, pitch, yaw and the aircraft vector velocity. Also recorded was the mobile airborne platform 12 altitude. These 7 data types are shown in FIGS. 22-23, Also shown in FIG. 23 are slant range to the ground and radar beam angle of incidence. These last two parameters have been determined by extracting the position of the maximum of the ground echo in the recorded range velocity matrices. The relationship between slant range R and aircraft altitude $z_r$ is cos $\zeta = z$, 1R. During flight operations during leg 4, AWiPPR radar unit 16 was operated at a vertical angle of 10 degrees with respect to the normal. This resulted in high backscatter levels and caused the radar system to saturate. However during the turn at the end of the flight leg, the mobile airborne platform 12 rolled to left and the radar beams angle of incidence with respect to the ground increased by about 20°. This reduced backscatter levels and quality radar data was recorded. A pictorial representation of the turning maneuver is shown in FIG. 24. The ellipses on the sea level reference plane indicate the regions where the dominant amount of surface scatter occurred. The dashed lines in FIG. 24 are the normals to the surface of the earth. During the turn shown 20 range velocity matrices were recorded. Twelve of the range velocity matrices were found to contain echoes from the winds in that portion of the convective boundary layer beneath the aircraft.

Figure 25:
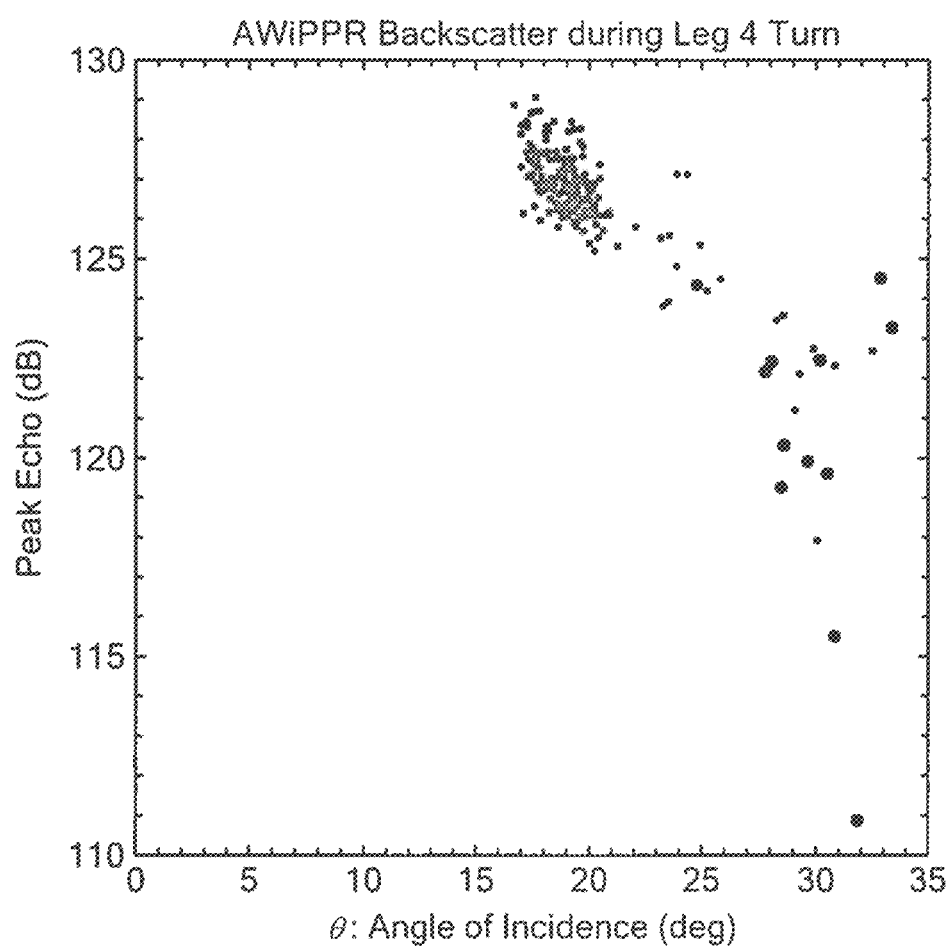
FIG. 25 is a graph of back scatter data observed during a test of the AWiPPR system disclosed herein.

Backscattering levels as a function of angle of incidences for the over-water collected data are shown in FIG. 25.

Backscattering levels for the 12 good files are shown in black. The good files have much larger angles of incidence and lower backscatter levels than do the other data files.

Figure 26:
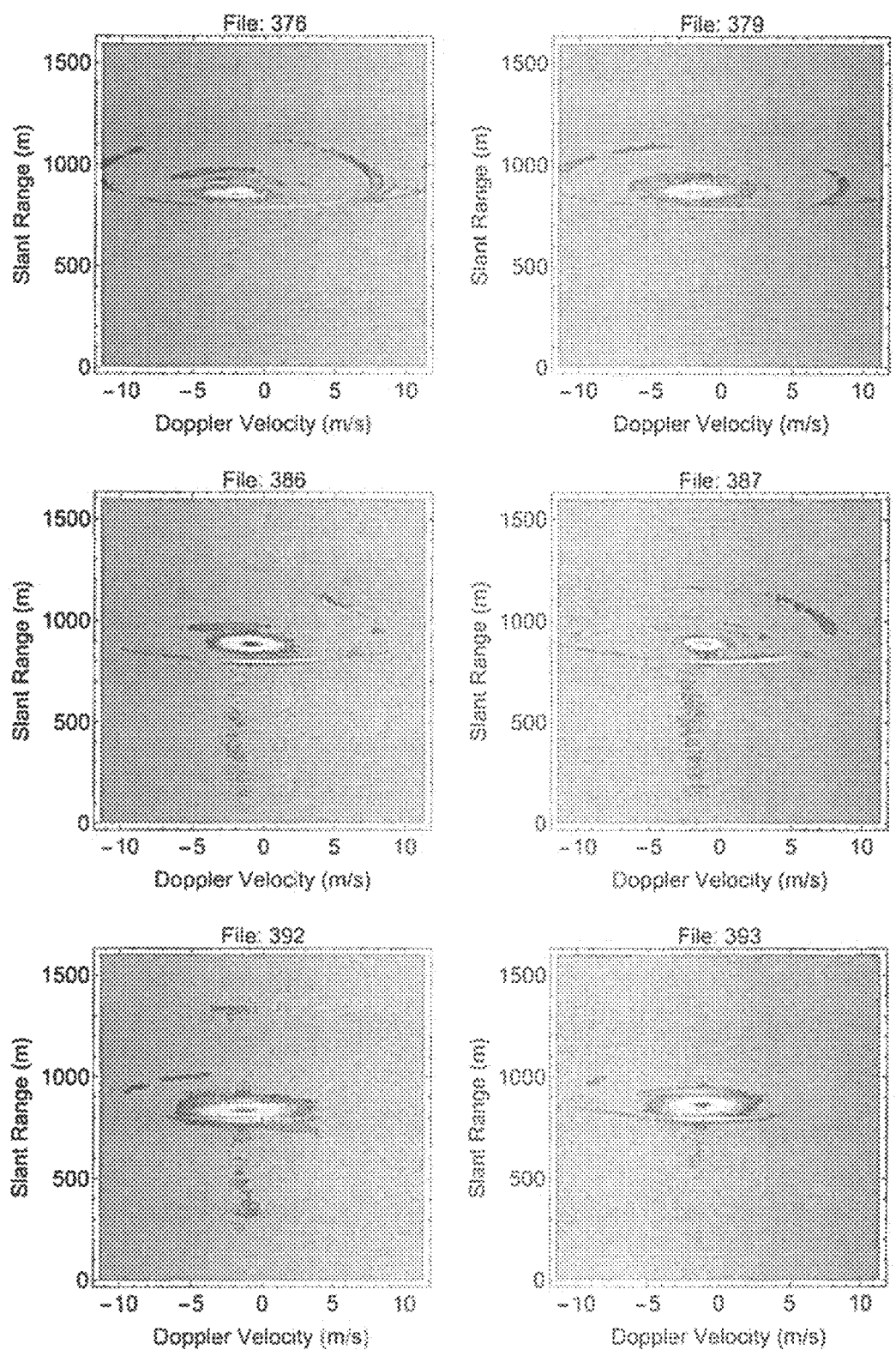
FIG. 26 are plots showing data collected as the mobile airborne platform turns.
Figure 26:
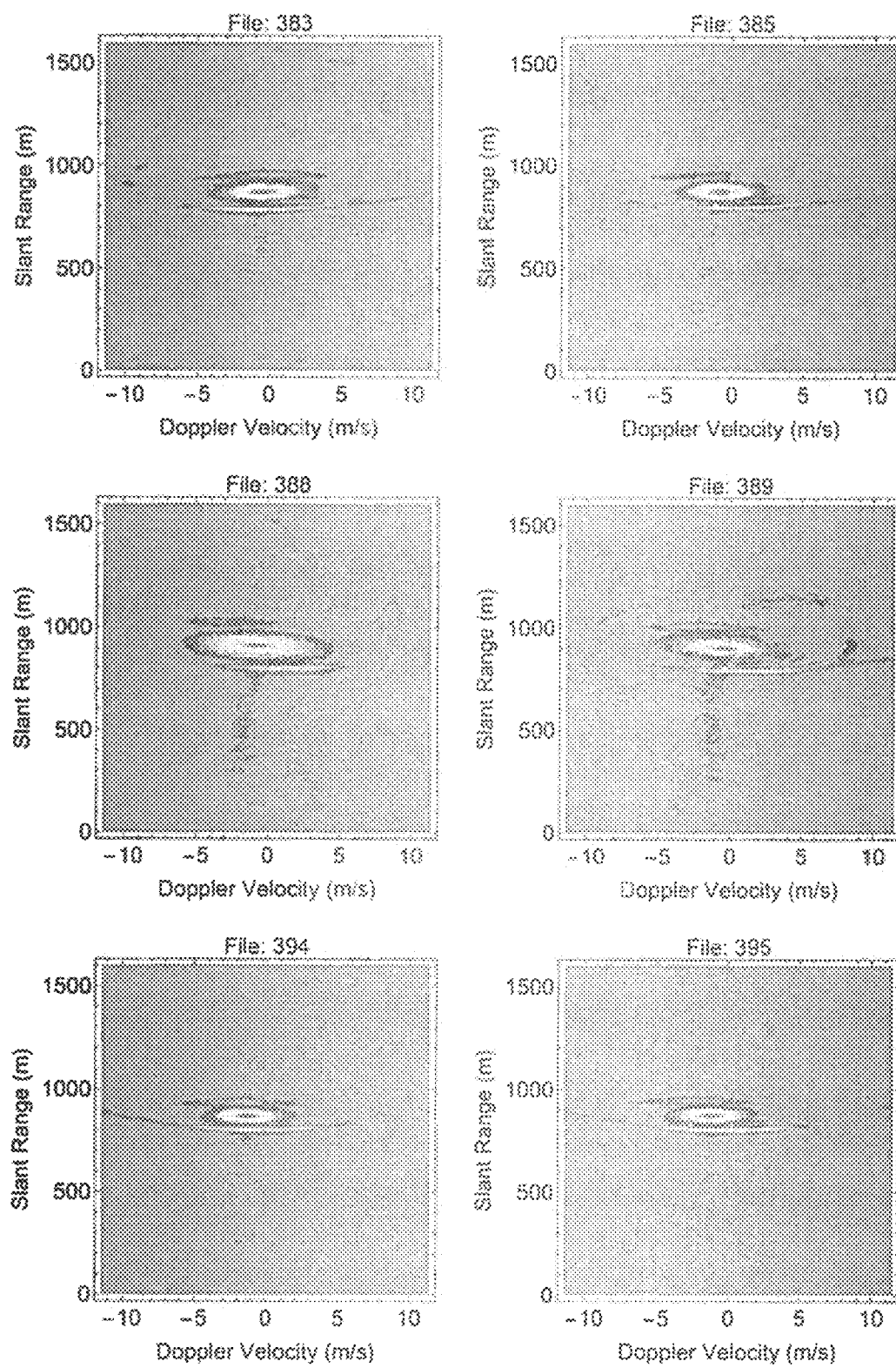

FIG. 26 shows the 12 good AWiPPR range velocity matrices as recorded. The ground echo and its side lobe structure are clearly evident, as are boundary layer echo profiles. These profiles represent the Doppler echo-altitude information from which vector wind velocity as a function of altitude can be determined.

The estimation of wind vector velocity $\{v_x(z), v_y(z), v_z(z)\}$ begins with the selection of high quality radar range velocity matrices (data files) that contain Doppler echoes from the wind. The data files selected for this are shown in FIG. 26. A detailed example of one of these range velocity matrices (RVMs) is shown in FIG. 6. In each of these there is strong ground echo. Due to the high signal to noise associated with this echo, the slant range $R_{obx}$ to the echo and the Doppler velocity of the $V_{obx}$ can be accurately measured. If the vector navigation data is being correctly recorded then it Will be the case that the computed Doppler velocity of the peak ground echo $$V_{com} = \overline{\eta}_{beam}(\alpha_r, \beta_p, \gamma_y, \theta, \phi) \cdot \{u_x, u_y, u_z\}$$

and the observed Doppler velocity are related by the functional relationship $$\text{mod}(V_{com} - V_{max}, 2V_{max}) - V_{max} = V_{obs}$$

where mod denotes the modulo function described previously. This analysis was carried out for each of the data files shown in FIG. 26.

The next step in the determination of the vector wind velocity profile is to flip the range velocity matrices upside down and bring the range and Doppler velocity of the ground bounce to zero range and zero Doppler velocity. This accomplished using a combination of circular up-down rolling and circular left right rolling. This can also be done analytically as described previously. The results of this procedure are shown in FIG. 27.

Figure 27:
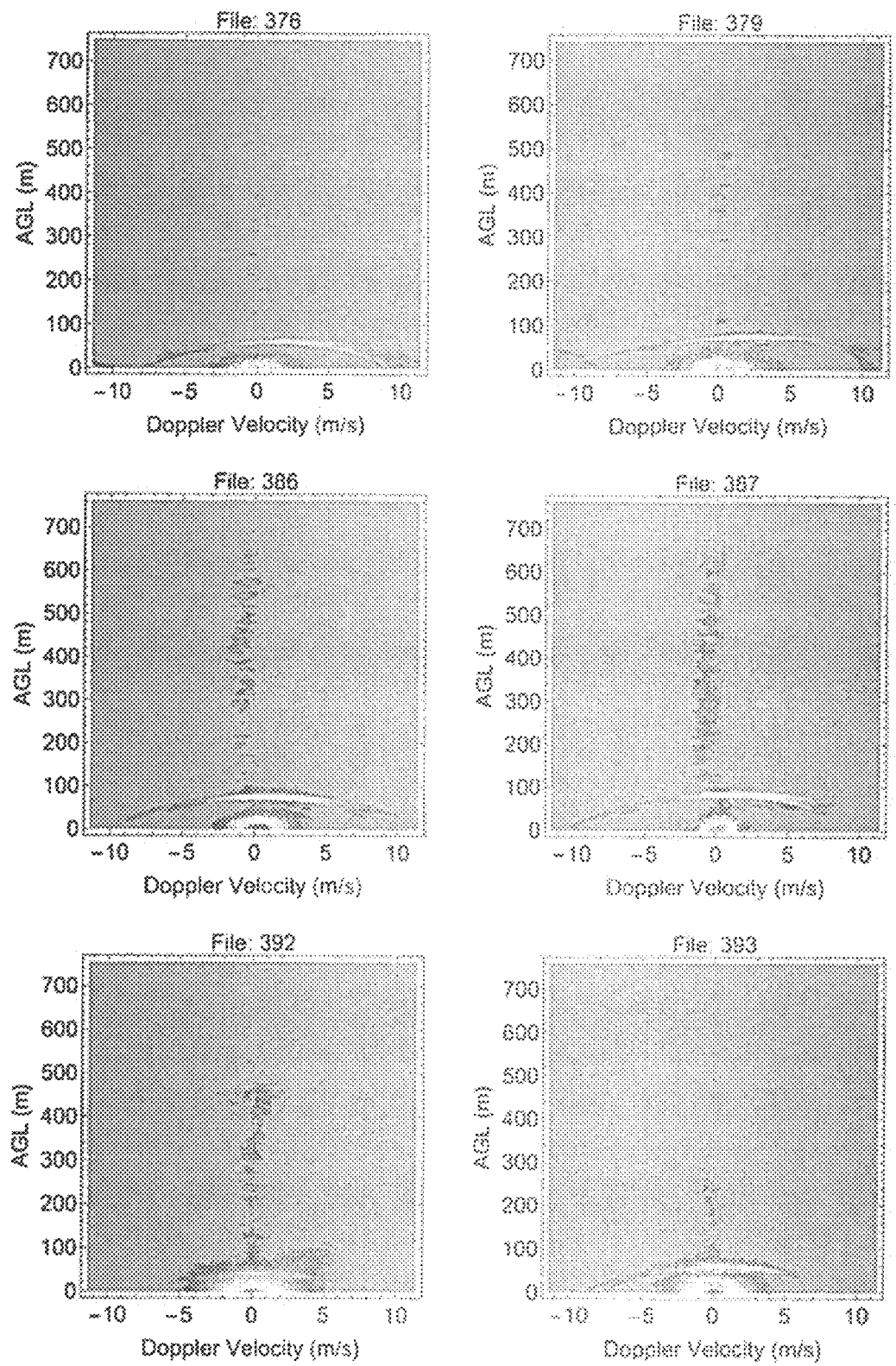
FIG. 27 are plots showing data collected and processed with Doppler motion correction of the AWiPPR system and method disclosed herein.
Figure 27:
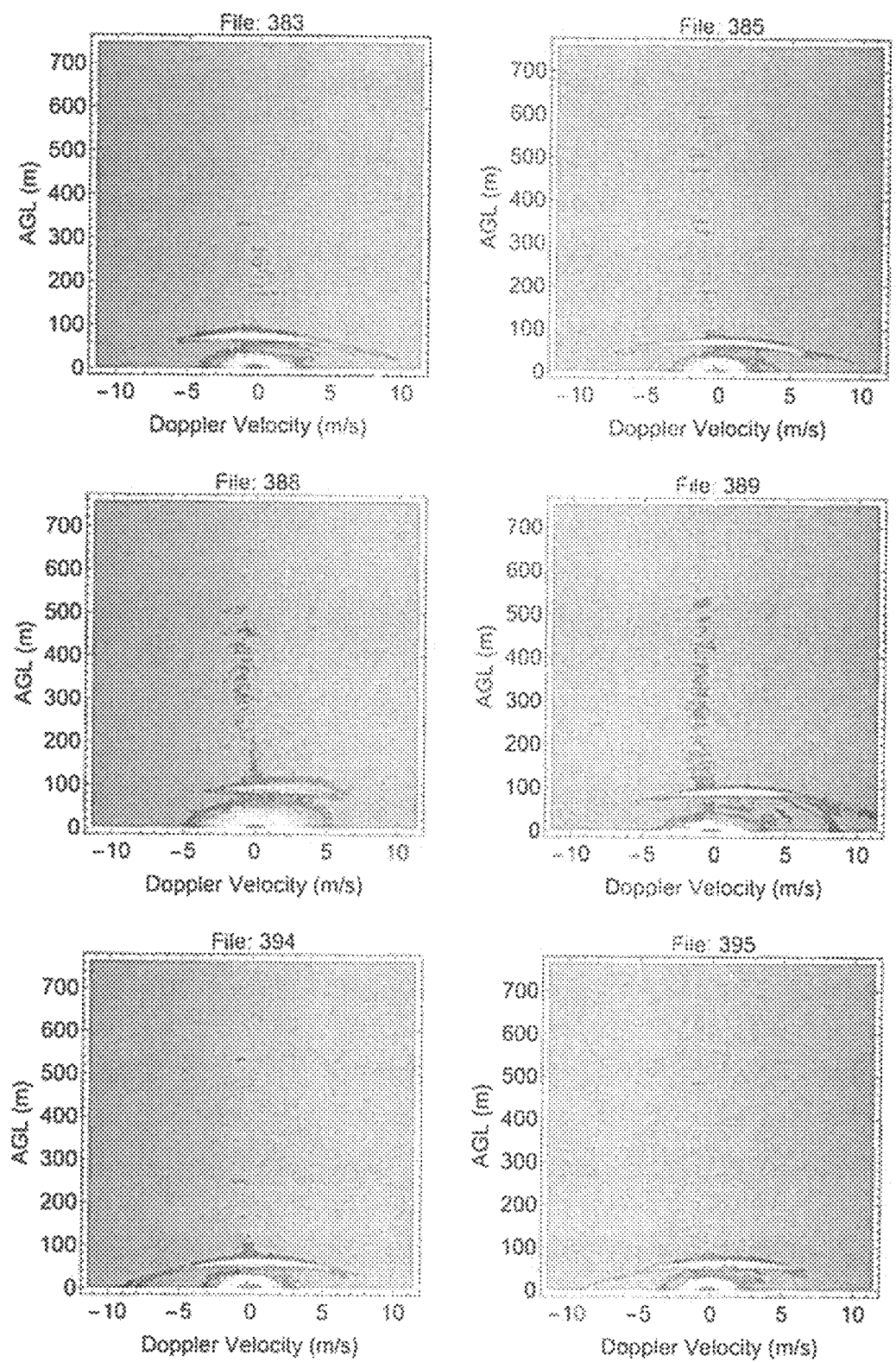

The next step in the determination of the vector wind velocity is to extract slant range and observed Doppler vector wind velocity for each contact in the RVMs shown in FIG. 27 with signal to noise ratio greater than a fixed threshold. Slant range is converted to altitude above ground level using the corrected navigation data and a combined data file is produced. A portion of this data file is shown in FIG. 28. The columns in the table are respectively contact altitude, file index, motion compensated Doppler velocity, and the direction cosines of the radar beam at the time of recording with respect to the XYZ coordinate system described previously. File numbers are not used in the vector wind velocity estimation process. They are included in the table only for display and verification purposes. The table shown constitutes the input to the vector wind velocity estimation algorithm previously.

Figure 29:
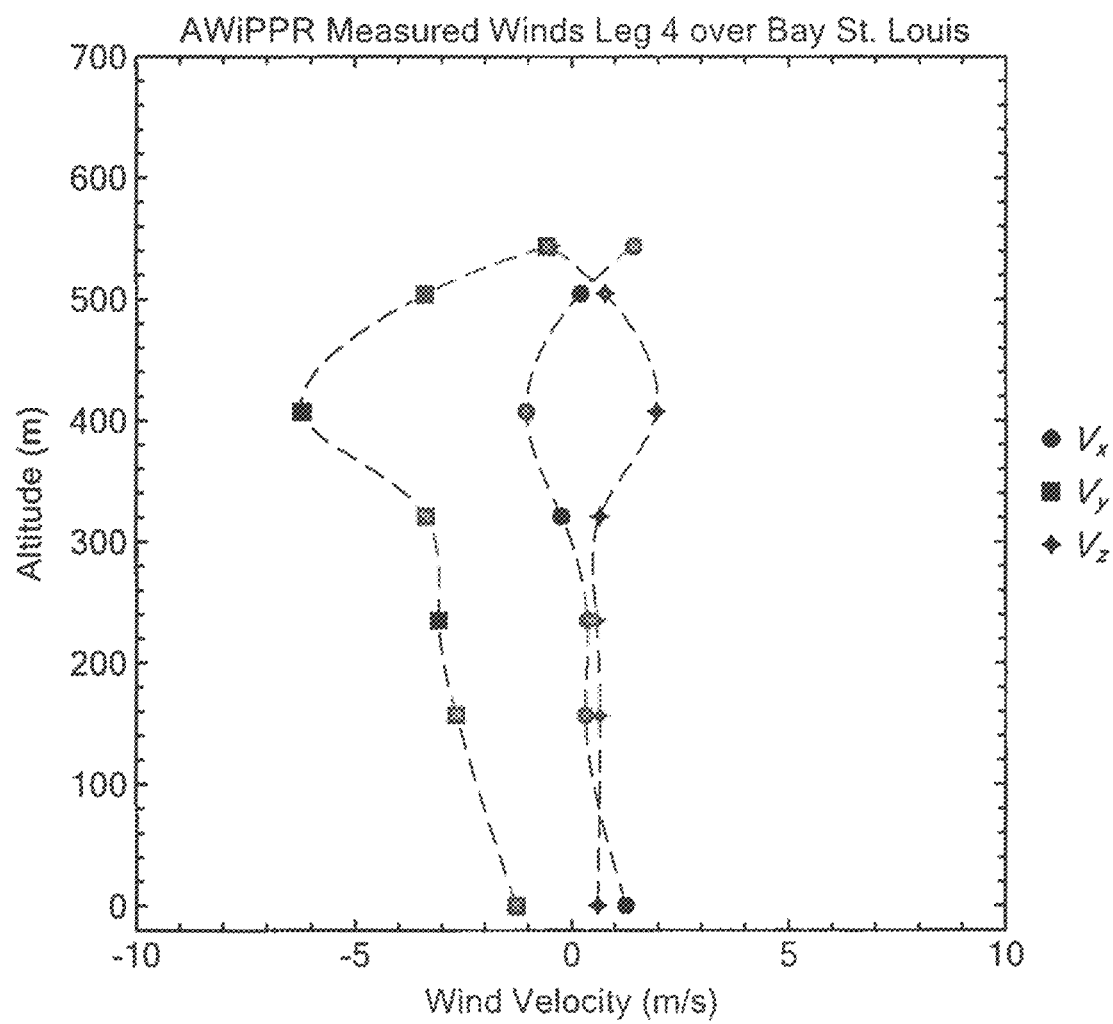
FIG. 29 is a plot depicting vector wind velocity at different altitudes measured by the AWiPPR system and method disclosed herein.

The outputs of the vector wind velocity estimation process are shown in FIG. 29. The three components of vector wind velocity are represented by three cubic splines, each with 7 pivot points.

Figure 30:
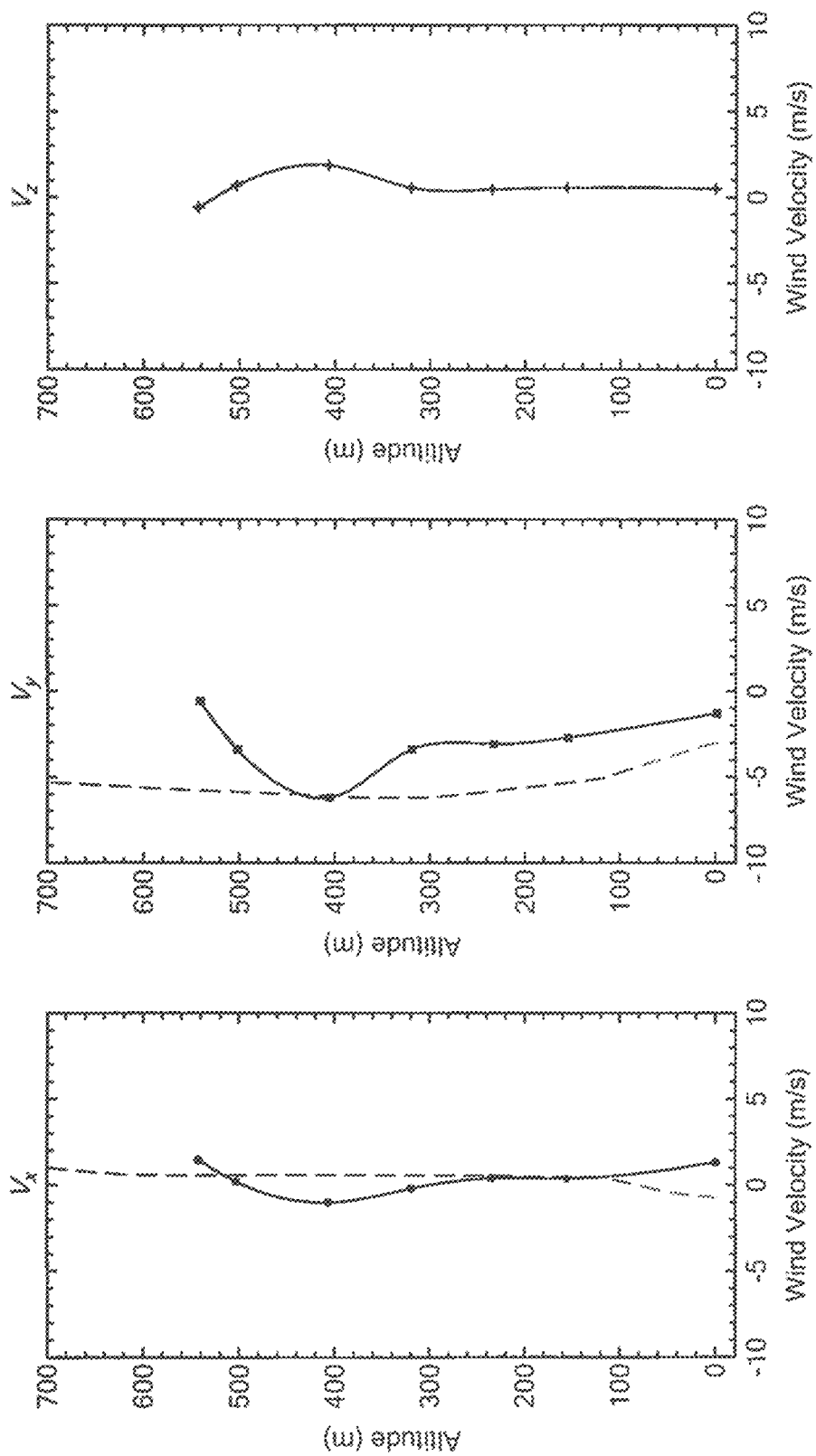
FIG. 30 are graphs depicting vector wind velocity at different altitudes measured by the AWiPPR system and method disclosed herein compared to radiosonde data.

The AWiPPR leg 4 measured winds are compared to the afternoon radiosonde vector wind velocity data in FIG. 30. The radiosonde data is indicated by the dashed lines. The radiosonde does not measure the vertical component of vector wind velocity.

Figure 31:
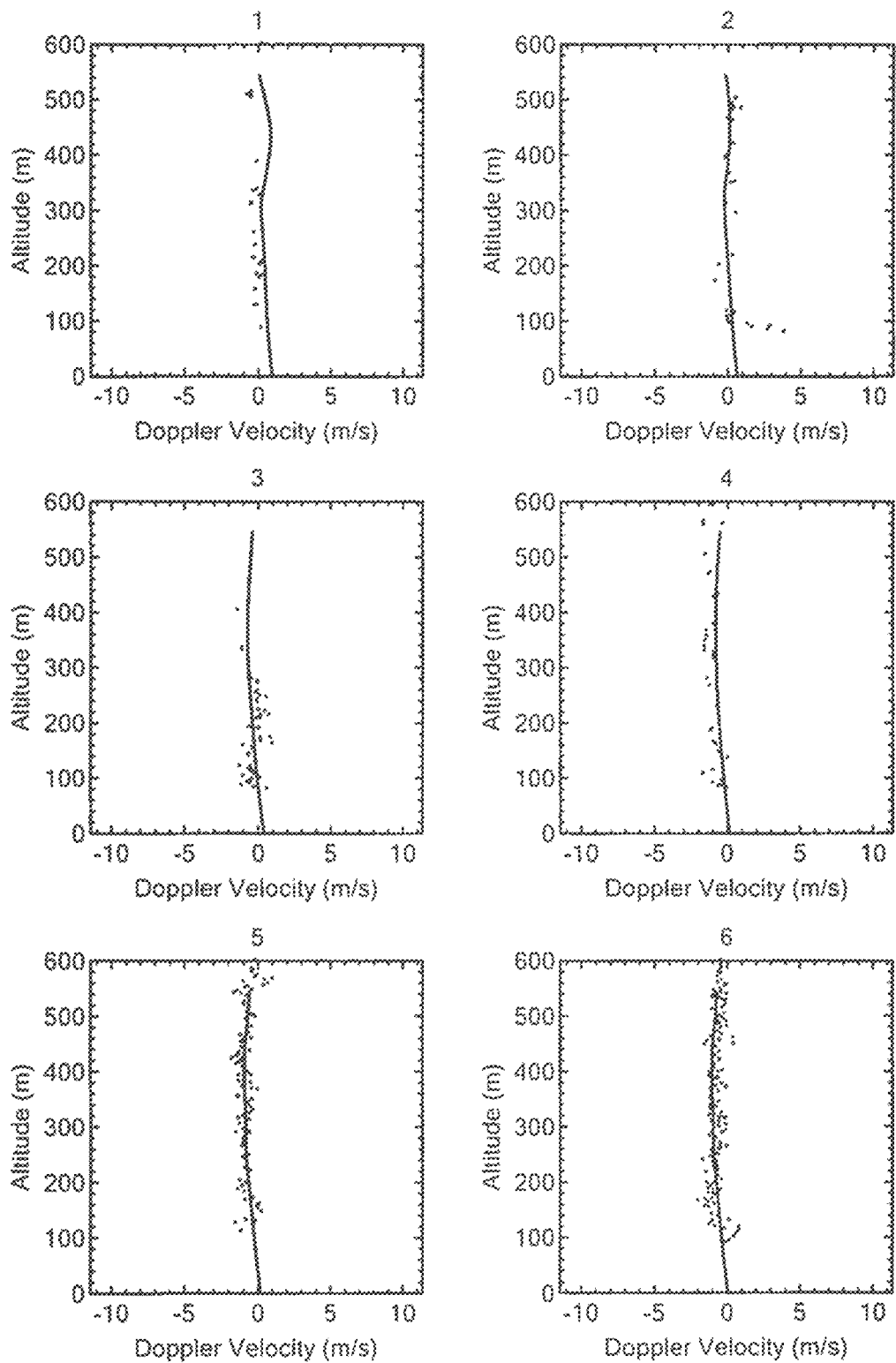
FIG. 31 are plots depicting a comparison of measured and projected beam Doppler velocity data.
Figure 31:
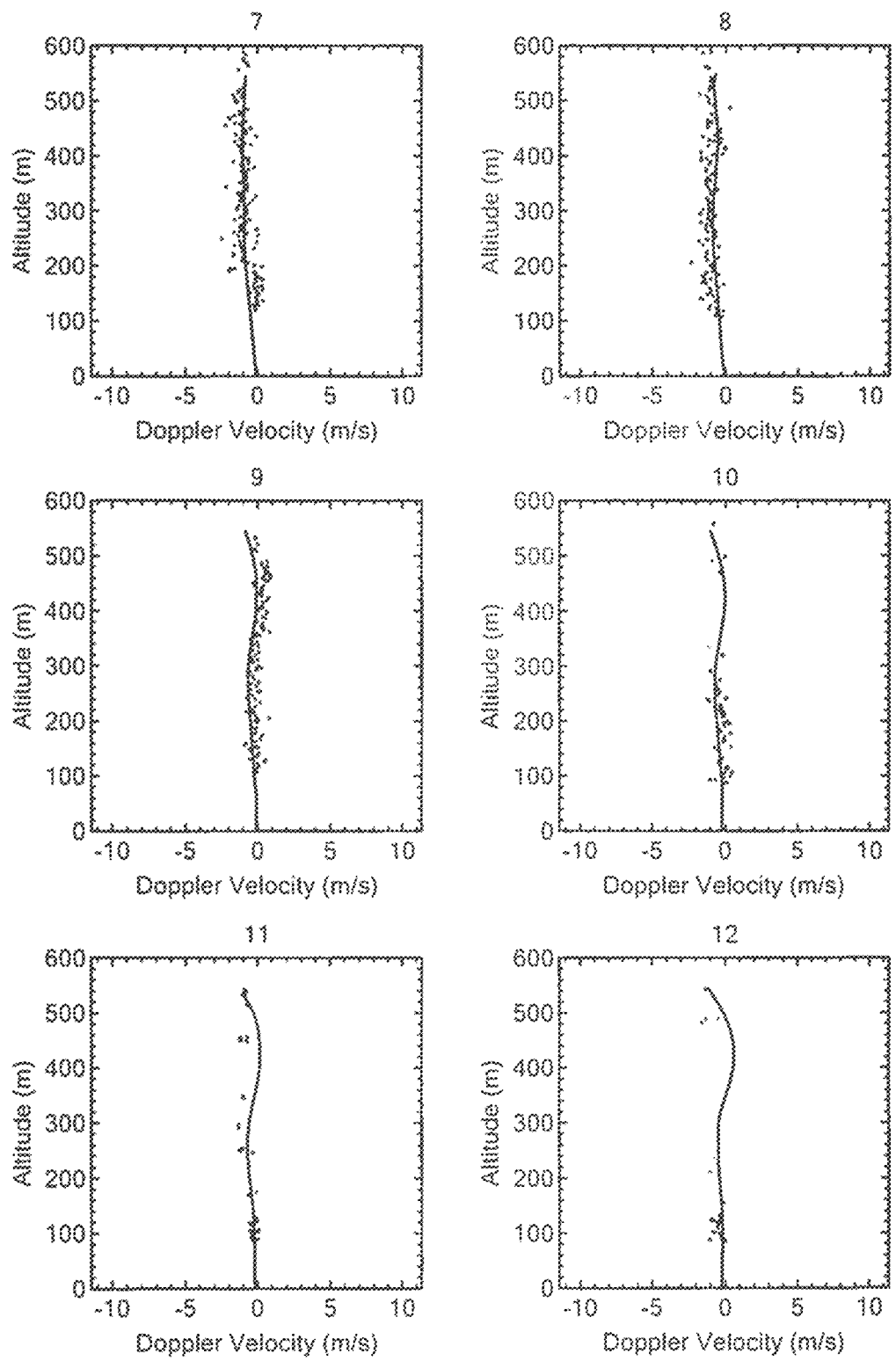

FIG. 31 compares the Doppler velocity profiles from the 12 range velocity matrices with clear air contacts to the projection of the estimated vector wind velocity profiles onto the antenna pointing direction associated with each range velocity matrix. This is a way of checking the validity of a prediction in the absence of ground truth data. The agreement between the measured Doppler data and the projected Doppler data is quite reasonable in this case.

It has been shown that the AWiPPR system 10 and the method thereof can determine vector wind velocity by measuring the Doppler velocity of clear air scatter that is pushed along at the velocity of the wind. This same technique can be used when the radar unit 16 detects the motion of boundary layer particulates such as clouds, rain or snow.

Figure 32:
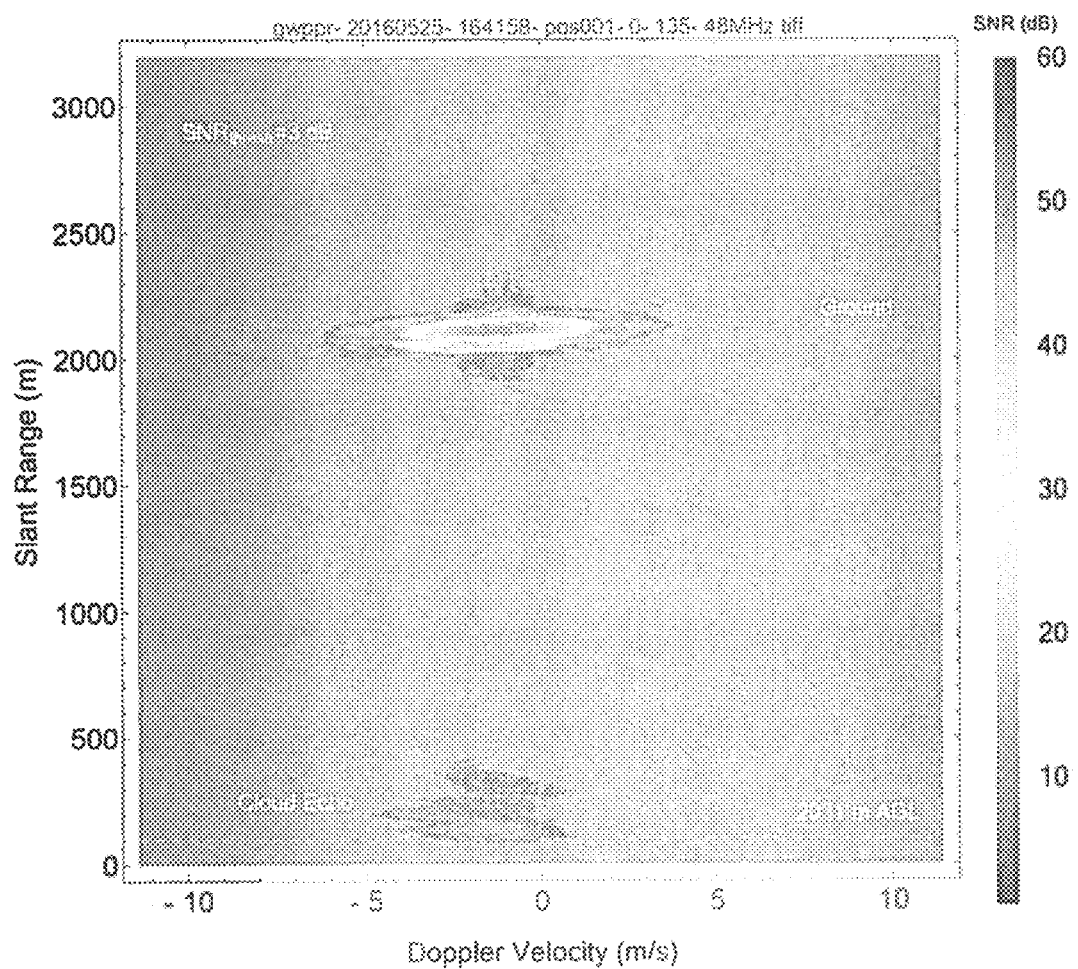
FIG. 32 is a depiction of a radar echo observed from a cloud formation.

For example, AWiPPR system 10 and the method thereof was operated above a cloud layer with a nominal elevation of approximately 1900 m above ground level. From the data collected during this flight operation 12 consecutive radar files were selected spanning a time period during which cloud echoes were detected. The radar echo data from the first of these files, file number 327 from that day, is depicted in FIG. 32. The horizontal axis in the plot is Doppler velocity and the vertical axis is slant range relative to the radar. The radar pulse length during this time period was $T_m = 190$ µs. This corresponds to a maximum positive unambiguous Doppler velocity of $V_{max} = \lambda/(4T_m) = 11.4$ m/s. The upper dashed line in FIG. 32 indicates the position of the ground with respect to the radar. The lower dashed line indicates the position of the cloud formation top with respect to the ground. Individual radar echo data for each of the 12 files is shown in FIG. 33.

Figure 33:
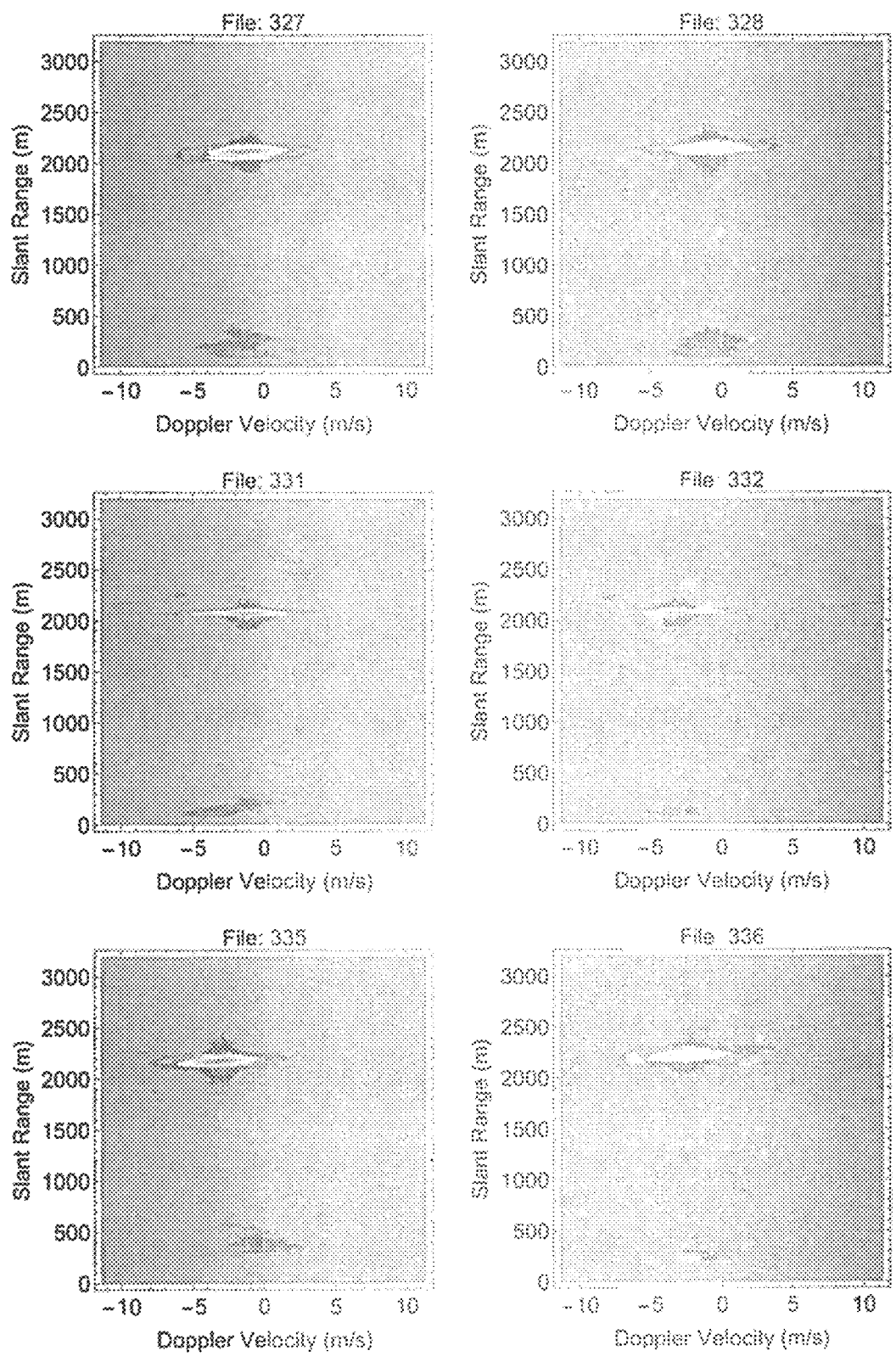
FIG. 33 are plots of radar echoes from 12 consecutive radar files during a time period in which the cloud echoes of FIG. 32 were observed.
Figure 33:
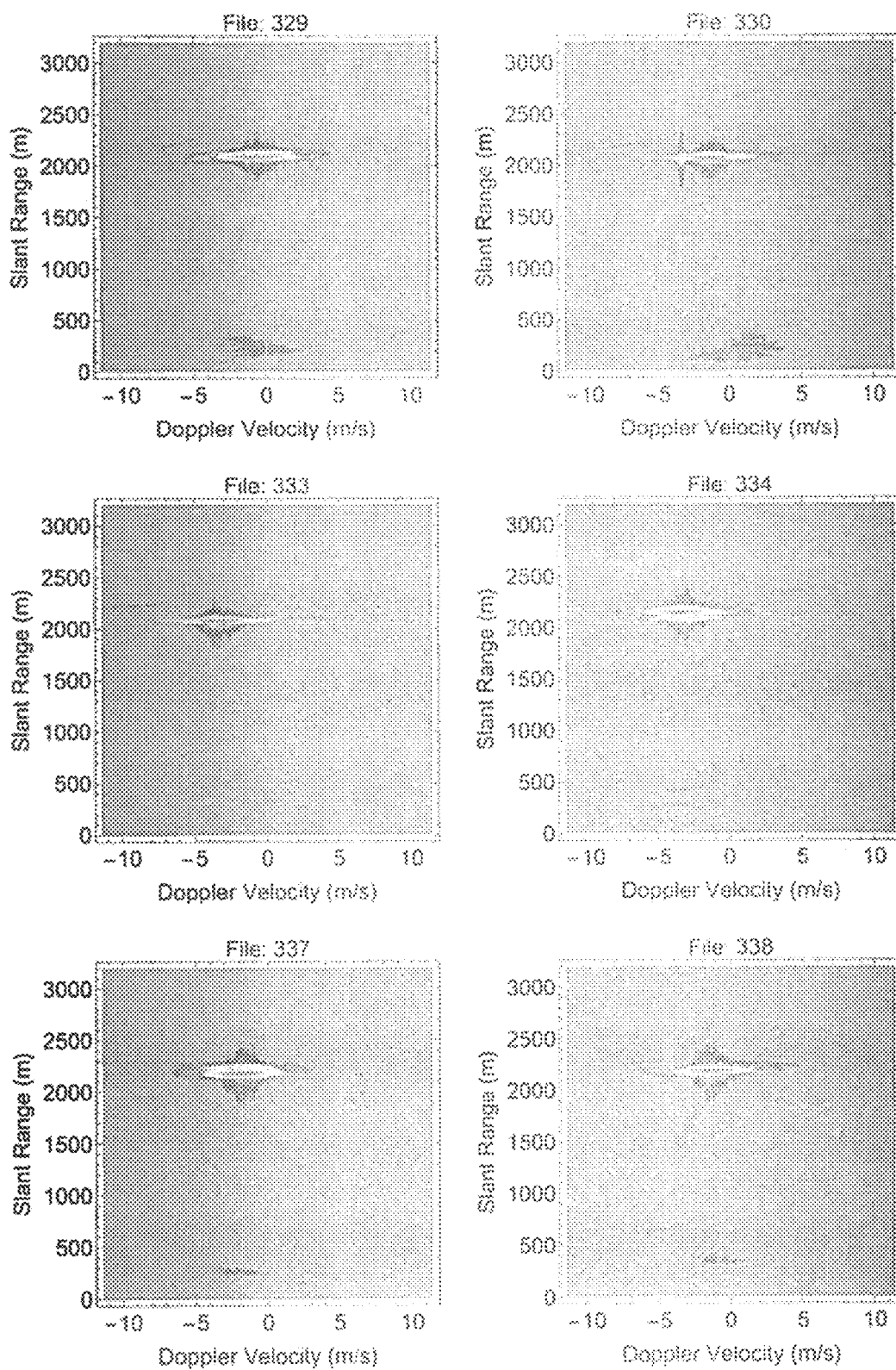
Figure 34B:
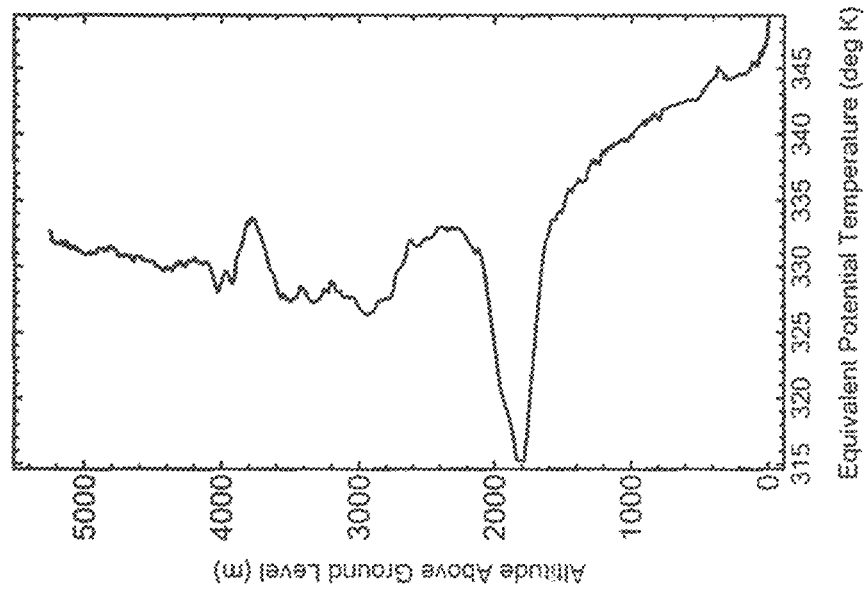
FIG. 34B is a graph showing equivalent potential temperatures at different altitudes.
Figure 34A:
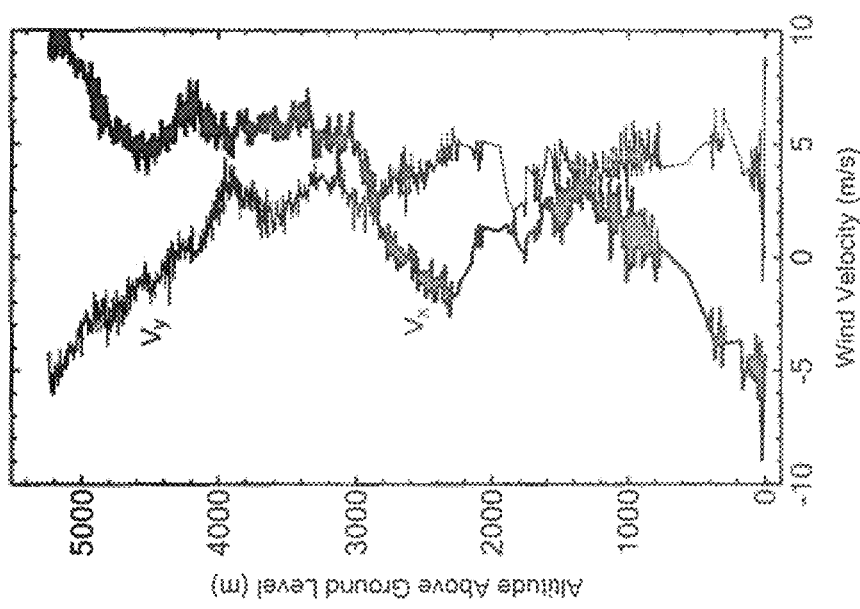
FIG. 34A is a graph showing vector wind velocity at different altitudes from balloon radiosonde data.
Figure 34C:
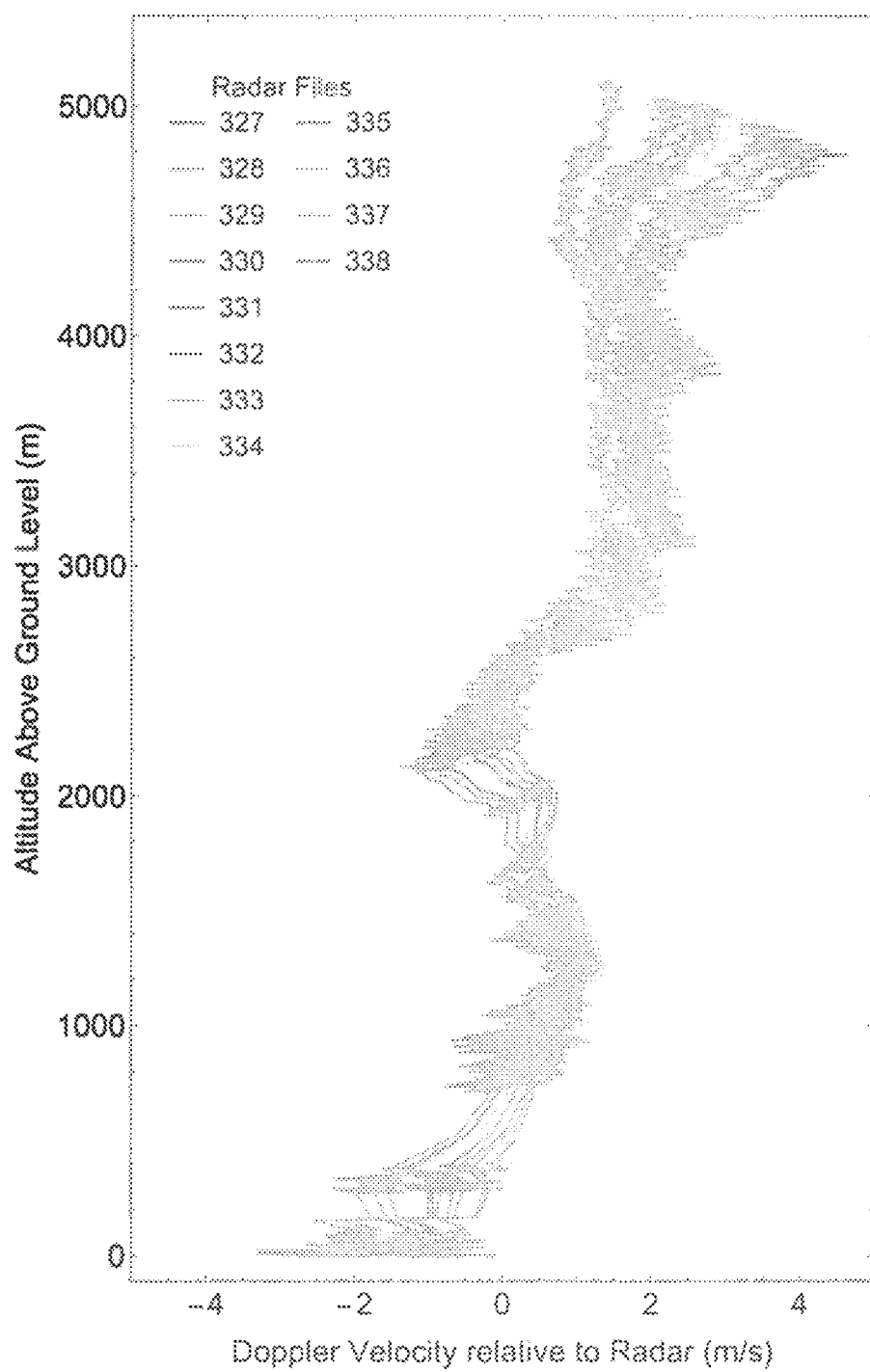
FIG. 34C is a graph depicting Doppler velocity relative to radar at different altitudes above ground level.

Approximately 20 minutes after the collection of the radar data shown in FIGS. 32 and 33, a balloon-lifted radiosonde was launched from the airport at which the plane took off. The balloon measures horizontal wind speed and direction as a function of altitude as well as temperature, pressure and humidity. Data products based upon the sonde measurements are depicted in FIGS. 34A-34C, Specifically FIG. 34A shows the $v_x$ and $v_y$ components of vector wind velocity. The sonde does not measure the $v_z$ component of vector wind velocity. FIG. 34B shows a plot of equivalent potential temperature as a function of altitude above ground level. Equivalent potential temperature has been computed from the sonde measurements of pressure, altitude, temperature and humidity data collected by the sonde. Equivalent potential temperature can be thought of as ordinary potential temperature that has been corrected for the effects of moisture on air stability. If equivalent potential temperature has a negative gradient, then the air below is unstable with respect to the air above and will tend to rise. This often results in convection and cloud formation. Note that in FIG. 34C there is a sharp change in the equivalent potential temperature plot at about 1800 m. This feature corresponds to the presence of the cloud layer and a rapid change in the horizontal stratification of the atmosphere.

During the time period in which the radar data shown in FIG. 33 were collected, the radar was moving along a straight track with a heading variation of only about 10°. This is not enough beam-pointing direction diversity to support a full wind speed inversion, but it is possible to compare the radar Doppler measurements to the sonde vector wind velocity data projected onto the individual directions of each of the 12 radar beams. The relationship between Doppler velocity observed by radar unit 16, the sonde measurement of vector wind velocity and radar beam pointing direction is given by $$V_{Doppler} = -\{v_x, v_y, v_z\} \overline{\eta}_{beam}$$

where $\overline{\eta}_{beam}$ is the pointing direction of the radar beam at the time of measurement, $\{v_x, v_y, v_z\}$ is the sonde vector wind velocity measurement and $V_{Doppler}$ is the Doppler velocity observed by the radar after motion correction. Computations of Doppler velocity profiles based using each the 12 radar-beam pointing directions are shown in FIG. 34C. In making these computations it has been assumed that that the vertical component of wind speed is zero since the sonde does not measure this.

Figure 35:
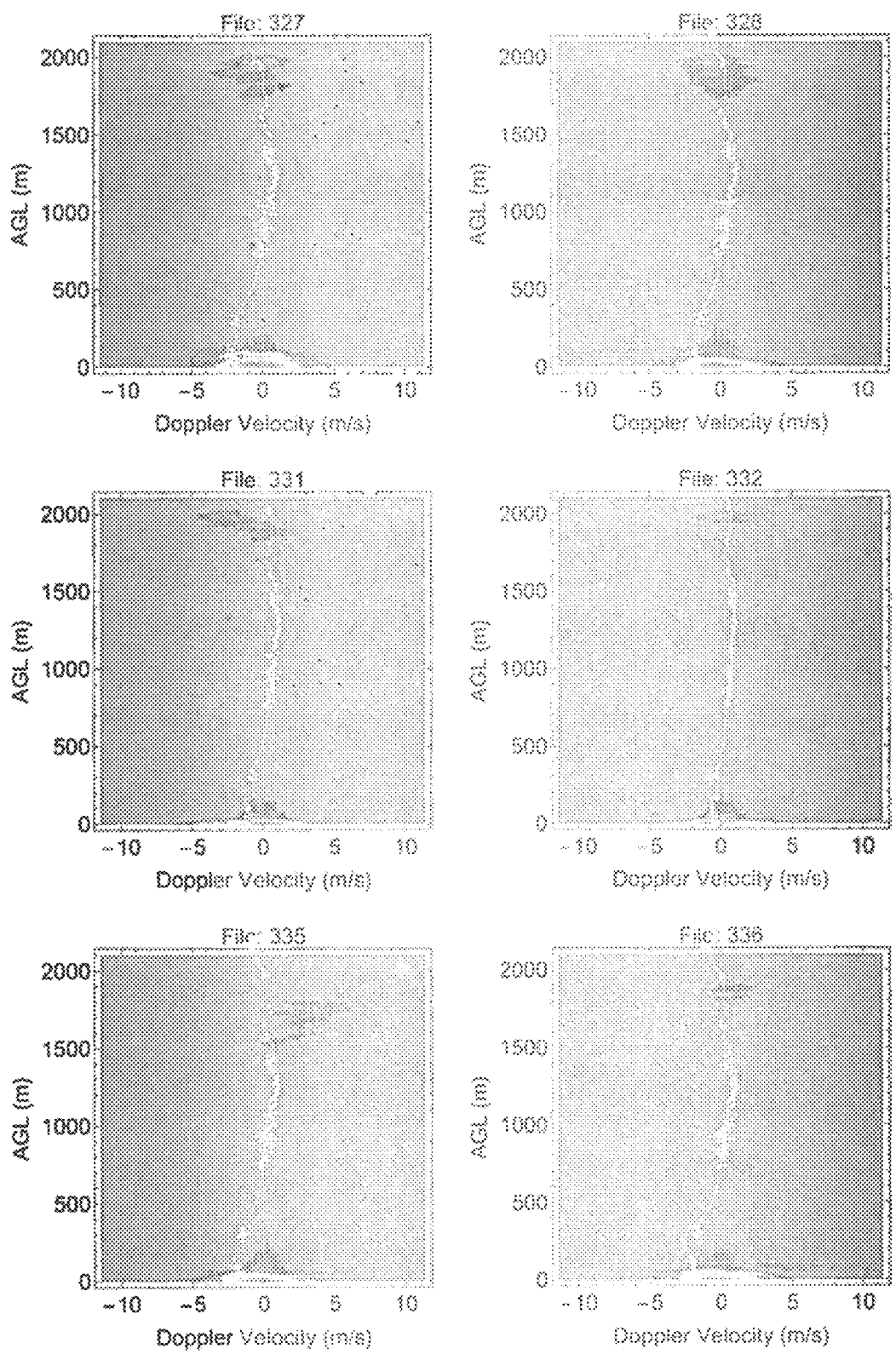
FIG. 35 are plots depicting motion corrected radar measurements of cloud Doppler velocity compared to radiosonde measurements.
Figure 35:
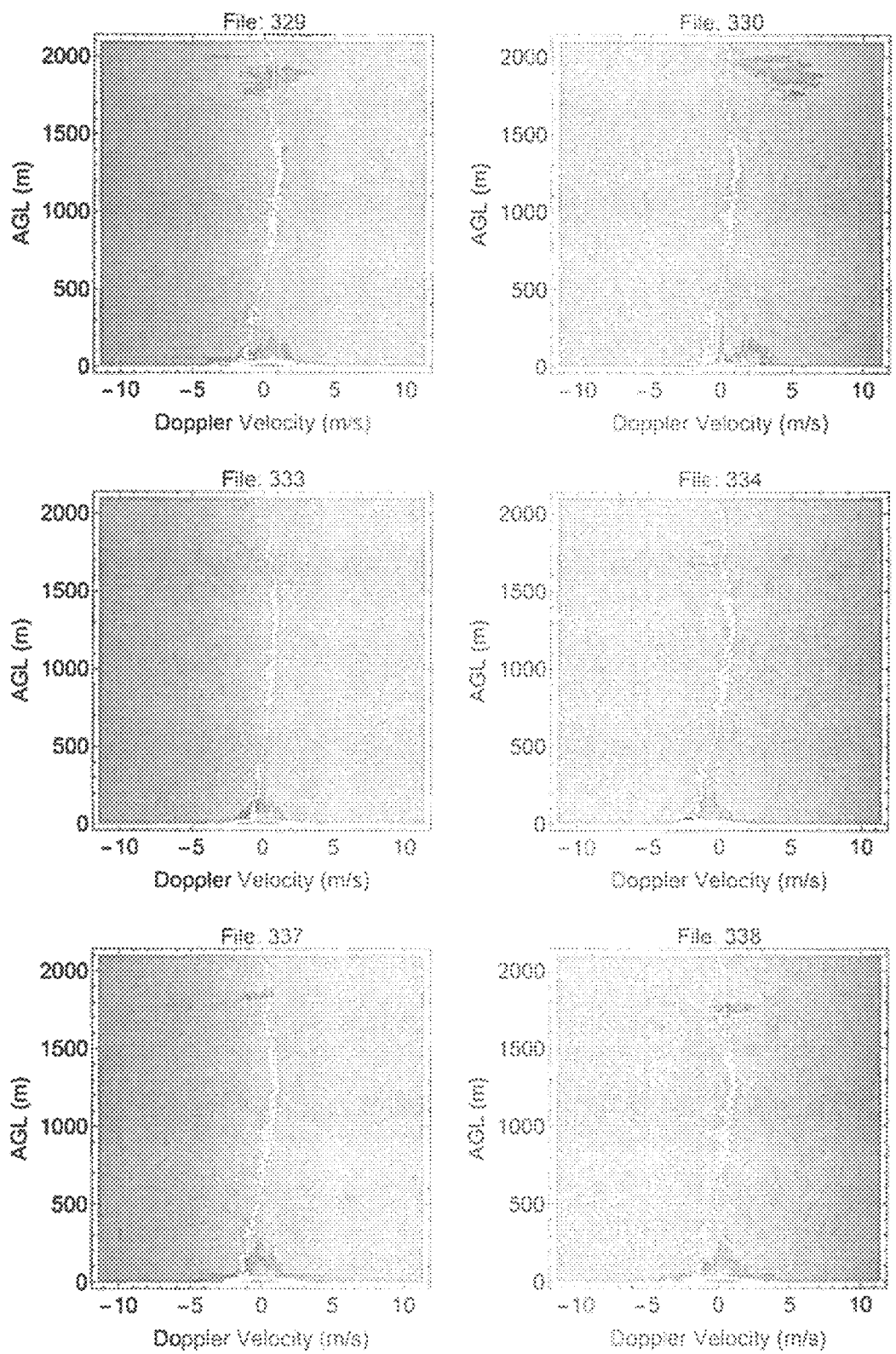

FIG. 35 shows motion corrected radar data compared to estimates of Doppler velocity based upon the sonde measurements. The lines in FIG. 35 are the sonde measurements, They correspond to the Doppler profiles shown in FIG. 34C.

The process of motion correction vertically flips the data Shown in FIG. 33 and brings the strong ground bounce echo to zero slant range and zero Doppler. The radar echoes shown near the ground in FIG. 35 are not associated with the wind. They are part of the ground echo.

The agreement of the radar data and the sonde data is reasonable. It must be kept in mind that the radar and the sonde do not measure exactly the same thing. Radar unit 16 makes an instantaneous measurement of Doppler velocity at a fixed-location and as such, it constitutes an Eulerian measurement velocity. The sonde infers vector wind velocity by computing change of position with respect to time along a drift track. This is a Lagrangian measurement. Additionally, in a cloud bank there is likely to be vertical energy flux. This will be represented in the radar measurement but not in the sonde measurement.

The location of the peak ground echo in an AWiPPR range velocity matrix provides a highly accurate, direct measurement of the ground echo Doppler velocity. If the one or more navigation units 14 are properly functioning then the vector navigation data can be used to predict the ground echo Doppler velocity. Substantial average squared differences between the measured and predicted values indicate that there is an error or bias between the measured and predicted values. Since the radar directly measures the ground echo Doppler velocity, the most likely culprit is an error or bias in the navigation system.

Figure 36A:
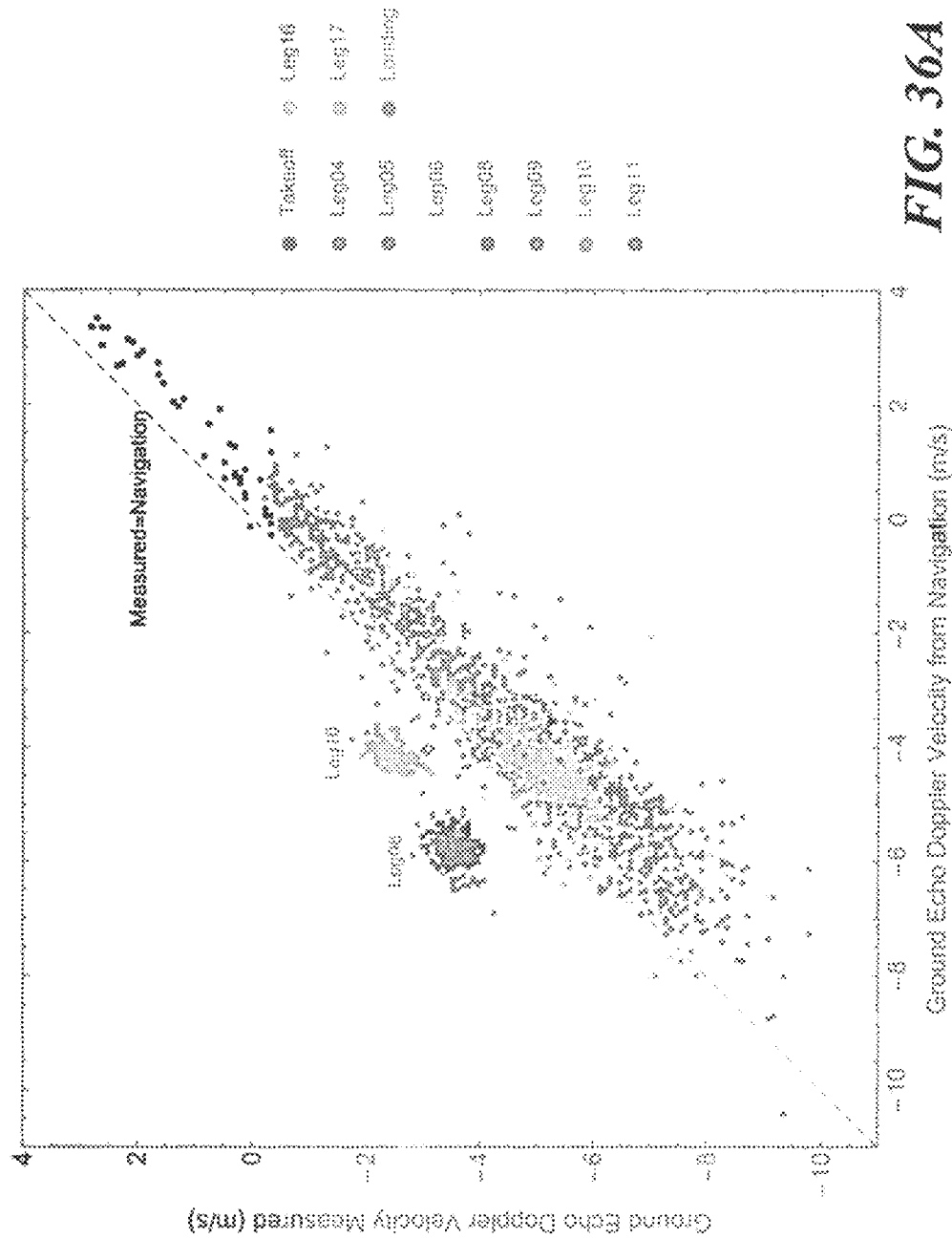
FIG. 36A is a plot depicting measured versus predicted ground echo Doppler velocity measurements compared to ground echo Doppler velocity measurements.

The system collected data on 11 flight legs including takeoff and landing. FIG. 36A compares the navigation estimates of the ground echo Doppler velocity to the directly measured values of the Doppler velocity for each of the 11 flight legs on that day. If one or more navigation units 14 are functioning correctly then the data shown should all fall very closely to the straight line measured navigation. This is clearly not the case. Data for nine of the flight legs including takeoff and landing fall below this line. Data for two of the flight legs (Leg08 and Leg10) fall above the line and appear to exhibit anomalous behavior with respect to the other navigation data.

An improved estimate of the instantaneous six-degree of freedom motion of the aircraft can be obtained by minimizing the squared differences between the directly measured Doppler velocities and the Doppler velocities predicted by the navigation data. Mathematically the quantity that is minimized is the sum:

$$\chi^2(dQ) = \frac{1}{\sigma_{Doppler}^2} \sum_{i=1}^{N} [V_{meas}^{(i)} - V_{nav}(Q_i + dQ)]^2$$

where $\sigma_{Doppler}$ is the error associated with the measurement of the ground echo Doppler velocity, N is the number of measurements in the data sample, $V_{meas}^{(i)}$ is the measured Doppler velocity at time instant $t_i$, $Q_i = \{u_x^{(i)}, u_y^{(i)}, u_z^{(i)}, \alpha^{(i)}, \beta^{(i)}, \gamma^{(i)}\}$ is the vector navigation system measurement of the aircraft vector velocity and roll, pitch and yaw. This sum in the foregoing equation is commonly referred to as the chi-squared sum. The quantity $dW = \{du_x, du_y, du_z, d\alpha, d\beta, d\gamma\}$ is the vector increment to the navigation data that minimizes the squared-differences between measurements and predictions of the ground echo Doppler velocity, Procedures for computing the estimates $V_{max}(Q_i+dQ)$ from the navigation data Q, were previously discussed. The chi-square sum $X^2(dQ)$ can be minimized by various gradient search techniques (Hughes and Hase, 2010). An example of this is shown in FIG. 36B.

Figure 36B:
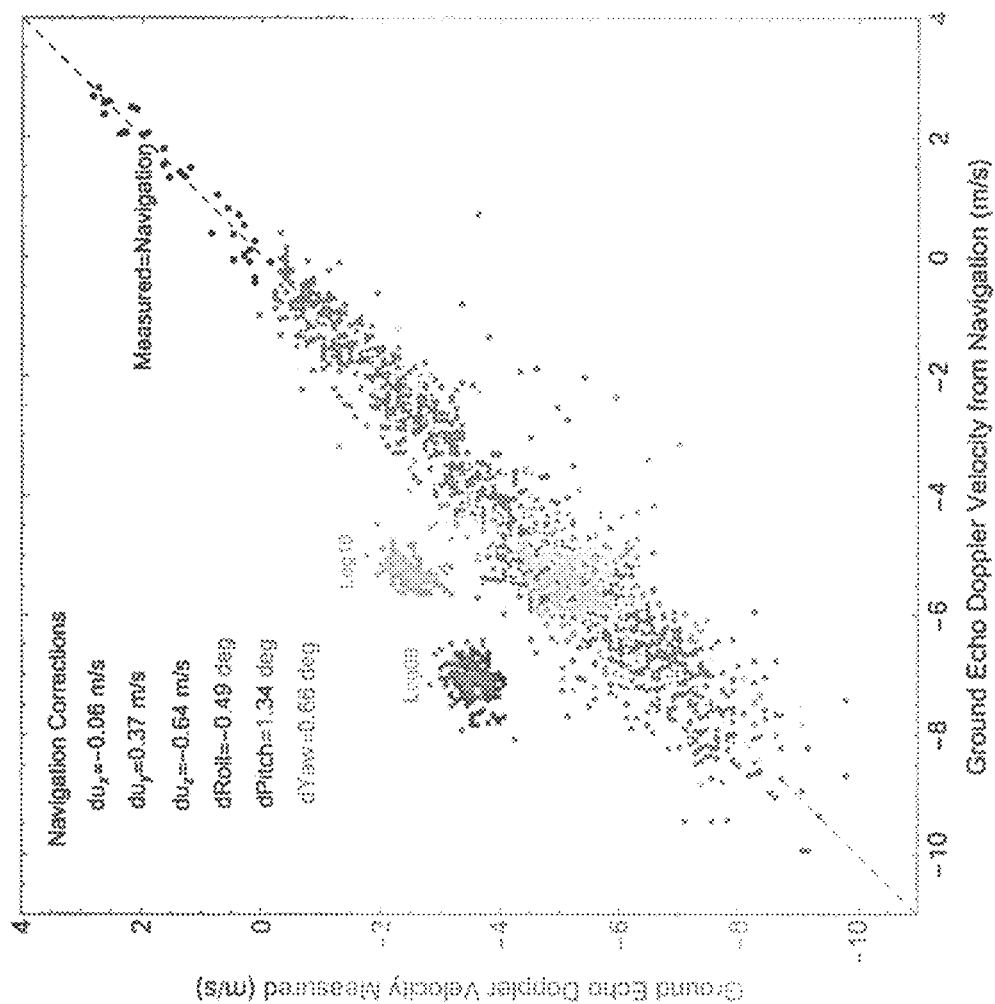
FIG. 36B is a similar plot of measured versus predicted with an air correction computed by least squares minimization.

In FIG. 36B the data for the takeoff leg have been taken as a proxy for the non-anomalous navigation data recorded on that day. The takeoff leg was chosen because it spans the full range of ground echo Doppler velocities observed on that day. The navigation corrections based upon the minimization of $x^2(dQ)$ for the takeoff lekg are shown in the upper left hand corner of FIG. 36B. As can be seen by examining FIG. 36B, the application of this correction to the other eight good legs of data leads to improved agreement between the measured and predicted ground echo Doppler velocities which in turn will lead to improved vector wind velocity estimates.

In transiting from point P1 to P2, the mobile airborne platform 12 undergoes a 90° direction change. The target is located at the origin of this rotational coordinate system and the red arrows in FIG. 37A indicate the direction of fire at the time instants corresponding to P1 and P2. The black arrow descending from P1 to the ground track parallel to the instantaneous aircraft direction (as shown by the dashed line) indicates the radar beam direction. At any instance of time this radar beam looks ahead of mobile airborne platform 12 with the angle ψ measured with respect to the vertical as shown. In order to achieve a desired look-ahead angle ψ at an aircraft roll angle α, the radar beam with respect to the mobile airborne platform 12 coordinate system of the mobile airborne platform 12 must be steered in the directions $\theta_{beam}$=ArcSin (cos ψ cos α), $\phi_{beam}$=ArcSin(tan α tan $\theta_{beam}$). For a 40 deg look ahead angle and a −30° roll angle, the two steering beam angles are $\theta_{beam}$=41.6 deg and $\phi_{beam}$=−30.8 deg.

The use of a forward-looking radar beam by radar unit 16 may seem an odd choice. An alternate choice would be to use a radar beam that looks in the direction of fire. This second choice is not optimal for two reasons. First, if the radar beam is looking in the direction of fire, then it will potentially receive large echoes from the in-flight projectiles. These echoes are likely to adversely affect the wind measurement process of AWiPPR system 10 and the method thereof. Second, the forward looking radar beam measures the cross track component of the wind vector to within a factor of 1/sin ψ at all times provided that mobile airborne platform 12 is in level flight. Ballistic targeting is an order of magnitude more sensitive to cross-track winds than to along track winds. Thus it is advantageous to continuously monitor the cross-track component of vector wind velocity.

Figure 37A:
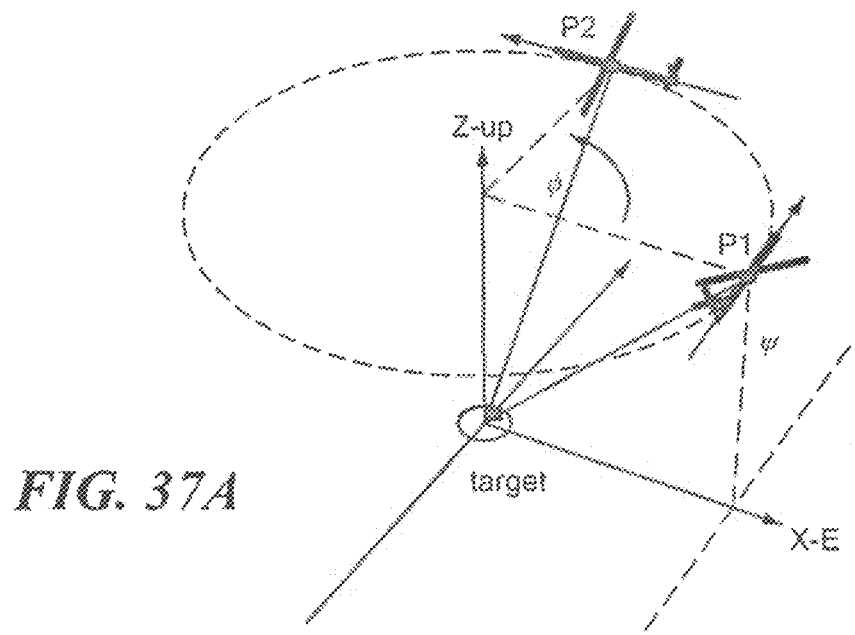
FIG. 37A shows a mobile airborne platform flight path.
Figure 37B:
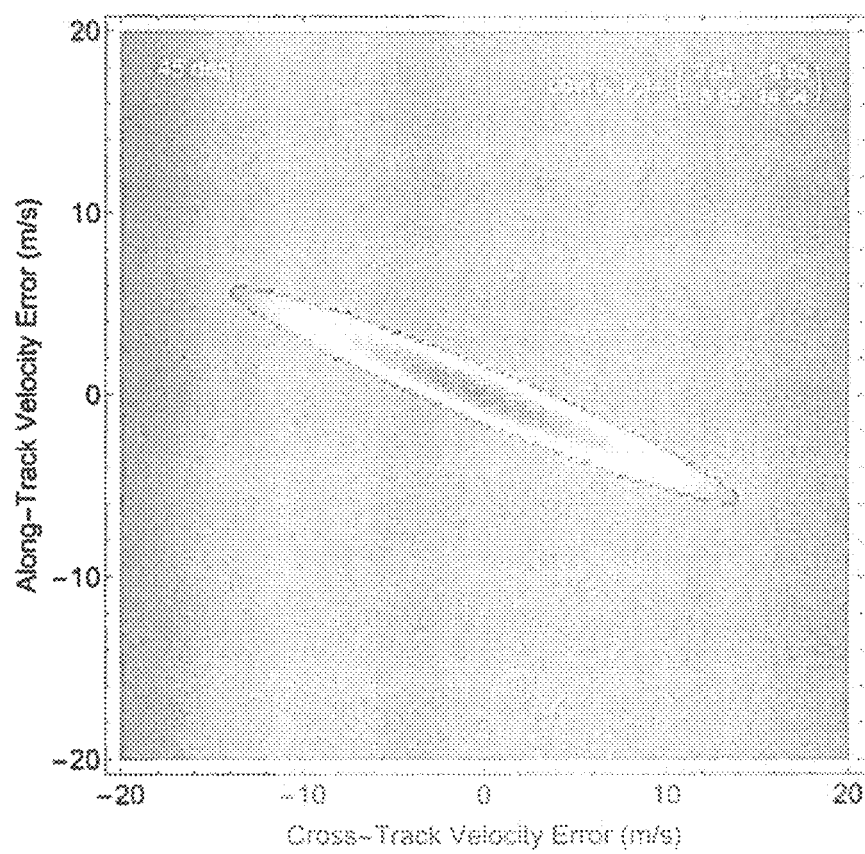
FIG. 37B depicts the velocity error surface for a 45° turn.
Figure 37C:
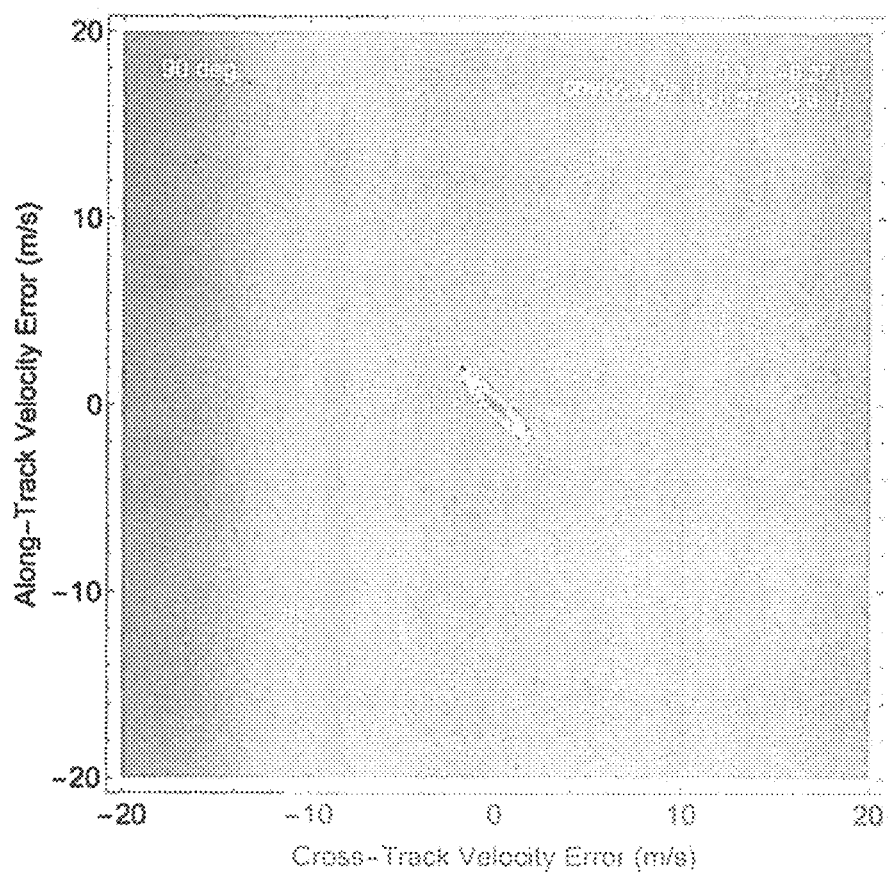
FIG. 37C depicts a system velocity error surface for a 90° turn.
Figure 37D:
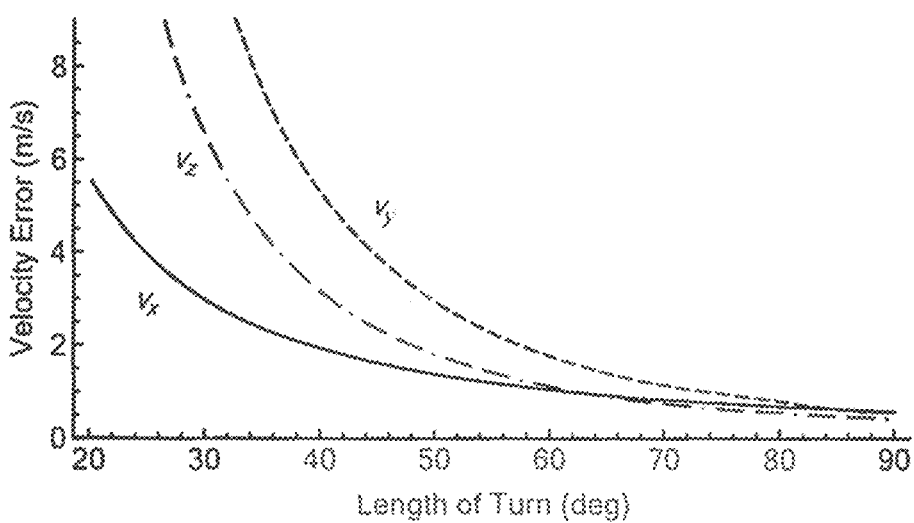
FIG. 37D depicts cross-track, along-track, and up-down velocity errors for a range of a mobile airborne platform turn angles.

FIGS. 37A-37D show system support to C130 gunship operations. FIG. 37A depicts the C130 flight path during weapon's fire and the instantaneous direction of the AWiPPR radar beam. FIG. 37B shows AWiPPR velocity error surface for 45° turn. FIG. 37C shows AWiPPR velocity error surface for 90° turn. FIG. 37D Cross-track, along-track and up-down velocity errors for a range of C130 turn angles.

The turn that the C130 makes during weapons operations provides the angular diversity required to accurately estimate the vector wind field from the radar Doppler velocity measurements made at different points along the flight path of mobile airborne platform 12. Examples of this inversion process using measurements recorded by AWiPPR system 10 and the method thereof during mobile airborne platform 12 turns have been previously given in this document. The point that we focus on here is the size of the turn that is required to make an accurate vector wind velocity measurement.

In transiting around the fight path circle shown in FIG. 37A, AWiPPR system 10 and the method thereof would measure a sequence of Doppler velocities $\bar{V}_{Doppler}=\{V_1, V_2, \ldots, V_M\}^T$ at an altitude of interest. Radar unit 16 will actually measure Doppler echoes from a range of altitudes but the result that we need here is independent of the altitude. These measurements will be made at a sequence of equally spaced aircraft headings $\{\gamma_1, \gamma_2, \ldots, \gamma_M\}$. The radar beam pointing directions at which these measurements are made is given by the vector $\bar{\eta}_m$ where $\bar{\eta}_m=\{\sin \gamma_m \sin \psi, \cos \gamma_m \sin \psi, -\cos \psi\}$. If $A_{radar}$ is the matrix whose rows contain the radar beam pointing directions $\bar{\eta}_m$ then the relationship between the observed Doppler velocities $\bar{V}_{Doppler}$ and the vector wind velocity $\bar{v}_{wind}=\{v_x, v_y, v_z\}^T$ is $$\bar{V}_{Doppler}=-A_{radar}\bar{v}_{wind}$$

In writing the above equation it is assumed that the Doppler velocities $\bar{V}_{Doppler}$ have been corrected for the motion of the aircraft. The least squares solution for the above equation is $$\bar{v}_{wind}=-(A_{radar}{}^T A_{radar})^{-1}A_{radar}{}^T \bar{V}_{Doppler}$$

The error associated with the least squares solution is given by (Clifford, 1973)

$$M_{wind} = \sigma^2_{Doppler}(A^T_{radar}A_{radar})^{-1} = \sigma^2_{Doppler}\begin{pmatrix} \sigma^2_{xx} & \sigma^2_{xy} & \sigma^2_{xz} \\ \sigma^2_{xy} & \sigma^2_{yy} & \sigma^2_{yz} \\ \sigma^2_{xz} & \sigma^2_{yz} & \sigma^2_{zz} \end{pmatrix}$$

where $\sigma_{Doppler}$ is the standard deviation of the error associated with the measurement of Doppler velocity on a radar beam. The diagonal elements of the matrix $M_{wind}$ are the variances of the vector wind velocity measurements in the x(east-west), y(north-south) and z(up-down) directions. The non-diagonal entries in the matrix represent correlated errors. The error surface associated with the measured data is given by $$p(x, y) = \frac{1}{2\pi|C|^{1/2}}\exp\left[-\frac{1}{2\sigma^2_{doppler}}\bar{x}^T C^{-1}\bar{x}\right], \quad C = \begin{pmatrix} \sigma^2_{xx} & \sigma^2_{xy} \\ \sigma^2_{xy} & \sigma^2_{yy} \end{pmatrix}$$

where $\bar{x}=\{x,y\}$.

FIGS. 37B and 37C show the x (east-west), y (north-south) error surface for C130 turns of 45 and 90°. These surfaces have been normalized to a peak value of unity and it has been assumed that $\sigma_{Doppler}=1$ m/s. The transition into the gray colored background level occurs at −30 dB. There is a significant error spread for the 45° turn, but the 90° turn has velocity errors which are no greater than about 1 m/s for either component.

Wind influences the trajectory of a projectile in two primary ways. It causes cross-track projectile drift and also influences projectile vertical drop. Unknown drift will cause a left-right miss. Unknown drop will cause a high-low miss. In order to illustrate the value of AWiPPR vector wind velocity measurements, it is necessary to consider the ballistics of a specific projectile and a realistic wind field scenario. Primary weapon systems on C130 gunships include 20 mm, 25 mm and 30 mm cannons. Wind-sensitive ballistic models for these three projectiles are not readily available. However a wind-sensitive ballistic model for a smaller but similar projectile, the Browning 50 caliber machine gun, is available for use on smart phones and computer tablets.

The component of wind that is perpendicular to the firing direction pushes on the side of the projectile and produces cross-track drift. A simple but accurate model for the cross range drift of a projectile is $$x_{drift}=v \sin \theta(t_a-t_v)$$

where v is the wind speed in the direction of fire, θ is the wind direction measured clockwise from the direction of fire, $t_o$ is the actual time of flight of the projectile to the target and $t_v$ is the theoretical time of flight of the projectile in a vacuum. Cross-track drift is maximized when the wind angle θ is either 90° or 270°. This model is an adaptation of Herbert A. Leupold's equation (Leupold, 1996). It produces results that are in agreement with the Ballistics for iPad application described in Zdziarski (2016).

For a Browning 50 caliber machine gun using a 750 grain projectile that is fired level with a 2700 m/s muzzle velocity, the actual time of flight of the projectile to a range of 2000 yd is 3.22 sec and the theoretical time of flight in a vacuum to this distance is 2.22 sec. The vertical drop for this projectile at a range of 2000 yd is given by the equation $$z_{drop} = 1600 + 34\frac{v}{10}\cos\theta$$

where $z_{drop}$ is measured in inches and the wind speed v is measured in m/s. Vertical drop is maximal when the projectile is fired into the wind (θ=0 deg) and is minimal when the wind is behind the bullet (θ=180 deg).

Figure 38A:
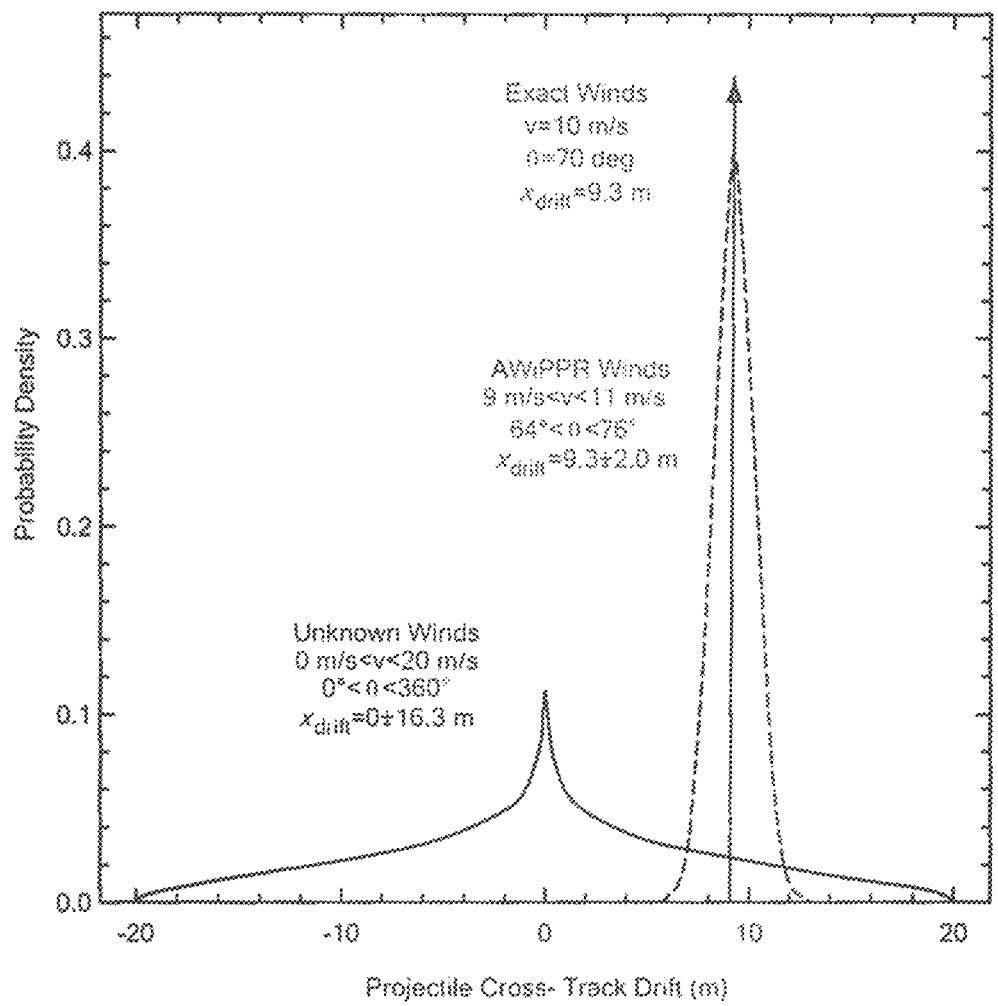
FIG. 38A is a graph depicting the effect of varying degrees of uncertainty in wind field knowledge on projectile drift.
Figure 38B:
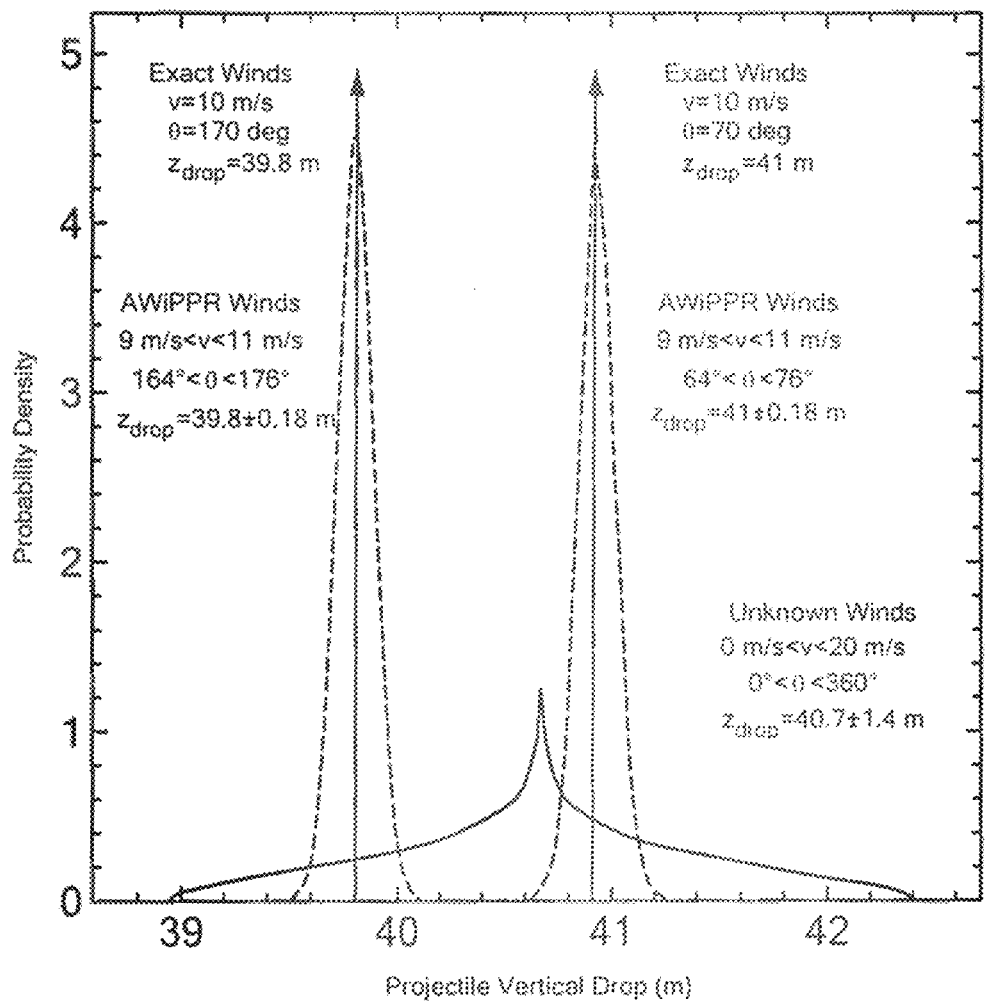
FIG. 38B is a graph depicting the effect of varying degrees of uncertainly in wind field knowledge on projectile drop.

In order to illustrate the importance of wind field knowledge on projectile targeting two cases are considered: 1) An unknown wind field with random direction over the angular range 0° to 360° and wind speed in the range 0-20 m/s. 2) A ground truth wind field with v=10 m/s and θ=70 deg. AWiPPR system 10 and the method thereof is assumed to measure this wind ground truth wind field to within 1 m/s in speed and 6 deg in azimuth. FIGS. 38A and 37B illustrate how targeting accuracy improves as the uncertainty in wind speed and direction decreases. The vertical arrows in FIGS. 38A-38B represent the state of exact knowledge of the wind field. If the wind field is known exactly, then cross-track drift and along-track drop can be exactly calculated. For the case of uncertain wind, probability distributions are used to represent uncertainty in the effects of wind on targeting. These probability distributions have been computed using a simple Monte Carlo model and the two previously presented equations describing drift and drop for the Browning 50 caliber machine gun projectile. Referring to FIG. 38A, a complete lack of knowledge of wind speed and direction results in projectile drifts over the range 0±116.3 m. The use of AWiPPR wind speed measurements reduces this drift to the range 9.3±2.0 m. The effects of wind on projectile drop are shown in FIG. 38B. In FIG. 38B an additional ground truth scenario in which the wind direction is changed from 70° deg to 170° is presented. The use of AWiPPR wind estimates again results in reduced error spreads and improved targeting. Referring to FIG. 37B, when the wind is at 70°, azimuth wind effects lengthen flight time and produce more drop. When the wind is at 170°, flight time to the target is reduced and there is less drop.

Figure 39:
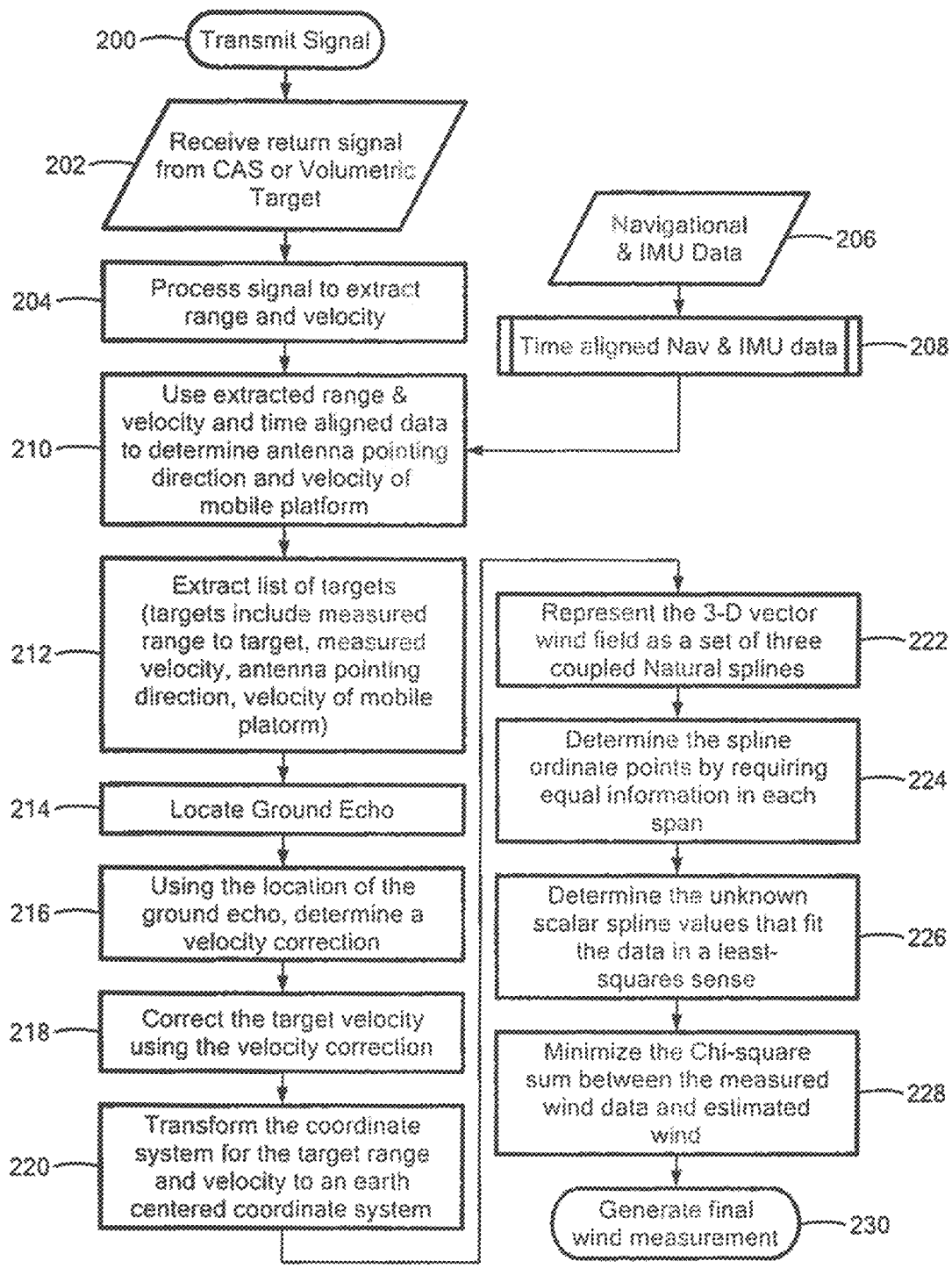
FIG. 39 is a flow chart depicting one example of steps utilized by the AWiPPR system and method disclosed herein.

FIG. 39 shows one example of the primary steps performed by AWiPPR system 10 and the method thereof. In this example, a signal is transmitted, step 200. A return signal from the CAS of volumetric targets is received, step 202. The signal is processed to extract a range and velocity, step 204. Navigational and IMU data are provided, step 206. The navigation data and IMU data are time aligned, step 208. Extracted range and velocity and time aligned data are used to determine antenna pointing direction and velocity of the mobile platform, step 210. A list of targets (including measured range to target, measured velocity, antenna positioning direction, and velocity of the mobile platform) is extracted from a list of targets, step 212. The ground echo is then located, step 214. Using the location of the ground echo, a velocity correction is determined, step 216. The target velocity is corrected using the velocity correction, step 218. The coordinate system for the target range is transformed to an earth-centered coordinate system, step 220. A three-dimensional wind vector is represented as a set of three coupled natural splines, step 222. The spine ordinate points are determined by requiring equal information in each span, step 224. The unknown scale or spline values that fit the data in a least squares sense are determined, step 226. The Chi-square sum between the measured wind data and estimated wind is minimized, step 228. The final wind measurement is then generated, step 230.

As disclosed herein, one or more navigation units 14, the various components of radar unit 16, and IMU 38, and field control system 62 may include one or more processors, an application-specific integrated circuit (ASIC), firmware, hardware, and/or software (including firmware, resident software, micro-code, and the like) or a combination of both hardware and software. Computer program code for the programs for carrying out the instructions or operation of one or more units 14, radar unit 16, and IMU 38, and field control system 62 discussed above with reference to one or more of FIGS. 1-38 may be written in any combination of one or more programming languages, including an object oriented programming language, e.g., C++, Smalltalk, Java, and the like, or conventional procedural programming languages, such as the "C" programming language or similar programming languages.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may hear no more than a tangential relation to many equivalents, and/or there are many other reasons the applicant cannot be expected to describe certain insubstantial substitutes for any claim element amended.

Other embodiments will occur to those skilled in the art and are within the following claims.

What is claimed is:

1. An airborne wind profiling portable radar (A WIPPR) system comprising:
   a mobile airborne platform including one or more navigation units configured to produce navigation data including at least the position and orientation of the mobile airborne platform;
   a radar unit mounted and positioned to the mobile airborne platform, the radar unit configured to transmit a wide-band frequency modulated continuous wave radar signal in a downward direction from the mobile airborne platform towards the ground and configured to continuously receive a reflected signal from each of a plurality of clear air scatters (CAS) targets or volumetric targets and output radar data;
   an inertial measurement unit (IMU) in communication with the one or more navigation units and the radar unit configured to receive the navigation data and determine the position and orientation of the radar at a specific point in time and output IMU data;
   a data acquisition unit in communication a with the radar unit and the IMU configured to receive and time align radar data and the IMU data for each reflected signal from each of the plurality of CAS targets or volumetric targets to provide an antenna pointing direction for each received reflected signal;
   wherein the data acquisition unit is configured to process the time aligned radar data and IMU data to determine a distance and a Doppler velocity, of each of the plurality of CAS targets or volumetric targets, provide a range, a velocity, and an antenna pointing direction for each of the plurality of CAS targets or volumetric targets, and calculate a vector wind velocity using the range, the velocity, and the antenna pointing direction for each of the plurality of CAS targets or volumetric scatters targets: and
   wherein the data acquisition unit is configured to further correct the range, the velocity, and/or the antenna pointing direction of each of the plurality of CAS targets or volumetric targets to accommodate for a motion shill in data produced by one or more of: a relative motion and orientation of the mobile airborne platform, a Doppler spread in the range, the velocity and/or the antenna pointing direction, and a ground echo.

2. The system of claim 1 in which a motion shift in the range, the velocity, and the antenna pointing direction does not include a Doppler wrap and wherein the navigation unit is configured to generate a navigation correction for each reflected signal by adding a speed of the mobile airborne platform provided by the one or more navigation units to the determined Doppler velocity for each of the plurality of CAS targets or volumetric targets and rotating the range, the velocity, and the antenna pointing direction into a coordinate system centered beneath the mobile airborne platform.

3. The system of claim 1 wherein the data acquisition unit is responsive to sparseness of the plurality of CAS targets, shifts in the position of the mobile airborne platform over a predetermined measurement window, and navigation correction applied to a set of reflected signals from the plurality of CAS targets or volumetric targets and the data acquisition unit is configured to infer a Doppler field vector for each of the plurality of CAS targets or volumetric targets as a set of three coupled cubic splines derived from the measured Doppler velocity data for the plurality of CAS targets or volumetric using a non-parametric function estimation.

4. The system of claim 3 wherein the data acquisition unit is configured to generate a vector wind field from the set of three coupled cubic splines by:

representing the second derivative of the cubic splines as a piecewise continuous linear function ($f(z)$);

integrating the function twice to yield a cubic polynomial producing a plurality of pivot points of the cubic splines, wherein the function ($f(z)$) must pass through the pivot points and be zero at the first and last pivot points such that the cubic splines are natural splines;

determining a plurality of unknown spline ordinate points from the altitude and velocity data obtained by the data acquisition unit, wherein a minimum spline abscissa value is equal to the minimum altitude and velocity data values, and wherein a maximum spline abscissa value is equal to the maximum altitude and velocity data values, wherein the abscissa of the altitude and velocity data lies in an abscissa interval of the cubic splines, and wherein the ordinate points represent the velocity of the unknown wind field;

wherein such the abscissa intervals are determined by ensuring that all abscissa intervals contain equal amounts of information; and wherein such that the relationship between the observed velocity data and the cubic splines is given by:

$$V_{N_d \times 1} = A_{N_d \times 3N} f_{3N}$$

where V is the vector of the obtained velocity data, N is the number of data points, $f$ is the vector of a set of cubic spline coefficients, A is an information matrix, and $Af$ is a cubic spline model.

5. The wind-profiling radar system of claim 4 wherein the data acquisition unit further fits the cubic spline model $Af$ to the obtained velocity data V using a least-squares technique.

6. The w d-profiling radar system of claim 4 wherein the data acquisition unit further minimizes a difference between the obtained velocity data V and the cubic spline model $Af$ by obtaining a maximum likelihood estimate of $f$.

7. The wind-profiling radar system of claim 1 wherein the data acquisition unit determines a required minimum slam distance the radar unit relative to the ground from the reflected signal that yields a maximum allowable return signal into the radar unit before the performance of the radar unit is reduced to saturation or compression.

8. The wind-profiling radar system of claim 7 wherein the data acquisition unit is configured to determine the required incidence angle using a Beckman and Spizzichino model.

9. The wind-profiling radar system of claim 7 wherein a pointing angle of the radar unit relative to the mobile airborne platform is adjustable and wherein the radar unit adjusts the pointing angle of the radar unit based on the determined required incidence angle.

10. The wind-profiling radar system of claim 9 wherein the pointing angle of the radar unit is pointed at an angle relative to a normal to the ground of greater than about 0° and less than about 90°.

11. The wind-profiling radar system of claim 1 wherein the data acquisition unit is further configured to estimate the wind vector velocity by:

selecting a plurality of measurements containing a CAS target or volumetric target and determining a slant distance and Doppler velocity of a ground echo from each;

performing the rewired coordinate transformations such that the distance and Doppler velocity of the ground echo are at Zero distance and velocity; and extracting a slant distance and Doppler vector wind velocity for each of the CAS targets or volumetric targets in the plurality of measurements above a fixed signal-to-noise threshold; and converting the slant distance to an altitude above ground level using the navigation data from the one or more navigation units.

12. The wind-profiling radar system of claim 11 wherein the data acquisition unit is further configured to minimize the chi-square sum Between the measured wind vector velocities and the estimated wind vector velocities by a gradient search technique.

13. The wind-profiling radar system of claim 1 wherein the radar unit transmits with a sweep width configured to match the back-scattering characteristics of the plurality of CAS targets or volumetric targets.

14. The wind-profiling radar system of claim 13 wherein the sweep widths range from about 6 MHz to about 200 MHz.

15. The wind-profiling radar system of claim 1 wherein the radar unit transmits in a waveform selected from one or more on linear frequency modulated (FM) waveform, a phase coded waveform, or non-linear FM waveform.

16. The wind-profiling radar system of claim 1 wherein the radar unit is configured to transmit at a carrier frequency in the Ka band.

17. The wind-profiling radar system of claim 1 wherein the radar unit is configured to convert the wide-band frequency modulated continuous wave radar signal to a Ka hand and filter and amplify the Ka hand signal prior to transmission thereof.

18. The wind-profiling radar system of claim 1 wherein the radar unit is configured to receive the reflected signal from each of the plurality of CAS targets or volumetric targets, amplify the received signal, down-convert the received signal to a baseband received signal, and filter and amplify the received signal.

19. The wind-profiling radar system of claim 18 wherein the down-conversion is homodyne single side band.

20. The wind-profiling radar system of claim 18 wherein the down-conversion is homodyne and is dual side band.

21. The wind-profiling radar system of claim 1 wherein the radar unit includes one or more antennas.

22. A method of determining a vector wind velocity as a function of altitude above the ground on a mobile airborne platform, the method comprising:

providing navigation data including at least positioning and orientation of the mobile airborne platform;

transmitting a wide band frequency modulated continuous wave radar signal in a downward direction from the mobile airborne platform towards the ground;

continuously receiving a reflected signal from each of a plurality of clean air scatter (CAS) targets or volumetric targets and outputting radar data;

determining the position and orientation of a radar unit mounted and positioned on the mobile airborne platform at a specific point in time and outputting position and orientation data;

time aligning the radar data with the position and orientation data for each reflected signal from each of the plurality or CAS tarot or volumetric targets to provide an antenna pointing direction for each of the plurality of CAS targets or volumetric scatters targets;

processing the timed aligned radar data and position and orientation data to determine a distance and Doppler velocity for each of the plurality of CAS targets or volumetric targets and provide a range, a velocity, and an antenna pointing direction for each of the plurality of CAS targets or volumetric targets and calculating a vector wind velocity using the range, the velocity, and the antenna pointing direction for each of the plurality of CAS targets or volumetric targets; and further correcting the range, the velocity, and/or the antenna pointing direction of each of the plurality of CAS targets or volumetric targets to accommodate for a motion shift in the data produced by one or more of: a relative motion in orientation of the mobile airborne platform, a Doppler spread in the range, the velocity, and/or the antenna pointing direction and a ground echo.

23. The method of claim 22 in which a shift in the range, the velocity, and the antenna pointing direction does not include a Doppler wrap and further including generating a navigation correction for each reflected signal by adding a speed of the mobile airborne platform to the determined Doppler velocity for each of the plurality of CAS targets or volumetric targets and rotating the range, the velocity, and the antenna pointing direction into a coordinate system centered beneath the airborne platform.

24. The method of claim 22 further including detecting sparseness of the plurality of CAS targets, shifts in position of the mobile airborne platform over a predetermined measurement window acid navigation correction applied to a set of reflected signals from the plurality of CAS targets and inferring a Doppler field vector for each of the plurality of CAS targets or volumetric targets as a set of three cubic splines derived from the measured Doppler velocity data for the plurality of CAS targets or volumetric scatters targets using a non-parametric function estimation.

25. The method of claim 24 further including generating a vector field from each of a set of cubic splines by:
representing the second derivative: of the cubic splines as a piecewise continuous linear function ($f(z)$);
integrating the function twice to yield a cubic polynomial producing a plurality of pivot points, of the cubic splines, wherein the function ($f(z)$) must pass through the pivot points and be zero at the first and last pivot points such that the cubic splines are natural splines;
determining a plurality of unknown spline ordinate points from the altitude and velocity data obtained by the data acquisition unit, wherein a minimum spline abscissa value is equal to the minimum altitude and velocity data values, and wherein a maximum spline abscissa value is equal to the maximum altitude and velocity data values, Wherein the abscissa of the altitude and velocity data lies in an abscissa interval of the cubic splines, and wherein the ordinate points represent the velocity of the unknown wind field;
wherein such that the abscissa intervals are determined by ensuring that all abscissa intervals contain equal amounts of information;
wherein such that the relationship between the observed velocity data and the cubic splines is given by:

$$V_{N_d \times t} = A_{N_d \times 3N} f_{3N}$$

where V is the vector of the obtained velocity data, N is the number of data points, $f$ is the vector of a set of cubic spline coefficients, A is an information matrix, and $Af$ is a cubic spline model.

26. The method of claim 25 further including fitting the cubic spline model of $Af$ to obtain the velocity data using a least squares technique.

27. The method of claim 24 further including minimizing the difference between the obtained velocity data V and the cubic spline model $Af$ by obtaining a maximum likelihood estimate of $f$.

28. The method of claim 22 further including determining a required minimum slant distance of a radar unit disposed on the mobile airborne unit relative to the ground from the reflected signal that yields a maximum allowable signal return before a performance of the radar unit is reduced to saturation or compression.

29. The method of claim 28 further including determining the required incidence angle using a Beckman and Spizzichino model.

30. The method of claim 27 further including providing a pointing angle the radar unit relative to the mobile airborne platform that is adjustable and the radar unit adjusts a pointing angle of the radar unit based on the determined required incidence angle.

31. The method of claim 30 wherein the pointing angle of the radar unit is pointed at an angle relative to a normal to the ground of greater than about 0' and less than about 90°.

32. The method of claim 22 further including estimating the vector wind velocity by:
selecting a plurality of measurements containing a CAS target or volumetric scatter target and determining a slant distance and Doppler velocity of a ground echo from each;
performing the required coordinate transformations such that the distance and Doppler velocity of the ground echo are at zero distance and velocity;
extracting a slant distance and Doppler vector wind velocity for each of the CAS targets in the plurality of measurements above a fixed signal-to-noise threshold; and
converting the slant distance to an altitude above ground level using the navigation data from the one Or more navigation units.

33. The method of claim 32 further including minimizing the Chi-square sum between the measured wind vector velocity and the estimated wind vector velocity by a gradient search technique.

34. The method of claim 22 in which the wide-band frequency modulated continuous wave radar signal transmits with a sweep width configured to match the backscattering characteristics of the CAS targets or volumetric targets.

35. The method of claim 34 in which the sweep widths are in the range of about 6 MHz to about 200 MHz.

36. The method of claim 22 in which the wide-band frequency modulated continuous wave radar signal includes one or more of linear frequency modulated (FM) waveform, a phase coded waveform, or non-linear (FM) waveform.

37. The method of claim 22 in which the wide-band frequency modulated continuous wave radar signal transmits a carrier frequency in the Ka band.

38. The method of claim 22 further including converting the wide-band frequency modulator continuous wave radar signal to a Ka hand, filtering and amplifying the Ka band prior to transmission thereof.

39. The method of claim 22 further including receiving the reflected signal from each of the plurality of CAS targets or volumetric scatters targets, amplifying the received signal, down converting the received signal to a base band received signal and filtering and amplifying the received signal.

40. The method of claim 39 wherein the down conversion is a homodyne single side band.

41. The method of claim 38 wherein the down conversion is a homodyne and is a dual side band.

* * * * *